(12) United States Patent  (10) Patent No.: US 7,160,237 B2
Hashimoto et al. (45) Date of Patent: Jan. 9, 2007

(54) PLASTIC SHEET WITH BENDING RULED LINE, AND RULED LINE BLADE FOR PLASTIC SHEET

(76) Inventors: Tadashi Hashimoto, 337-4, Minamitazuke-chou, Nagahama-shi Shiga 526-0844 (JP); Hisashi Hashimoto, 337-4, Minamitazuke-chou, Nagahama-shi, Shiga 526-0844 (JP)

( * ) Notice: Subject to any disclaimer, the term of this patent is extended or adjusted under 35 U.S.C. 154(b) by 0 days.

(21) Appl. No.: 10/506,681

(22) PCT Filed: Mar. 7, 2003

(86) PCT No.: PCT/JP03/02695

§ 371 (c)(1),
(2), (4) Date: Sep. 17, 2004

(87) PCT Pub. No.: WO03/078137

PCT Pub. Date: Sep. 25, 2003

(65) Prior Publication Data

US 2005/0139059 A1  Jun. 30, 2005

(30) Foreign Application Priority Data

Mar. 18, 2002 (JP) .............................. 2002-074208
Apr. 9, 2002 (JP) .............................. 2002-105998
Jun. 3, 2002 (JP) .............................. 2002-161137
Jun. 24, 2002 (JP) .............................. 2002-182561
Jan. 24, 2003 (JP) .............................. 2003-015942

(51) Int. Cl.
*B31B 1/25* (2006.01)

(52) U.S. Cl. ...................... 493/356; 493/447; 493/395; 493/61

(58) Field of Classification Search ................ 493/356, 493/447, 395–397, 61
See application file for complete search history.

(56) References Cited

U.S. PATENT DOCUMENTS 3,463,039 A * 8/1969 Stanley ........................ 83/139
4,568,323 A * 2/1986 Roeder ........................ 493/473

(Continued)

FOREIGN PATENT DOCUMENTS

JP  4-9345  1/1992

(Continued)

OTHER PUBLICATIONS

English language Abstract of JP 2001-293777.

(Continued)

*Primary Examiner*—Hemant M. Desai
(74) *Attorney, Agent, or Firm*—Greenblum & Bernstein, P.L.C.

(57) ABSTRACT

A plastic sheet with a bending rule line, having satisfactory bending properties and pliability, feeling soft, having a fine appearance, and allowing a bending operation to be mechanically performed; and a ruled line blade for such plastic sheet. A bending ruled line (2) added to the bending portion of a plastic sheet (1) is formed, and shallow grooves (3) are formed along the bottom surface (2b) of the bending ruled line 2 and at predetermined longitudinal intervals, while a plurality of grooves (4) deeper than the shallow grooves (3) are formed longitudinally along the bottom surface (2b) between shallow grooves (3,3). And a ruled line blade (6) for the plastic sheet having the bending ruled line (2) added thereto is formed, and blades (7) having a small cutting depth are formed along the top surface (6b) of the ruled line blade (6) at predetermined longitudinal intervals, while a plurality of blades (8) having a larger cutting depth than in the shallow blades (7) are formed longitudinally along the top surface (6b) between the shallow-blades (7,7).

32 Claims, 56 Drawing Sheets

U.S. PATENT DOCUMENTS

| | | | | |
|---|---|---|---|---|
| 5,064,409 A | * | 11/1991 | Campbell et al. | 493/396 |
| 5,073,162 A | * | 12/1991 | Campbell et al. | 493/396 |
| 6,053,684 A | * | 4/2000 | Eckert et al. | 412/1 |
| 6,666,808 B1 | * | 12/2003 | Kawata et al. | 493/395 |

FOREIGN PATENT DOCUMENTS

| | | |
|---|---|---|
| JP | 4-201231 | 7/1992 |
| JP | 6-23835 | 2/1994 |
| JP | 6-100015 | 4/1994 |
| JP | 8-39661 | 2/1996 |
| JP | 10-193450 | 7/1998 |
| JP | 11-10753 | 1/1999 |
| JP | 2000-158562 | 6/2000 |
| JP | 2001-062909 | 3/2001 |
| JP | 2001-62942 | 3/2001 |
| JP | 2001-293777 | 10/2001 |

OTHER PUBLICATIONS

English language Abstract of JP8-39661.
English language Abstract of JP11-10753.
English language Abstract of JP6-23835.
English language Abstract of JP2001-062909.
English language Abstract of JP4-201231.
English language Abstract of JP2001-62942.
English language Abstract of JP2000-158562.
English language Abstract of JP6-100015.
English language Abstract of JP10-193450.

* cited by examiner

FIG. 51
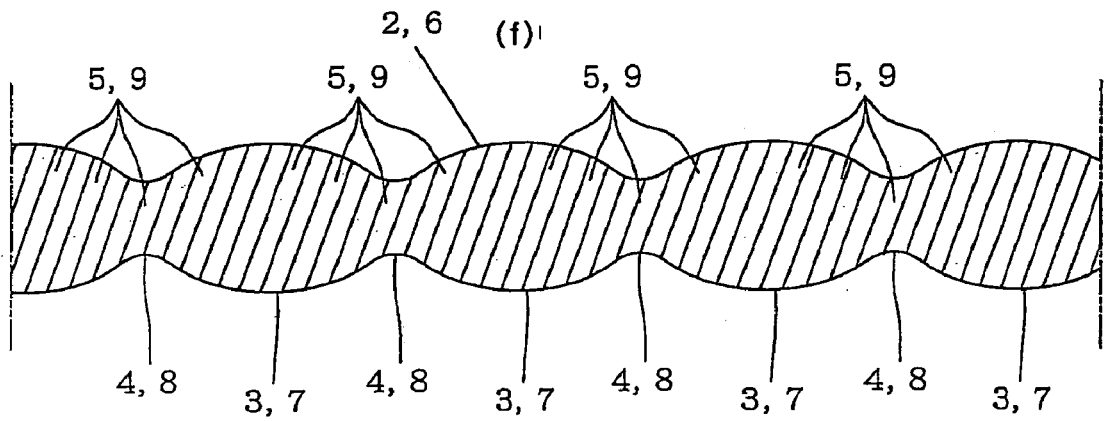
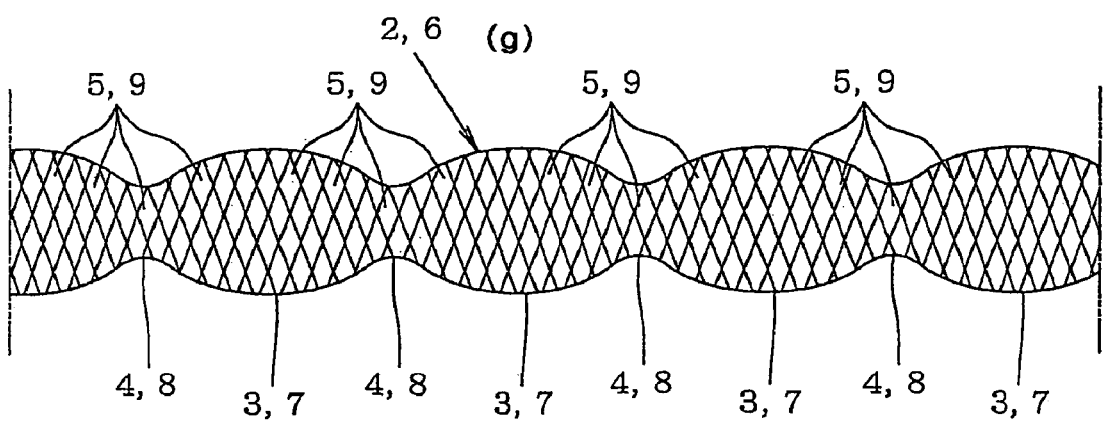
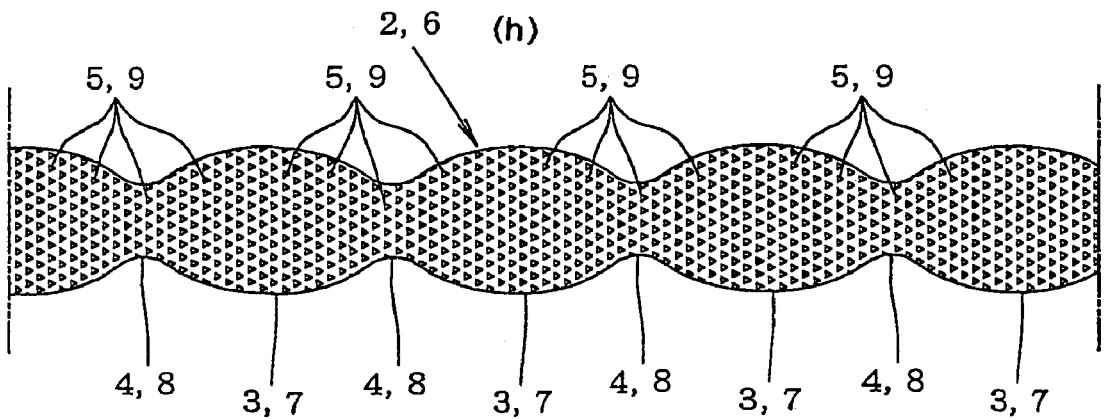

PLASTIC SHEET WITH BENDING RULED LINE, AND RULED LINE BLADE FOR PLASTIC SHEET

TECHNICAL FIELD

The present invention relates to plastic sheet with folding rules and rule cutter for plastic sheet capable of satisfying both folding property and folding strength of plastic sheet at the same time when assembling a container accommodating, for example, cosmetics, stationery, toys, foods and other commodities.

BACKGROUND ART

Hitherto, various plastic sheets with folding rules have been known, for example, a plastic sheet with folding rules forming folding rules composed of shallow grooves and deep grooves in folding portions by pressing a rule cutter having a concave blade and convex blade formed on a blade tip portion (Japanese Utility Model Publication No. H4-9345), and a plastic sheet with folding rules forming folding rules composed of semicircular shallow grooves as seen from the side and straight deep grooves in folding portions by pressing a rule cutter having a semicircular concave blade as seen from the side and straight convex blade formed on a blade tip portion (Japanese Laid-open Patent No. 2001-293777).

However, in these plastic sheets with folding rules, when the bottom thickness of folding rules provided by the rule cutter is reduced, the folding characteristic of the plastic sheet is enhanced, but if the thin portion is continuous in the longitudinal direction, when the plastic sheet is folded along the folding rule, cracks or large holes may be likely to be formed in the bottom of the folding rule. If the rule cutter is pressed firmly against the plastic sheet and the thin portion of the bottom of the folding rule is opened intentionally, dust, moisture or other foreign matter may invade from this portion, and the commercial value or sanitation of the commodities contained in the packaging container may be spoiled. At the same time, the groove step difference is large and corners are formed at acute angle, hand feeling of the folding portion is poor, and cloth or skin may be caught. Or when cutting deeply by the rule cutter and the groove thickness is reduced, the plastic sheet is spread in the surface direction and the molecular density is raised. A sheet of small tensile strength or elongation may be torn at the folding rule, and biodegradable plastic sheet of small elongation may not be formed. In addition, distortion, warping or corrugation may occur in the folding portion, and the appearance quality is poor. When assembling a plastic sheet into a packaging container by a box making machine, it may be stagnant or clogged, and it is hard to assemble mechanically.

The invention is devised in the light of the above problems, and it is hence an object thereof to present a plastic sheet with folding rules and rule cutter for plastic sheet capable of obtaining favorable folding characteristic and flexibility by providing a plastic sheet with folding rules forming a plurality of deep grooves in the bottom between shallow grooves, thereby improving the hand touch and appearance, suppressing occurrence of warp or corrugation, and folding mechanically.

DISCLOSURE OF THE INVENTION

The invention presents a plastic sheet with folding rules, being a plastic sheet provided with concave folding rules composed of a pair of side faces inclined at specified angle and mutually facing oppositely, and a narrow bottom face consecutive to an end of side faces, in which shallow grooves are formed at specified intervals in the longitudinal direction along the bottom face of the folding rules, and a plurality of deeper grooves than the shallow grooves are formed in the longitudinal direction along the bottom face between the shallow grooves.

The invention further presents a rule cutter for plastic sheet used in forming folding rules in folding portions of plastic sheet, comprising a pair of side faces inclined at specified angle and mutually facing oppositely, and a narrow top face consecutive to an end of side faces, and in this rule cutter for plastic sheet, further, blades of shallow infeed are formed at specified intervals in the longitudinal direction along the top face of the rule cutter, and a plurality of blades of deeper infeed than the shallow blades are formed in the longitudinal direction along the top face between the shallow blades.

The plastic sheet is formed of single or compound plastic material, such as polypropylene (PP), polyethylene terephthalate (PET), and biodegradable plastics, and a transparent or translucent sheet formed in a specified thickness included in a range of about 0.1 mm to about 1 mm (for example, 0.3 mm) is used. That is, when forming folding rules in folding portions of plastic sheet, single or plural rule cutters are pressed against the folding portions at a pressure depending on the material, thickness, strength and hardness of the plastic sheet, while heating to specified temperature.

Grooves may be formed in different depths, or grooves of medium depth deeper than shallow grooves and shallower than deep grooves may be formed in the bottom between shallow grooves.

Shallow blades of rule cutter for plastic sheet having a shape nearly corresponding to the folding rules may be set in different depths of infeed, or blades of medium depth deeper in infeed than shallow blades and shallower in infeed than deep blades may be formed in the top between shallow blades. Yet, the deep grooves and deep blades may be set in a dimension deeper by a specified rate than the shallow grooves and shallow blades. That is, as shown in FIG. 3 to FIG. 10, supposing depth E1 of shallow grooves 3 and height E2 of shallow blades 7 to be about 100%, depth F1 of deep grooves 4 and height F2 of deep blades 8 may be set in a depth of about 30% to about 70%.

For example, A1, B1, B1a, C1, D1, E1, F1; and G1 of shallow grooves 3 and deep grooves 4 for composing the folding rules 2, and A2, B2, B2a, C2, D2, E2, F2, and G2 of shallow blades 7 and deep blades 8 for composing the rule cutter 6 for plastic sheet used when forming these folding rules 2 may be set in the following dimensions.

More specifically, pitch interval A1 of shallow grooves 3 and pitch interval A2 of shallow blades 7 are set at an interval included in a range of about 0.3 mm to about 10.0 mm (for example, about 1.1 mm), pitch interval B1 of deep grooves 4 and pitch interval B2 of deep blades 8 are set at an interval included in a range of about 0.05 mm to about 1.0 mm (for example, about 0.2 mm), pitch interval B1a of shallow grooves 3 and deep grooves 4 and pitch interval B2a of shallow blades 7 and deep blades 8 are set at an interval narrower than pitch intervals A1, A2 and wider than pitch intervals B1, B2 (for example, about 0.25 mm), width C1 of shallow grooves 3 and width C2 of shallow blades 7 are set at a width included in a range of about 0.2 mm to about 1.0 mm, width D1 of deep grooves 4 and width D2 of deep blades 8 are set at a width included in a range of about 0.01 mm to about 1.0 mm, depth E1 of shallow grooves 3 and height E2 of shallow blades 7 are set in a range of about 0.07 mm to about 0.25 mm (for example, about 0.13 mm), and depth F1 of deep groves 4 and height F2 of deep blades 8 are set in a range of about 0.01 mm to about 0.1 mm (for example, about 0.05 mm).

Further, width G1 of bottom of folding rules 2 and width G2 of top of rule cutter 6 are set at a width included in a range of about 0 mm to about 0.15 mm, and angle θ1 of folding rules 2 and biting angle θ2 of rule cutter 6 are set at an angle included in a range of about 15 degrees to about 110 degrees, that is, angle θ1 of folding rules 2 formed in folding portions of front part 1a, side part 1b, rear part 1c, and junction 1d and biting angle θ2 of rule cutter 6 are set at about 43 degrees, and angle θ1 of folding rules 2 formed in folding portions of folding part 1e, top part 1f, and bottom part 1g and biting angle θ2 of rule cutter 6 are set at about 75 degrees. Thickness H of rule cutter 6 is set at a specified thickness included in a range of about 0.5 mm to about 2.0 mm.

If pitch interval A2 of shallow blades 7 and pitch interval B2 of deep blades 8 are set larger than specified, the strength of deep blades 8 is lowered, and the folding characteristic of plastic sheet is lowered. If pitch intervals A2, B2 are set smaller than specified, the strength of blade tip is lowered, and sufficient effect for forming folding rules 2 is not obtained, and it is hence preferred to set in the specified range.

If widths C2, D2 and heights E2, F2 are set larger than specified, hand touch and folding characteristic of the folding rules 2 formed in plastic sheet are poor. If widths C2, D2 and heights E2, F2 are set smaller than specified, the strength of blade tip is lowered, and sufficient effect for forming folding rules 2 is not obtained, and it is hence preferred to set in the specified range.

If biting angle θ2 of rule cutter 6 is set larger than specified, a greater pressure is required for forming folding rules 2, and it is hard to process. Warp or corrugation occurs in plastic sheet, and it is hard to fold mechanically. Folding characteristic of plastic sheet is poor. If angle θ2 and width G2 are set smaller than specified, the strength of blade tip is lowered and the life is shortened, and it is hence preferred to set in the specified range.

Besides, shallow grooves 3 and deep grooves 4 of folding rules 2 and shallow blades 7 and deep blades 8 of rule cutter 6 may be formed in any specified sectional shape, for example, semicircular shape or arc shape having a smooth curvature as seen from the side, trapezoidal shape, quadrangular shape or triangular shape, or groove shape in combination of a plurality thereof.

In a second aspect of the invention, a plastic sheet with folding rules can be composed by forming a plurality of grooves shallower than the folding rules in the overall length of bottom of folding rules, and inclining the grooves at a specified angle to the rule forming direction of folding rules to arrange in a rope pattern.

Further, a rule cutter for plastic sheet can be composed by forming a plurality of concave blades in the overall length of top of rule cutter, and inclining the blades at a specified angle to the rule forming direction of folding rules to arrange in a rope pattern.

In the folding rules, holes penetrating in the thickness direction in the bottom of the folding rules can be formed in the bottom between grooves, or the dimensions of parts of grooves can be set in dimensions included in a specified range suited to folding of the plastic sheet.

In the rule cutter, protrusions penetrating in the thickness direction in the bottom of the folding rules can be formed in the top between blades, or the dimensions of parts of blades can be set in dimensions included in a specified range suited to forming of folding rules formed in the plastic sheet.

For example, a1, b1, c1, d1, e1, and f1 of grooves 3 for composing the folding rules 2, and a2, b2, c2, d2, e2, and f2 o blades 7 for composing the rule cutter 6 for plastic sheet used when forming these folding rules 2 may be set in the following dimensions.

More specifically, as shown in FIG. 14 to FIG. 24, depth a1 of grooves 3 and height a2 of blades 7 are set at a dimension included in a range of about 0.01 mm to about 0.3 mm (for example, about 0.1 mm), depth b1 of grooves 3 and height b2 of blades 7 are set at a dimension included in a range of about 0.0 mm to about 0.2 mm (for example, about 0.01 mm), width c1 of folding rules 2 and grooves 3 and width c2 of blades 7 are set at a dimension included in a range of about 0.05 mm to about 0.8 mm (for example, about 0.5 mm), root pitch d1 of grooves 3 and blade tip pitch d2 of blades 7 are set at a dimension included in a range of about 0.1 mm to about 1.0 mm (for example, about 0.3 mm), angle e1 of folding rules 2 and biting angle e2 of rule cutter 6 are set at an angle included in a range of about 15 degrees to about 120 degrees (for example, about 43 degrees or about 75 degrees), angle f1 of grooves 3 inclining or crossing at a specified angle to rule forming direction g and angle f2 of blades 7 are set at an angle included in a range of about 10 degrees to about 70 degrees (for example, about 30 degrees), and thickness h of rule cutter 6 is set at a specified thickness included in a range of about 0.5 mm to about 2.0 mm.

Within the specified range of dimensions (for example, depth, height, width, and angle), dimensions of grooves 3 of folding rules 2 and blades 7 of rule cutter 6 may be changed and set in a desired combination. They may be formed in any specified sectional shape, for example, semicircular shape or arc shape having a smooth curvature as seen from the side, trapezoidal shape, quadrangular shape or triangular shape, or any shape in combination of a plurality thereof.

If width d1 of grooves 3 and width d2 of blades 7 are set larger than specified, the folding characteristic of plastic sheet 1 is lowered, or if width d1 and width d2 are set smaller than specified, the strength of blade tip is lowered, and sufficient effect is not obtained for forming folding rules 2, and it is hence preferred to set in the specified range.

If a1 to c1 of grooves 3 and a2 to c2 of blades 7 are set larger than specified, hand touch and folding characteristic of folding rules 2 formed in plastic sheet 1 are poor. If a1 to c1 of grooves 3 and a2 to c2 of blades 7 are set smaller than specified, the strength of blade tip is lowered, and sufficient effect is not obtained for forming folding rules 2, and it is hence preferred to set in the specified range.

If angles e2, f2 of rule cutter 6 are set larger than specified, a greater pressure is required when forming folding rules 2, and processing is difficult. Still more, warp or corrugation may occur in the plastic sheet 1, and it is hard to fold mechanically, and folding characteristic of plastic sheet 1 is poor. If angles e2, f2 are set smaller than specified, the strength of blade tip is lowered, and the life is shortened, and it is hence preferred to set in the specified range.

In a third aspect of the invention, a plastic sheet with folding rules can be composed by forming a plurality of grooves at depths depending on the thickness of the plastic sheet at specified intervals in the longitudinal direction along the bottom of folding rules, and forming grooves at depths depending on the thickness of the plastic sheet but shorter than the above grooves in the longitudinal direction, in the longitudinal direction along the bottom between the grooves.

Further, a rule cutter for plastic sheet can be composed by forming a plurality of blades at heights depending on the thickness of the plastic sheet at specified intervals in the longitudinal direction along the top of the rule cutter, and forming blades at heights depending on the thickness of the plastic sheet but shorter than the above blades in the longitudinal direction, in the longitudinal direction along the top between the blades.

Grooves can be formed at similar or different depths. Blades can be formed at similar or different heights. Grooves and blades can be formed in a smooth curvature. Parts of grooves may be set at proper dimensions included in a range suited to folding depending in the thickness of the plastic sheet. Parts of blades may be set at proper dimensions included in a range suited to forming folding rules depending in the thickness of the plastic sheet.

Parts Aa, Ab, B, Ba, C, Ca, D, $\theta1$, and $\theta2$ of grooves 3, 4 composing fold rules 2 and blades 7, 8 composing rule cutter 6 for plastic sheet may be set in the following dimensions depending on the thickness A of plastic sheet 1. More specifically, as shown in FIG. 28 to FIG. 36, width Aa of grooves 3 and blades 7 is set at a width included in a range of about 5% to about 50% of thickness A of plastic sheet 1 (for example, about 0.15 mm), and width Ab of grooves 4 and blades 8 is set at a width included in a range of about 5% to about 55% of thickness A of plastic sheet 1 (for example, about 0.15 mm).

Length B of grooves 3 and blades 7 is set at a width included in a range of about 1 times to about 20 times of thickness A (for example, about 0.5 mm), and length C of grooves 4 and blades 8 is set at a width included in a range of about 2 times to about 20 times of thickness A (for example, about 0.8 mm), pitch interval D of grooves 4 and blades 8 is set at an interval included in a range of about 10% to about 200% of thickness A (for example, about 0.2 mm), and pitch interval of grooves 3 and blades 7 is set at an interval wider than the pitch interval D of grooves 4 and blades 8.

Depth Ba of grooves 3 and height Bb of blades 7 are set at a width included in a range of about 20% to about 50% of thickness A (for example, about 0.08 mm), and depth Ca of grooves 4 and height Cb of blades 8 are set at a width included in a range of about 10% to about 400% of thickness A (for example, about 0.08 mm).

Angle $\theta1$ of folding rules 2 and angle $\theta2$ of rule cutter 6 are set at an angle included in a range of about 15 degrees to about 120 degrees depending on the folding portions of plastic sheet 1. That is, angle $\theta1$ of folding rules 2 and angle $\theta2$ of rule cutter 6 formed in the folding portions of front part 1a, side part 1b, rear part 1c, and junction 1d of plastic sheet 1 are set at about 43 degrees, and angle $\theta1$ of folding rules 2 and angle $\theta2$ of rule cutter 6 formed in the folding portions of folding part 1e, top part 1f, and bottom part 1g are set at about 75 degrees.

If pitch interval D is set larger than specified, the blade tip strength of rule cutter 6 is lowered, and folding characteristic of plastic sheet 1 is worsened. If pitch interval D is set smaller than specified, the strength of blade tip is lowered, and sufficient effect is not obtained for forming folding rules 2, and it is hence preferred to set in the specified range.

If values of Aa, Ab, B, Ba, C, and Ca are set larger than specified, hand touch and folding characteristic of folding rules 2 formed in plastic sheet 1 are worsened. If set smaller than specified, the strength of blade tip is lowered, and sufficient effect is not obtained for forming folding rules 2, and it is hence preferred to set in the specified range.

If biting angle $\theta2$ of rule cutter 6 is set larger than specified, a greater pressure is required when forming folding rules 2, and processing is difficult. Still more, warp or corrugation may occur in the plastic sheet 1, and it is hard to fold mechanically. Besides, folding characteristic of plastic sheet 1 is poor. If angle $\theta2$ set smaller than specified, the strength of blade tip is lowered, and the life is shortened, and it is hence preferred to set in the specified range.

Within the specified range of dimensions, the width, length, depth, height, interval (pitch), and angle of grooves 3, 4 of folding rules 2 and blades 7, 8 of rule cutter 6 may be freely changed depending on the thickness A, material, strength and hardness of plastic sheet 1, and may be set in desired arrangement or combination. They may be formed in any specified sectional shape, for example, semicircular shape or arc shape having a smooth curvature, sector shape or trapezoidal shape, quadrangular shape or triangular shape, or any shape in combination of a plurality thereof.

Further, grooves 3, 4 of folding rules 2 and blades 7, 8 of rule cutter 6 may be arranged in a plurality closely or separately, formed in a smooth curvature, formed at different steps, or formed in same or different widths or in crossed state. Moreover, they can be formed in special shapes such as satin pattern, small undulations, rope shape or chain shape.

In a fourth aspect of the invention, a plastic sheet with folding rules can be composed by forming a plurality of shallower grooves than folding rules and deeper grooves than shallow grooves, in the longitudinal direction along the bottom of folding rules, and forming smaller protrusions than the grooves in the longitudinal direction along the top of the grooves.

Further, a rule cutter for plastic sheet can be composed by forming a plurality of shallower blades than folding rules and deeper blades than shallow blades, in the longitudinal direction along the top of the rule cutter, and forming smaller recesses than the blades in the longitudinal direction along the bottom of the blades.

Protrusions of folding rules can be composed of, for example, convex grooves 5, recesses, or projections. Recesses of rule cutter can be composed of, for example, concave blades 9, recesses, or dents.

Small protrusions can be formed in shallow grooves or deep grooves. Shallow grooves and deep grooves can be formed at different depths or nearly similar depths. The grooves and protrusions can be formed in a specified size depending on the thickness of plastic sheet. Grooves and protrusions may be also formed in a smooth curvature as seen from the longitudinal direction of folding rules.

Small recesses can be formed in shallow blades or deep blades. Shallow blades and deep blades can be formed at different depths or nearly similar depths. The blades and recesses can be formed in a specified size depending on the thickness of plastic sheet. Blades and recesses may be also formed in a smooth curvature as seen from the longitudinal direction of the rule cutter.

Parts B, C, D, E, F, G, $\theta1$, $\theta2$, and X of grooves 3, 4 composing fold rules 2 and blades 7, 8 composing rule cutter 6 for plastic sheet may be set in the following dimensions depending on the thickness A of plastic sheet 1. More specifically, as shown in FIG. 41 to FIG. 46, lengths B, C of grooves 3, 4 and blades 7, 8 are set at a length included in a range of about 30% to about 400% of thickness A of plastic sheet 1 (for example, about 0.8 mm), depth D of grooves 4 and height D of blades 8 are set at a depth and height included in a range of about 10% to about 50% of thickness A of plastic sheet 1 (for example, about 0.15 mm), pitch interval E of grooves 5 and blades 9 is set at an interval included in a range of about 0.05 mm to about 0.5 mm of thickness A of plastic sheet 1 (for example, about 0.2 mm), depth F of grooves 5 and height F of blades 9 are set at a depth and height included in a range-of about 5% to about 30% of thickness A of plastic sheet 1, being shallower than grooves 4 and lower than blades 8 (for example, about 0.08 mm), width G of grooves 4 and blades 8 is set at a width included in a range of about 0% to about 100% of thickness A of plastic sheet 1 (for example, about 0.05 mm), and width H of grooves 3 and blades 7 is set at a width included in a range of about −5% to about 200% of thickness A of plastic sheet 1 (for example, about 0.15 mm).

Angle $\theta 1$ of folding rules 2 and angle $\theta 2$ of rule cutter 6 are set at an angle included in a range of about 15 degrees to about 130 degrees depending on the folding portions and thickness A of plastic sheet 1, and thickness X of grooves 4 is formed at a thickness included in a range of about 0 μm to about 10 μm. For example, angle $\theta 1$ of folding rules 2 and angle $\theta 2$ of rule cutter 6 formed in the folding portions of front part 1$a$, side part 1$b$, rear part 1$c$, and junction 1$d$ of plastic sheet 1 are set at an angle allowed to fold in a specified direction depending on thickness A of plastic sheet 1 (for example, about 43 degrees), and angle $\theta 1$ of folding rules 2 and angle $\theta 2$ of rule cutter 6 formed in the folding portions of folding part 1$e$, top part 1$f$, and bottom part 1$g$ are set at an angle allowed to fold inside and outside (for example, about 75 degrees).

If values of B, C, D, E, F, G, $\theta 1$, $\theta 2$, and X are set larger than specified, hand touch and folding characteristic of folding rules 2 formed in plastic sheet 1 are worsened. If set smaller than specified, the strength of blade tip is lowered, and sufficient effect is not obtained for forming folding rules 2, and it is hence preferred to set in the specified range.

If pitch interval E is set larger than specified, folding characteristic of plastic sheet 1 is worsened. If pitch interval E is set smaller than specified, the strength of blade tip is lowered, and sufficient effect is not obtained for forming folding rules 2, and it is hence preferred- to set in the specified range.

If angle $\theta 2$ of rule cutter 6 is set larger than specified, a greater pressure is required when forming folding rules 2, and processing is difficult. Still more, warp or corrugation may occur in the plastic sheet 1, and folding characteristic of plastic sheet 1 is worsened, and it is hard to fold mechanically. If angle $\theta 2$ set smaller than specified, the strength of blade tip is lowered, and the life is shortened, and it is hence preferred to set in the specified range.

Within the specified range of dimensions, the width, length, depth, height, interval (pitch), and angle of grooves 3, 4, 5 of folding rules 2 and blades 7, 8, 9 of rule cutter 6 may be freely changed depending on the thickness A, material, strength and hardness of plastic sheet 1, and may be set in desired arrangement or combination. The grooves 3, 4, 5 of folding rules 2 and blades 7, 8, 9 of rule cutter 6 may be formed in any specified sectional shape as seen from the side, front, plane or bottom, for example, smooth curved shape, semicircular shape or arc shape, sector shape, with any radius of curvature, trapezoidal shape, quadrangular shape, triangular shape, polygonal shape, or any shape in combination of a plurality thereof.

Further, grooves 5 of folding rules and blades 9 of rule cutter 6 may be formed in same or different widths or in crossed state, or formed in special shapes such as satin pattern, small undulations, rope shape, chain shape, or any specific shape.

BRIEF DESCRIPTION OF THE DRAWINGS

FIG. 51 is a side view of different example of folding rules and rule cutter.

DETAILED DESCRIPTION OF THE PREFERRED EMBODIMENTS

Figure 1:
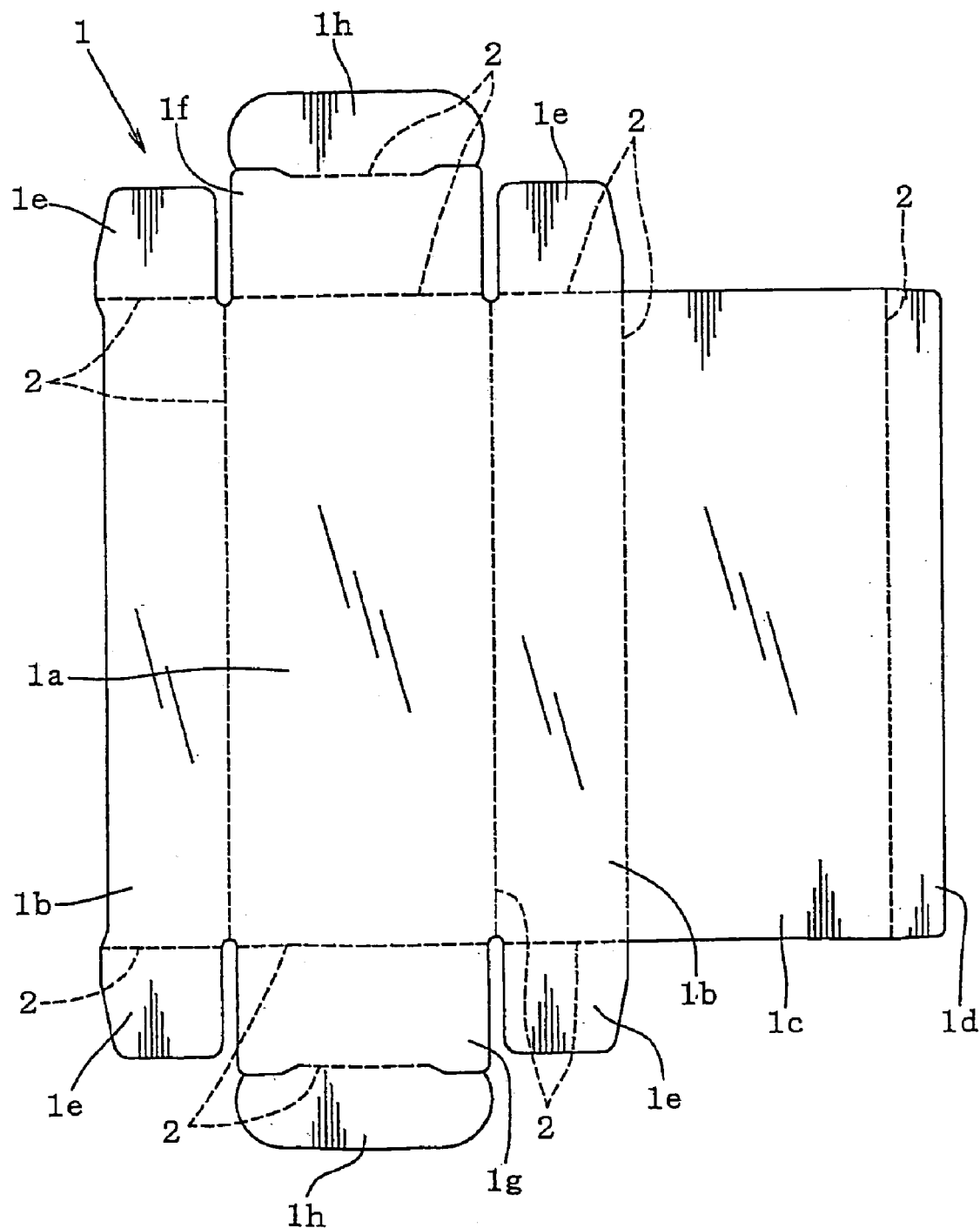
FIG. 1 is a developed view of plastic sheet with folding rules.

Preferred embodiments of the invention are described below while referring to the accompanying drawings.

FIG. 1 to FIG. 13 relate to a first preferred embodiment of plastic sheet 1 with folding rules and rule cutter 6 for plastic sheet used in a package container for accommodating commodities, and in FIG. 1, this plastic sheet 1 is a transparent or translucent plastic sheet of about 0.3 mm in thickness, and the plastic sheet is cut in a developed shape of packaging container (see FIG. 2), or after cutting, concave folding rules 2 are formed by a rule cutter 6 described below, in the folding portions corresponding to right and left sides 1b consecutive to both edges of front part 1a of square shape as seen from the front side, rear part 1c consecutive to the right edge of one side part 1b, junction 1d consecutive to the right edge of rear part 1c, folding parts 1e ... consecutive to upper and lower edges of the side part 1b, upside 1f consecutive to the upper edge of the front part 1f, downside 1g consecutive to the lower edge, and folding part 1h consecutive to the upside 1f and downside 1g. Besides, holes (not shown) for supporting the plastic sheet 1 assembled in the container form maybe provided in support parts (not shown) consecutive to the upper edge of the rear part 1c.

Folding rules 2 formed in the folding portions of the plastic sheet 1 are formed in a V-shape as seen from the longitudinal direction, as shown in FIG. 3 to FIG. 6, by a pair of side parts 2a inclined by a specified angle and opposite to each other, and bottom 2b consecutive to one end of side parts 2a, 2a, and grooves 3 shallower than the maximum depth of folding rules 2 by a specified rate are formed at specified intervals in the longitudinal direction along the bottom 2b of the folding rules 2, and grooves 4 deeper than the shallow grooves 3 by a specified rate are formed in a plurality (four in this embodiment) in the longitudinal direction along the bottom 2b between the shallow grooves 3, 3. The thickness of the bottom 2b is in a range of about 0.3 mm to about 0.08 mm. The number of grooves 4 may be also less than four or more than four.

The shallow grooves 3 and deep grooves 4 are formed in semicircular or arc section having a smooth curvature as seen from the side, pitch interval A1 of shallow grooves 3 is set at about 1.1 mm, pitch interval B1 of deep grooves 4 is set at about 0.2 mm, pitch interval B1a between shallow grooves 3 and deep grooves 4 is set at about 0.25 mm, width C1 of shallow grooves 3 is set wider than deep grooves 4, width D1 of deep grooves 4 is set narrower than shallow grooves 3, depth E1 of shallow grooves 3 is set at about 0.13 mm, and depth F1 of deep grooves 4 is set at about 0.05 mm.

Width G1 of bottom 2b of folding rules 2 is in a range of about 0 mm to about 0.15 mm, angle θ1 of folding rules 2 formed in folding portions of front part 1a, side part 1b, rear part 1c and junction 1d is at an angle allowed to fold in a specified direction (for example, about 43 degrees), and angle θ1 of folding rules 2 formed in folding portions of folding part 1e, upside 1f and downside 1g is at an angle allowed to fold inside and outside (for example, about 75 degrees). Folding rules 2 depending on the material, thickness, strength and hardness of the plastic sheet 1 are formed by the rule cutter 6 described below, and these folding rules 2 can be varied depending on the combination, depth and number of blades of shallow blades 7 and deep blades 8 of the rule cutter 6.

The shallow grooves 3 and deep grooves 4 may be formed in any specified sectional shape, for example, semicircular shape or arc shape having a smooth curvature as seen from the side, trapezoidal shape, quadrangular shape or triangular shape, or any shape in combination of a plurality thereof.

Figure 6:
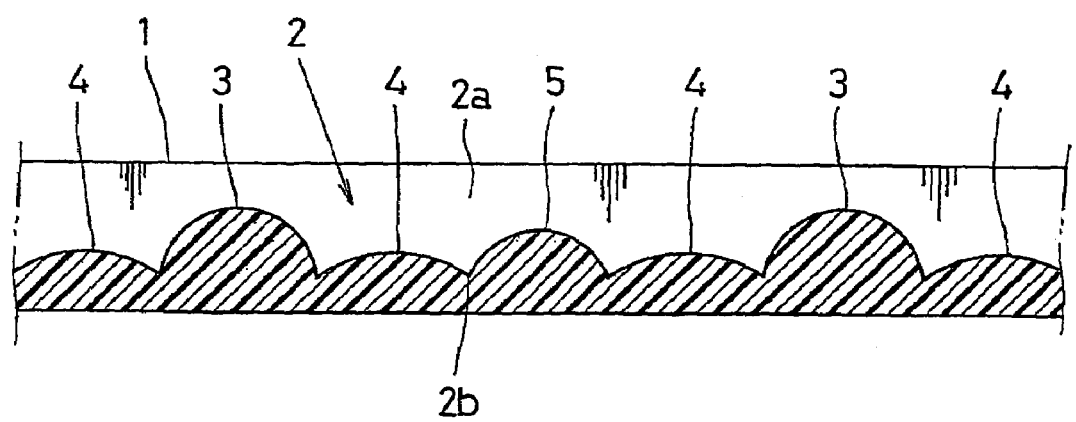
FIG. 6 is a longitudinal side view of other groove shape of folding rules.

FIG. 6 shows other sectional shape of folding rules 2, in which grooves 5 of medium depth deeper than the shallow grooves 3 and shallower than the deep grooves 4 are formed between shallow grooves 3, 3 at one point or in a plurality in the middle of shallow grooves 3, 3, and grooves 4, 5 are formed in different depths. Using the rule cutter 6 having blade shape corresponding to the groove shape (see FIG. 11), folding rules 2 are formed in the folding portions of the plastic sheet 1, and the same effects and actions as in the embodiment are obtained. The depth of grooves 5 may be freely changed somewhere between the shallow grooves 3 and deep grooves 4.

Figure 7:
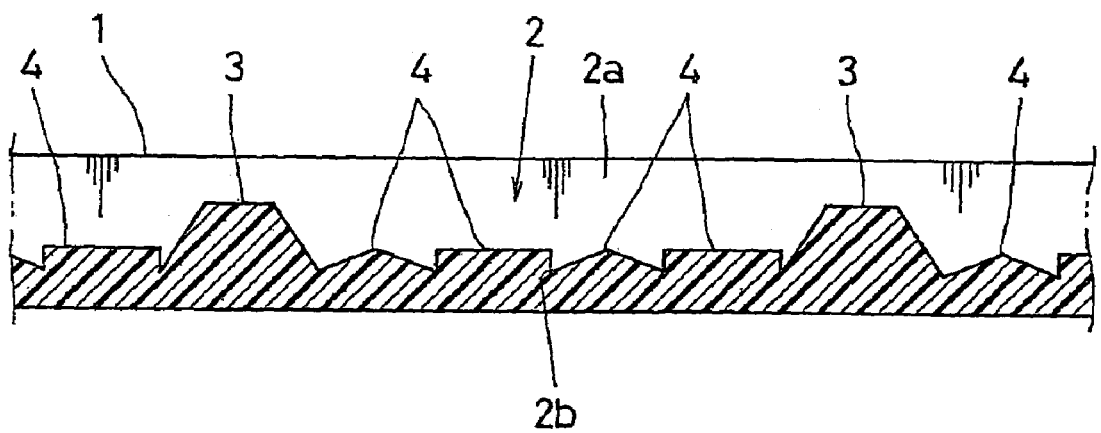
FIG. 7 is a longitudinal side view of different shape of folding rules.

FIG. 7 shows a different sectional shape of folding rules 2, in which shallow grooves 3 are formed in a trapezoidal shape as seen from the side, and deep grooves 4 are formed in quadrangular and triangular shape as seen from the side. Using the rule cutter 6 having blade shape corresponding to the groove shape (see FIG. 12), folding rules 2 are formed in the folding portions of the plastic sheet 1, and the same effects and actions as in the embodiment are obtained.

Figure 8:
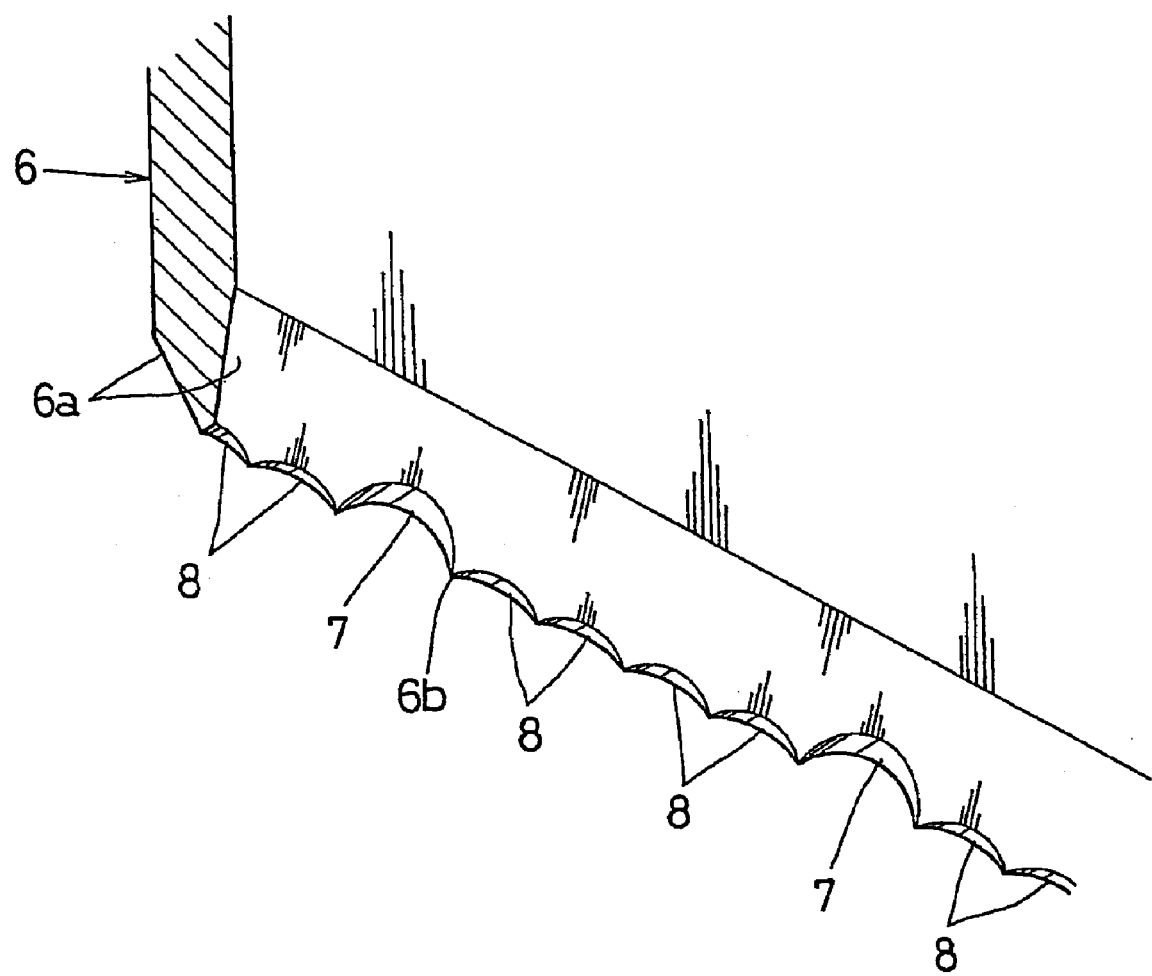
FIG. 8 is a perspective view of rule cutter for plastic sheet.
Figure 9:
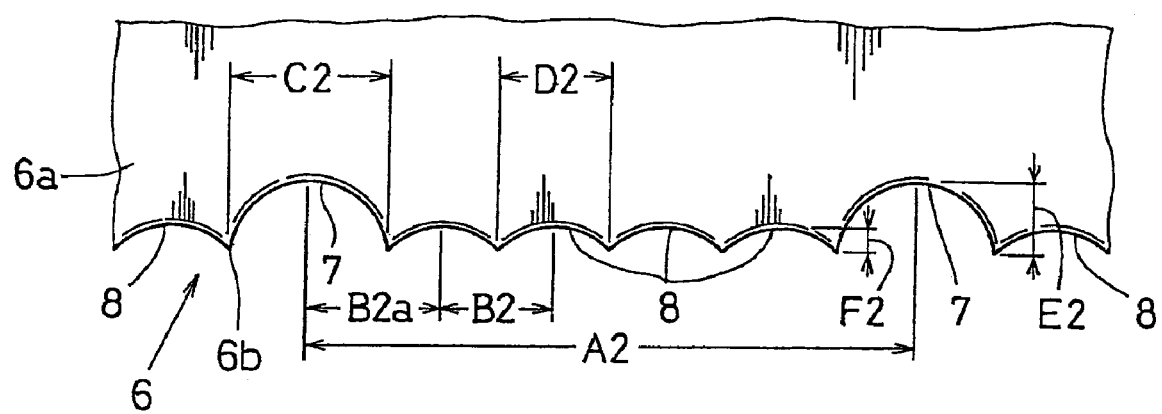
FIG. 9 is a side view of blade shape of rule cutter.
Figure 10:
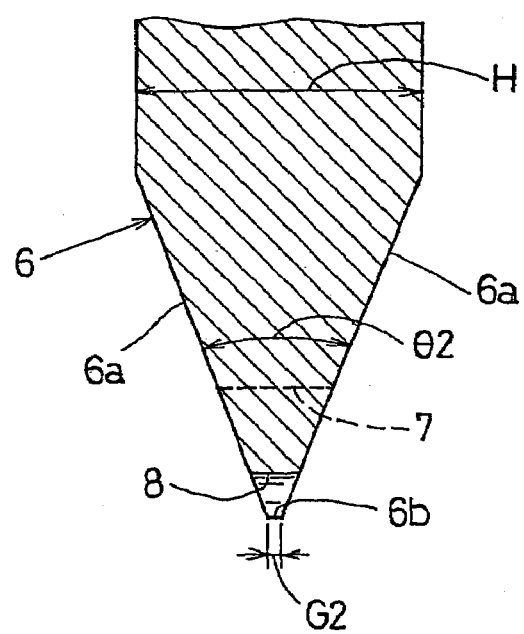
FIG. 10 is a longitudinal side view of blade shape of rule cutter.

On the other hand, the rule cutter 6 for plastic sheet used when forming folding rules 2 in the plastic sheet 1 is, as shown in FIG. 8, FIG. 9, and FIG. 10, formed in a V-shape, being composed of a pair of side faces 6a inclined at a specified angle and opposite to each other, and a narrow top face 6b consecutive to one end side of side faces 6a, 6a, in which shallow blades 7 of small infeed are formed at specified intervals in the longitudinal direction along the to face 6b of the rule cutter 6, and deep blades 8 of greater infeed than the shallow blades 7 are formed in a plurality (four in the embodiment) in the longitudinal direction along the top face 6b between the shallow blades 7,7. The number of deep blades 8 may be also less than four or more than four.

The shallow blades 7 and deep blades 8 are formed in semicircular or arc section having a smooth curvature as seen from the side by cutting means such as columnar file or wire, and pitch interval A2 of shallow blades 7 is set at about 1.1 mm, pitch interval B2 of deep blades 8 is set at about 0.2 mm, and pitch interval B2a between shallow blades 7 and deep blades 8 is set at about 0.25 mm.

Width C2 of shallow blades 7 is set wider than deep blades 8, width D2 of deep blades 8 is set narrower than shallow blades 7, height E2 of shallow blades 7 is set at about 0.13 mm, and height F2 of deep blades 8 is set at about 0.05 mm.

Width G2 of top face 6b of rule cutter 6 is set in a range of about 0 mm to about 0.15 mm, thickness H of rule cutter 6 is set in a range of about 0.5 mm to about 2.0 mm, and biting angle θ of blade tip is set at about 43 degrees.

The shallow blades 7 and deep blades 8 may be formed in any specified sectional shape, for example, semicircular shape or arc shape having a smooth curvature as seen from the side, trapezoidal shape, quadrangular shape or triangular shape, or any shape in combination of a plurality thereof.

Figure 11:
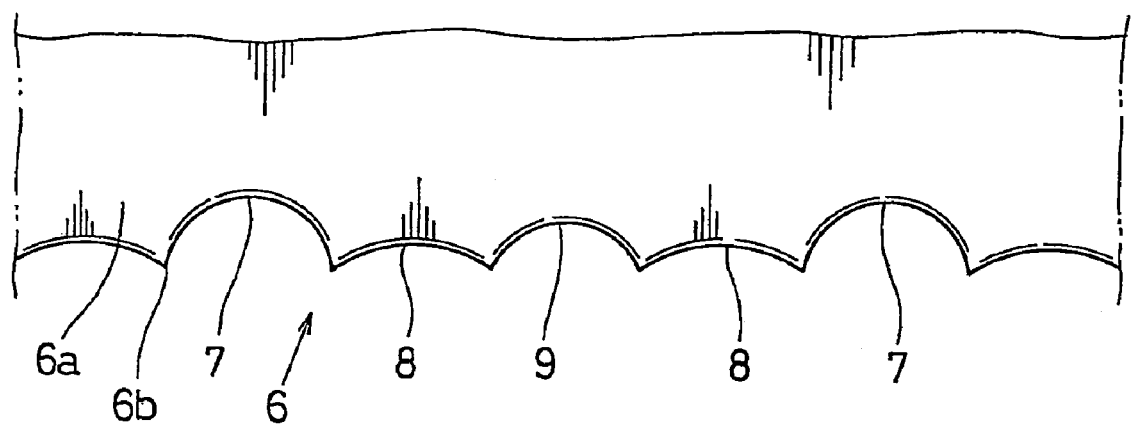
FIG. 11 is a side view of other blade shape of rule cutter for plastic sheet.

FIG. 11 shows other blade shape of the rule cutter 6 for plastic sheet, in which blades 9 of medium infeed deeper in infeed than the shallow blades 7 by a specified rate and shallower in infeed than the deep blades 8 by a specified rate are formed between shallow blades 7, 7, and by using the rule cutter 6 having blades 8, 9 of different infeed depths, folding rules 2 are formed in the folding portions of the plastic sheet 1 (see FIG. 6), and the same effects and actions as in the embodiment are obtained. The infeed of blades 9 may be freely changed somewhere between the shallow blades 7 and deep blades 8.

Figure 12:
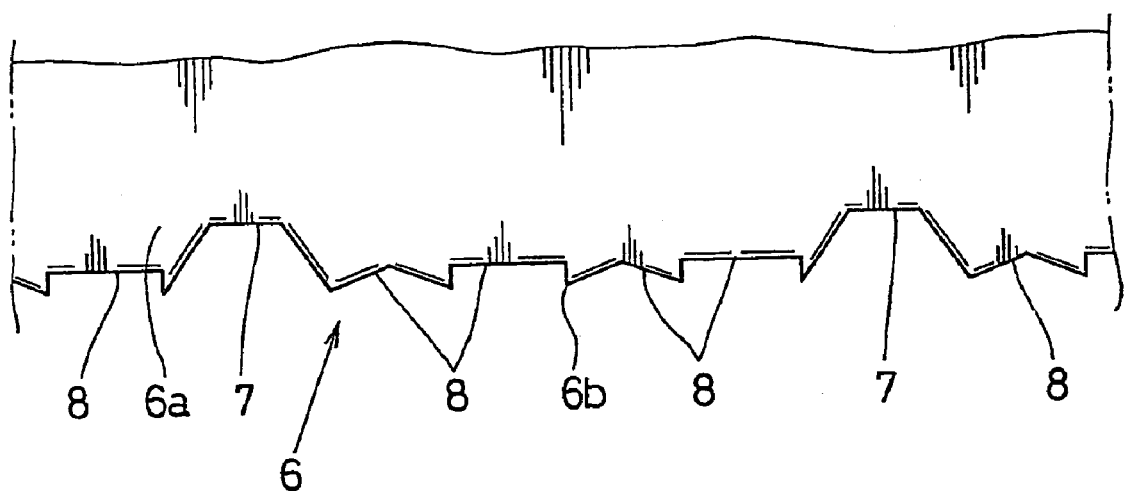
FIG. 12 is a side view of different blade shape of rule cutter for plastic sheet.

FIG. 12 shows a different blade shape of the rule cutter 6 for plastic sheet, in which shallow blades 7 are formed in a trapezoidal shape as seen from the side, and deep blades 8 are formed in quadrangular and triangular shape as seen from the side, and by using this rule cutter 6, folding rules 2 are formed in the folding portions of the plastic sheet 1 (see FIG. 7), and the same effects and actions as in the embodiment are obtained.

Figure 13:
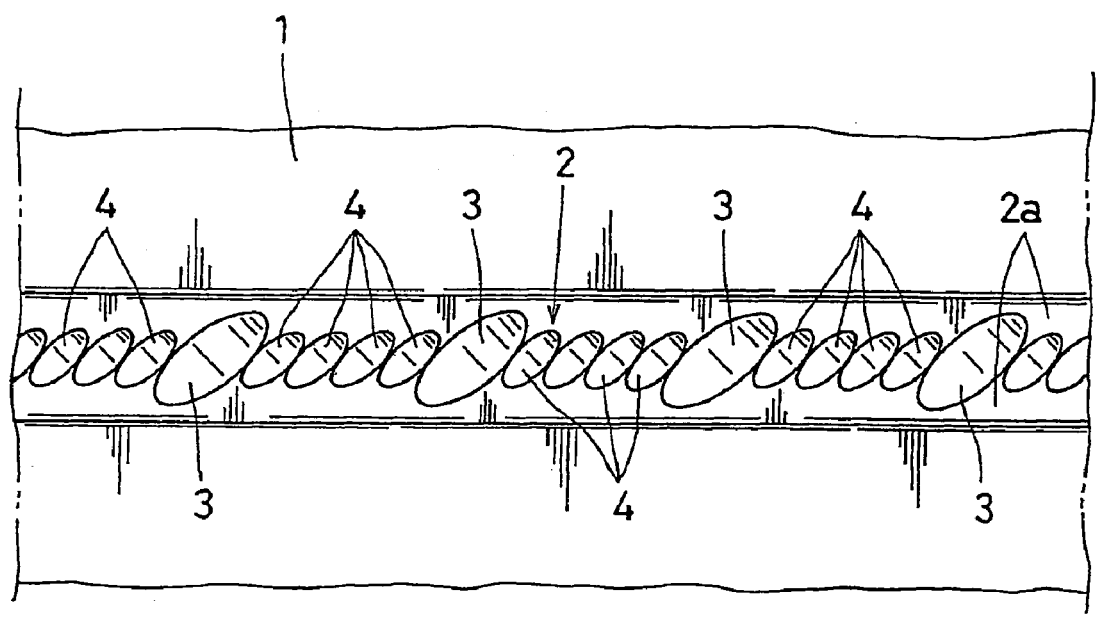
FIG. 13 is a plan view of different groove shape of folding rules.
Figure 14:
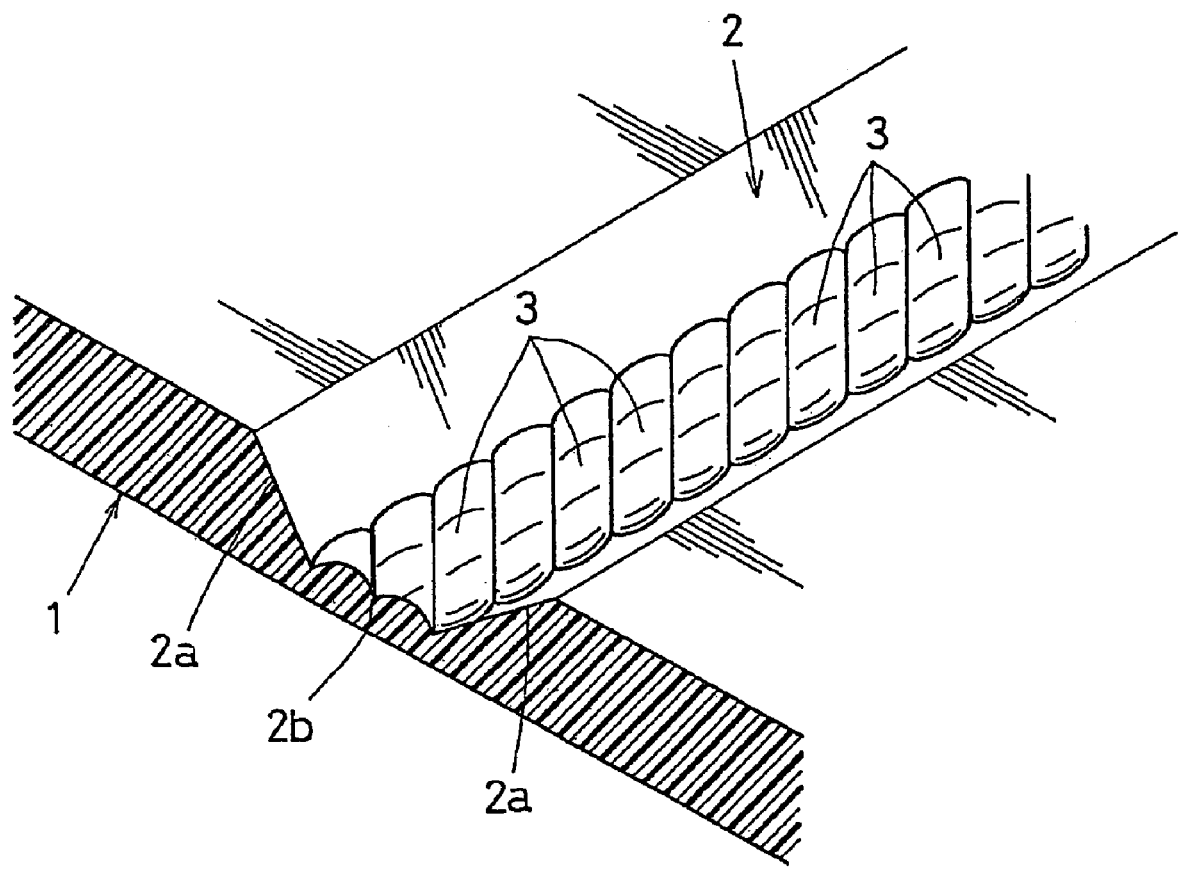
FIG. 14 is a perspective view of folding rules formed in plastic sheet.
Figure 15:
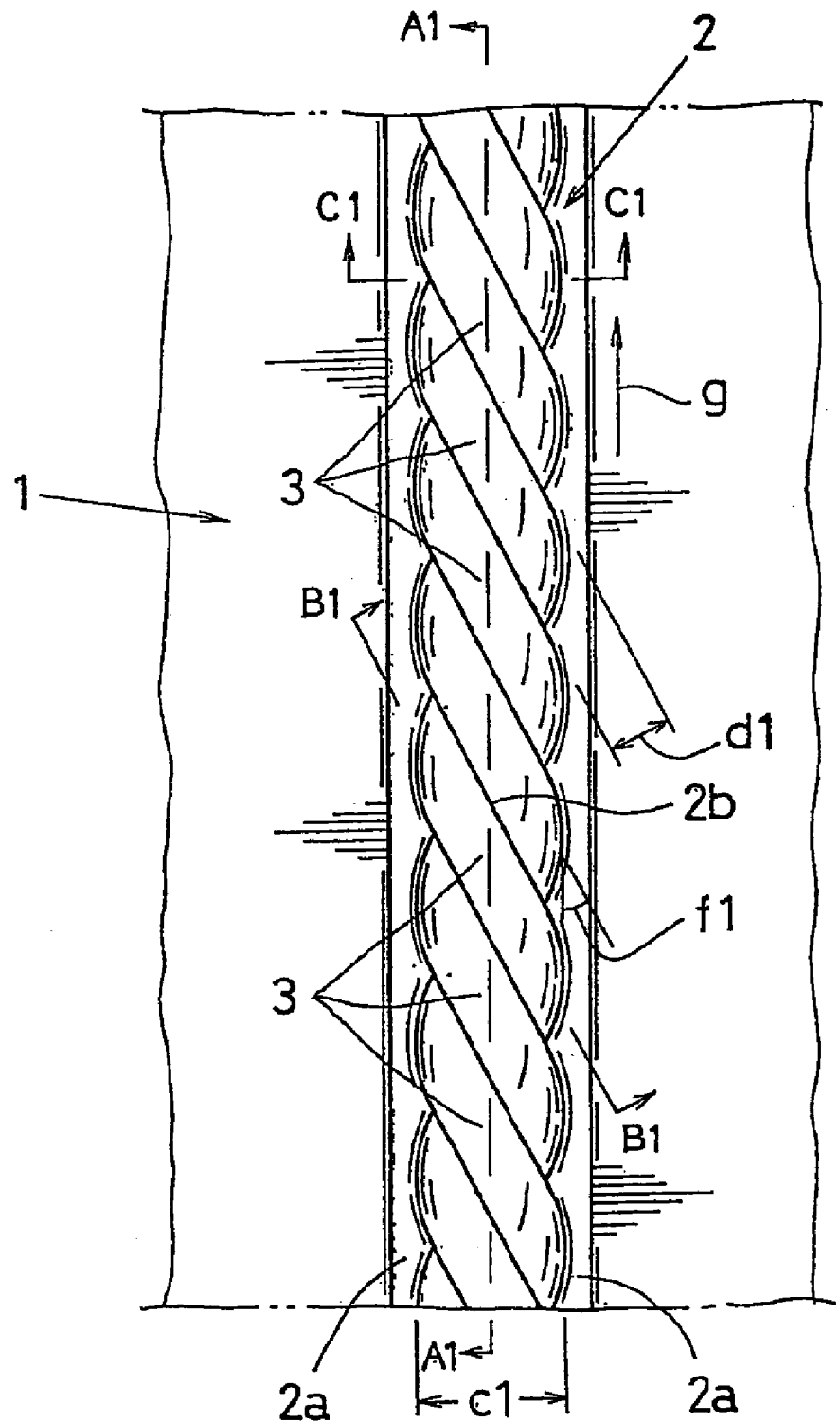
FIG. 15 is a plan view of groove shape of folding rules.
Figure 16:
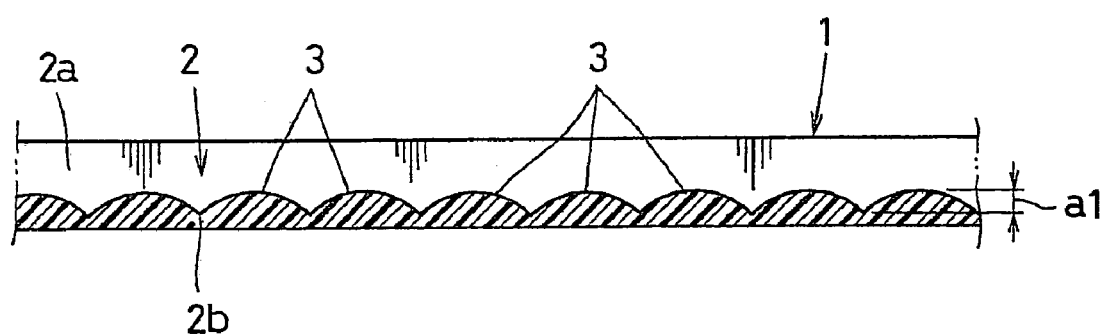
FIG. 16 is a sectional view along arrow A1—A1 of folding rules in FIG. 15.
Figure 17:
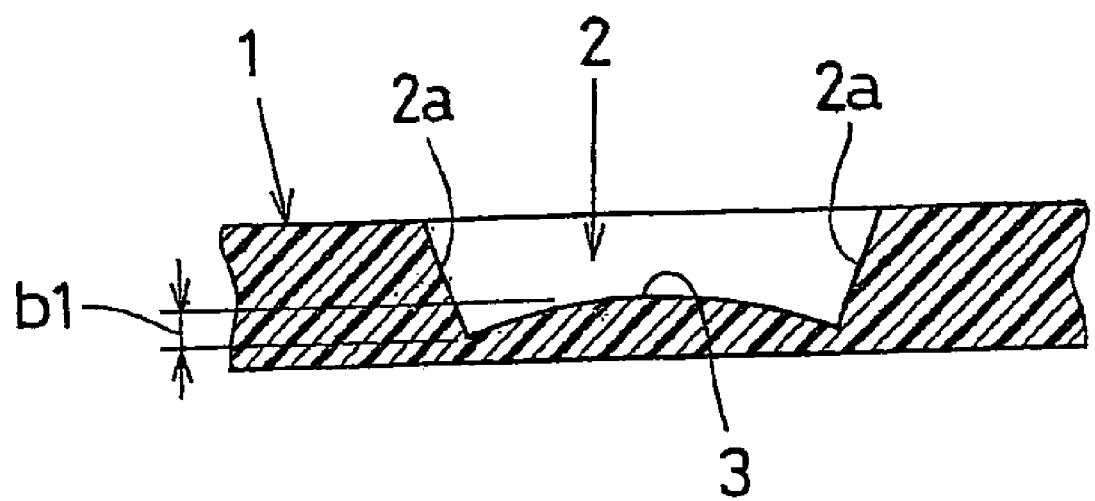
FIG. 17 is a sectional view along arrow B1—B1 of folding rules in FIG. 15.
Figure 18:
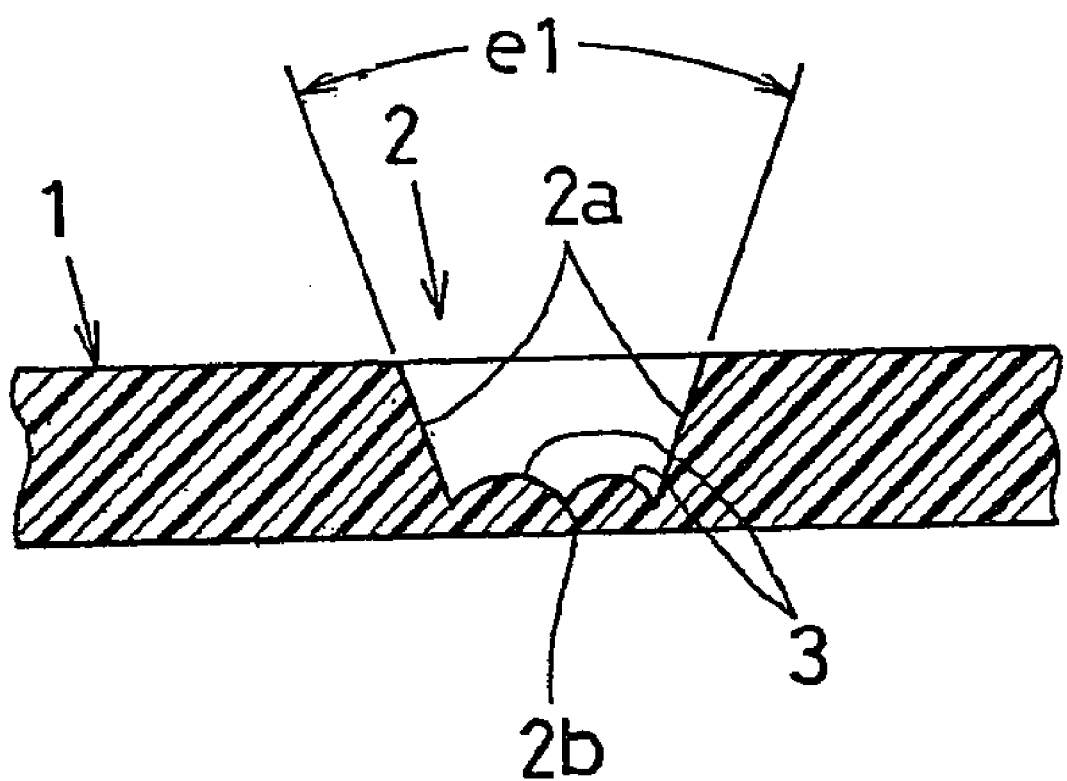
FIG. 18 is a sectional view along arrow C1—C1 of folding rules in FIG. 15.
Figure 19:
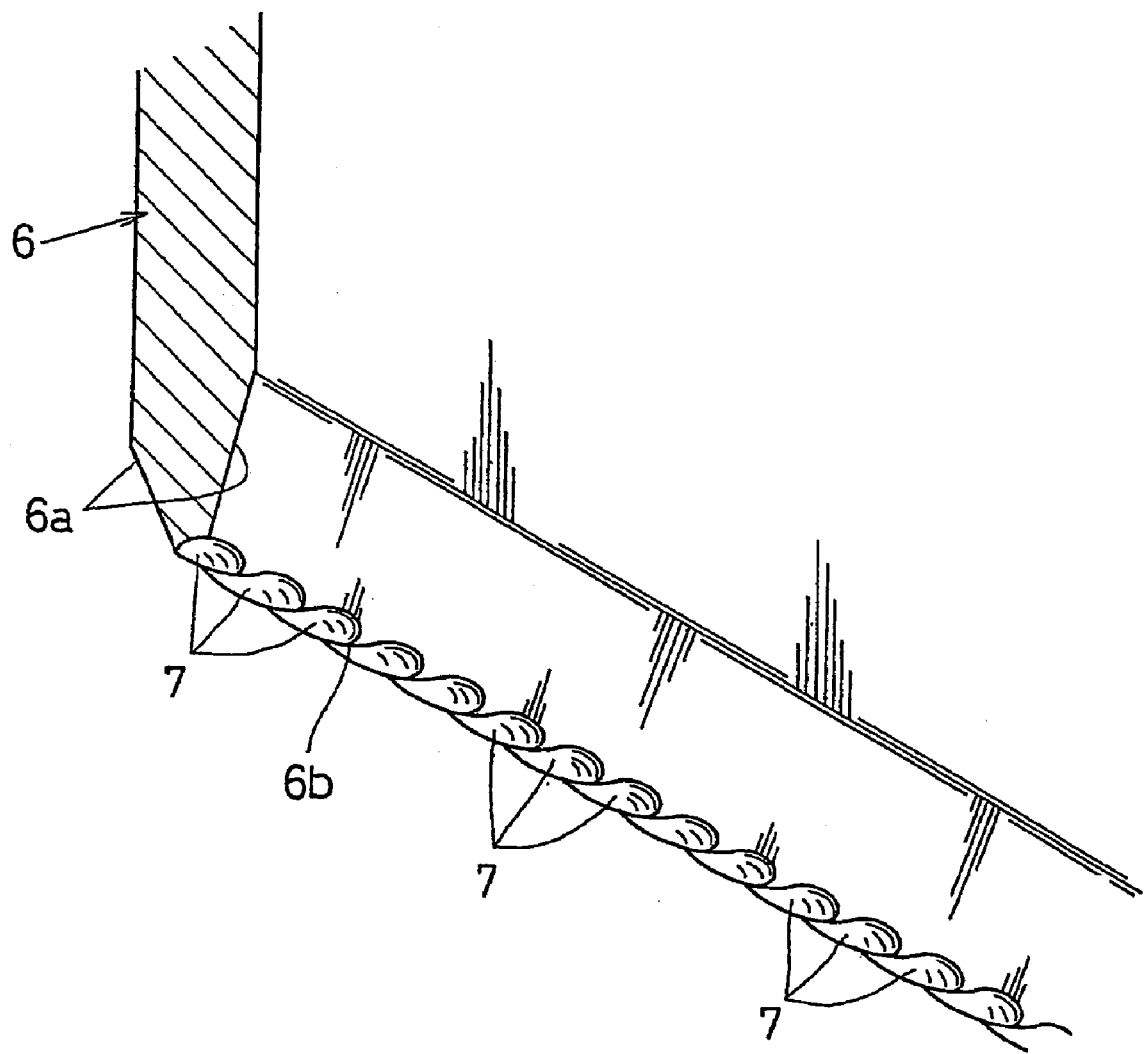
FIG. 19 is a perspective view of rule cutter for plastic sheet.
Figure 20:
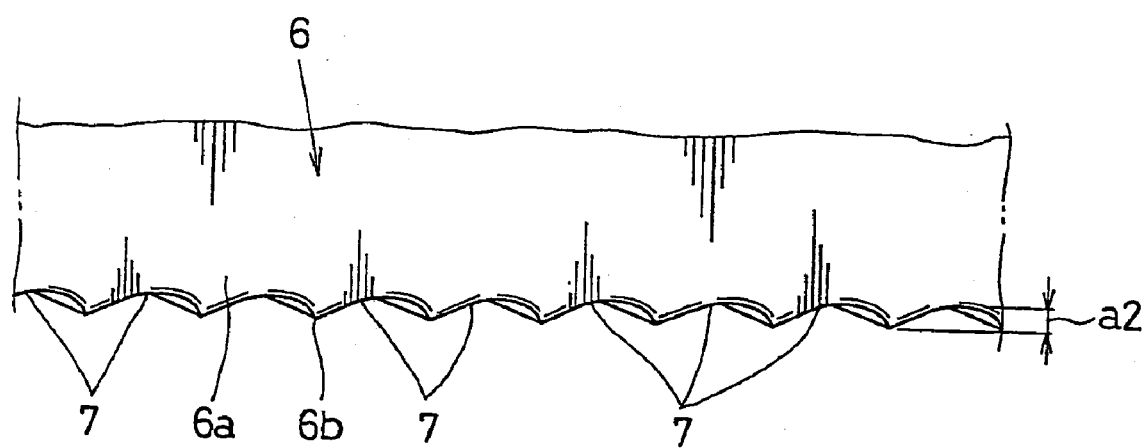
FIG. 20 is a side view of blade shape of rule cutter.
Figure 21:
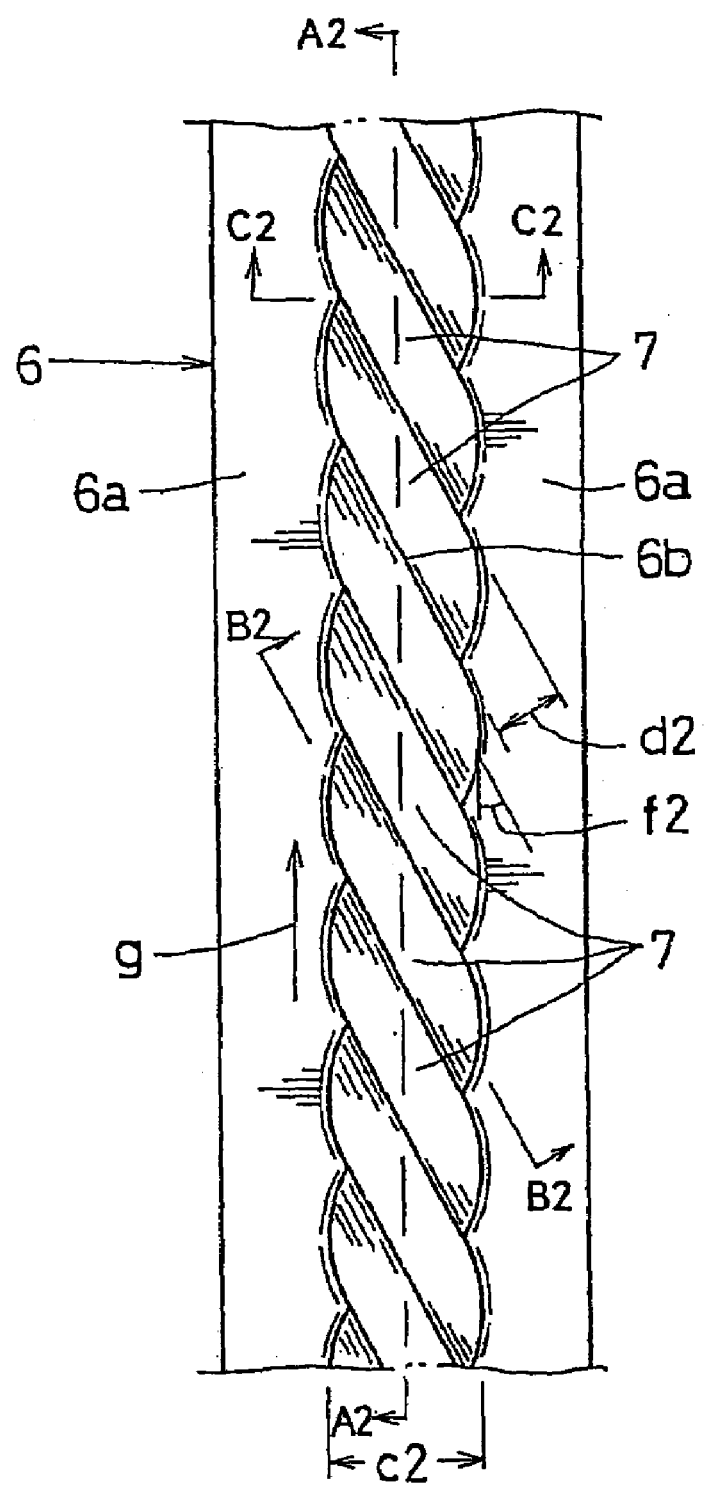
FIG. 21 is a plan view of blade tip side showing blade shape of rule cutter.
Figure 22:
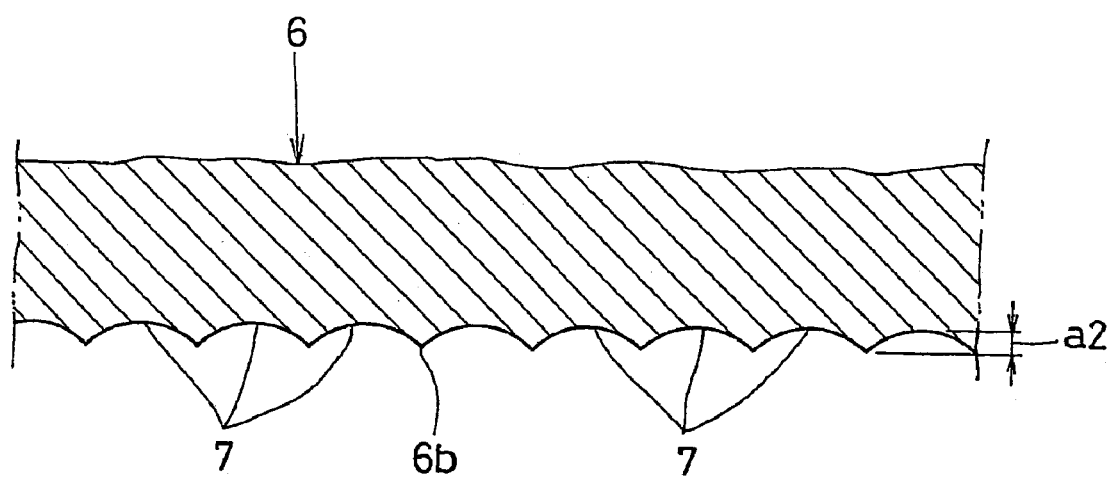
FIG. 22 is a sectional view along arrow A2—A2 of rule cutter in FIG. 21.
Figure 23:
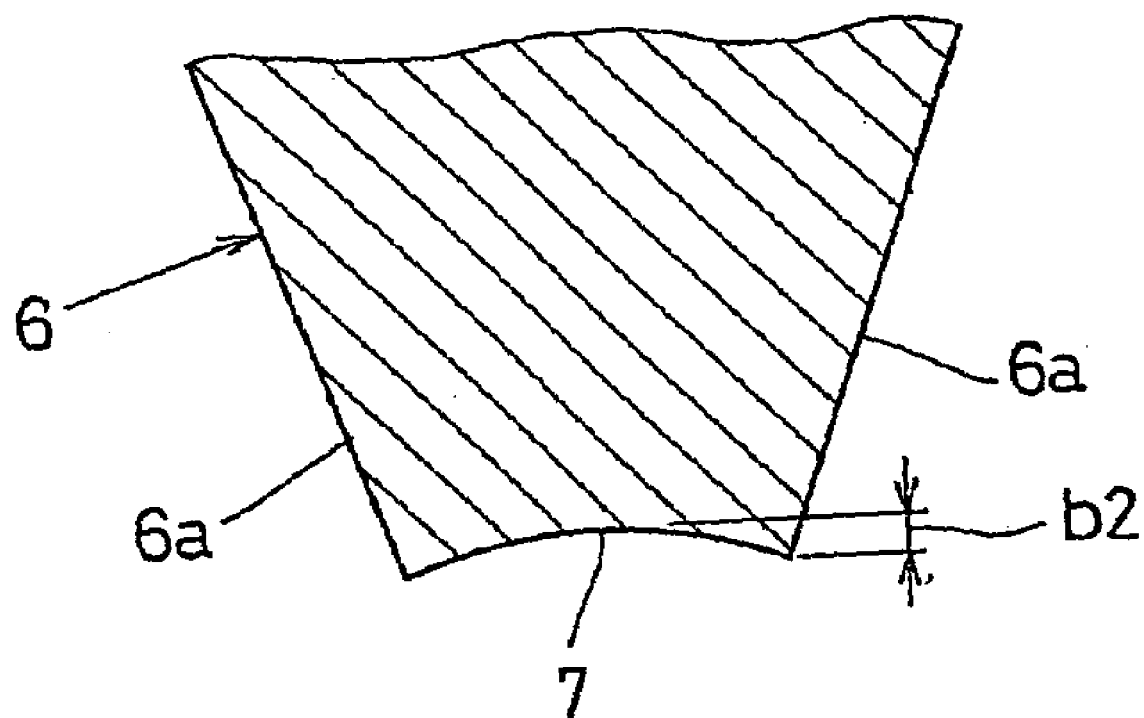
FIG. 23 is a sectional view along arrow B2—B2 of rule cutter in FIG. 21.
Figure 24:
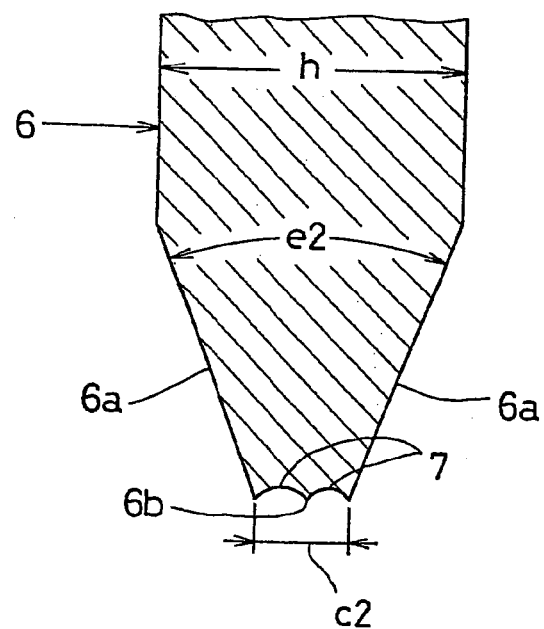
FIG. 24 is a sectional view along arrow C2—C2 of rule cutter in FIG. 21.

FIG. 13 shows other groove shape of folding rules 2 having shallow grooves 3 and deep grooves 4 . . . crossed and arranged at a specified angle in the longitudinal direction, and by using the rule cutter 6 (not shown) having shallow blades 7 and deep blades 8 crossing this arrangement at corresponding angle, folding rules 2 are formed in the folding portions of the plastic sheet 1, and the same effects and actions as in the embodiment are obtained. The arrangement of the shallow grooves 3 and deep grooves 4, and of the shallow blades 7 and deep blades 8 may be changed to acute angle or obtuse angle.

Using this rule cutter 6 for plastic sheet, the method of forming folding rules 2 in the plastic sheet 1, and the method of assembling the plastic sheet 1 provided with the folding rules 2 are explained below.

Figure 3:
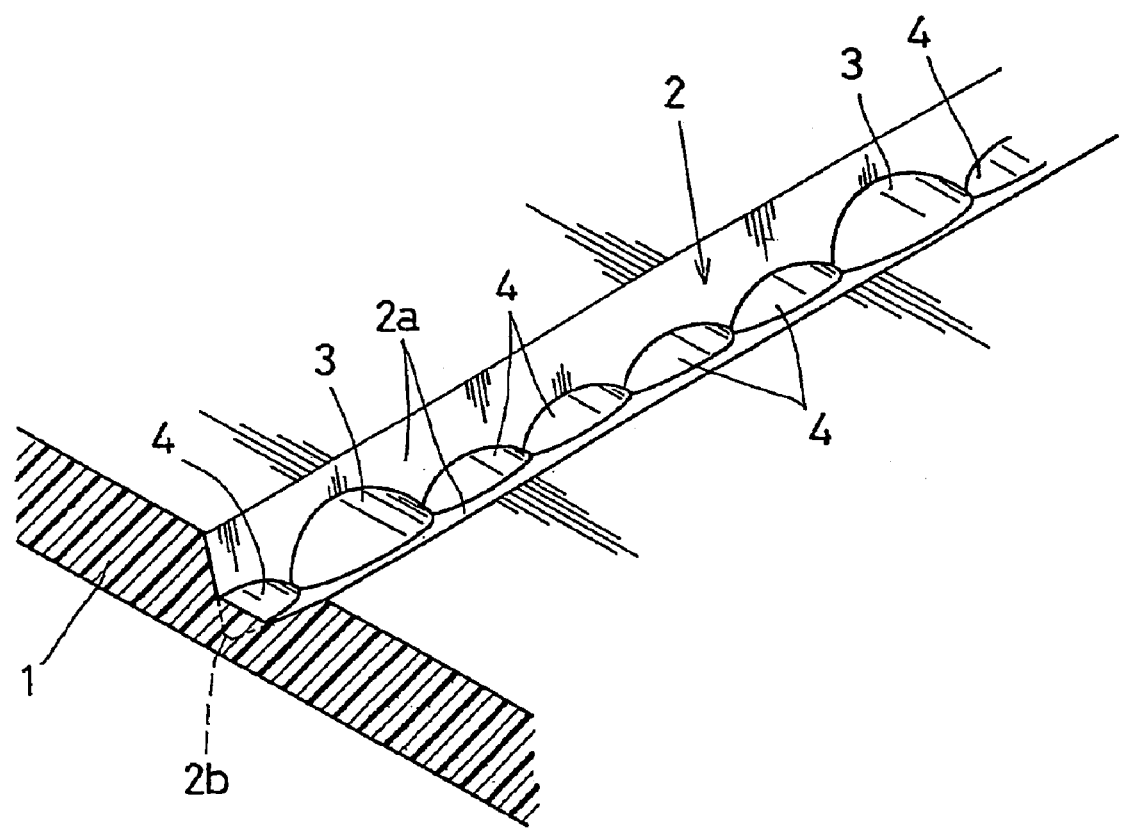
FIG. 3 is a perspective view showing folding rules formed in the plastic sheet.
Figure 4:
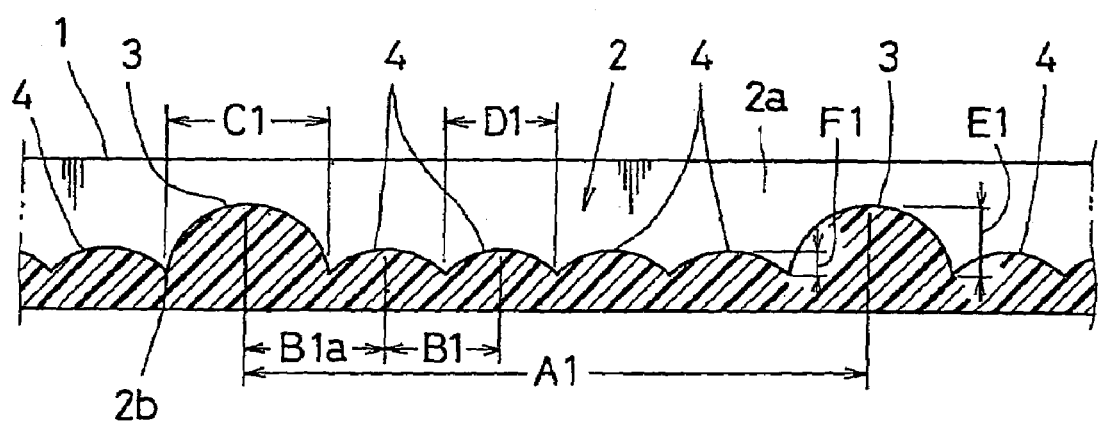
FIG. 4 is a longitudinal side view of groove shape of folding rules.
Figure 5:
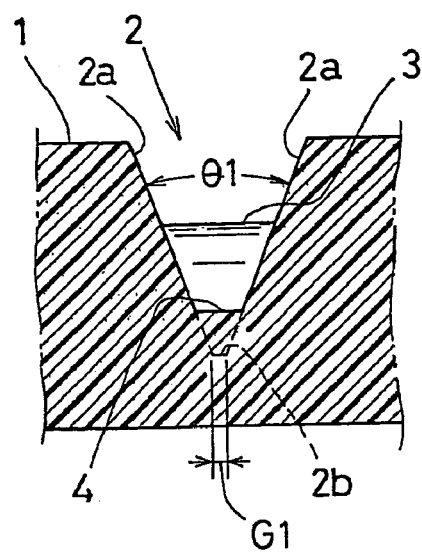
FIG. 5 is a longitudinal front view of groove shape of folding rules.

First, when forming the folding rules 2, when cutting or after cutting the plastic sheet by a blanking cutter provided in the pattern main body, the rule cutter 6 as shown in FIG. 8 is pressed to the folding portions of front part 1a, side part 1b, rear part 1c and junction 1d, and to the folding portions of folding part 1e, upside 1f, and downside 1g of the plastic sheet 1 shown in FIG. 1, at a pressure corresponding to thickness A, material, strength and hardness of the plastic sheet 1, and folding rules 2 shown in FIG. 3, FIG. 4, and FIG. 5 are formed in the folding portions of the plastic sheet 1.

Figure 2:
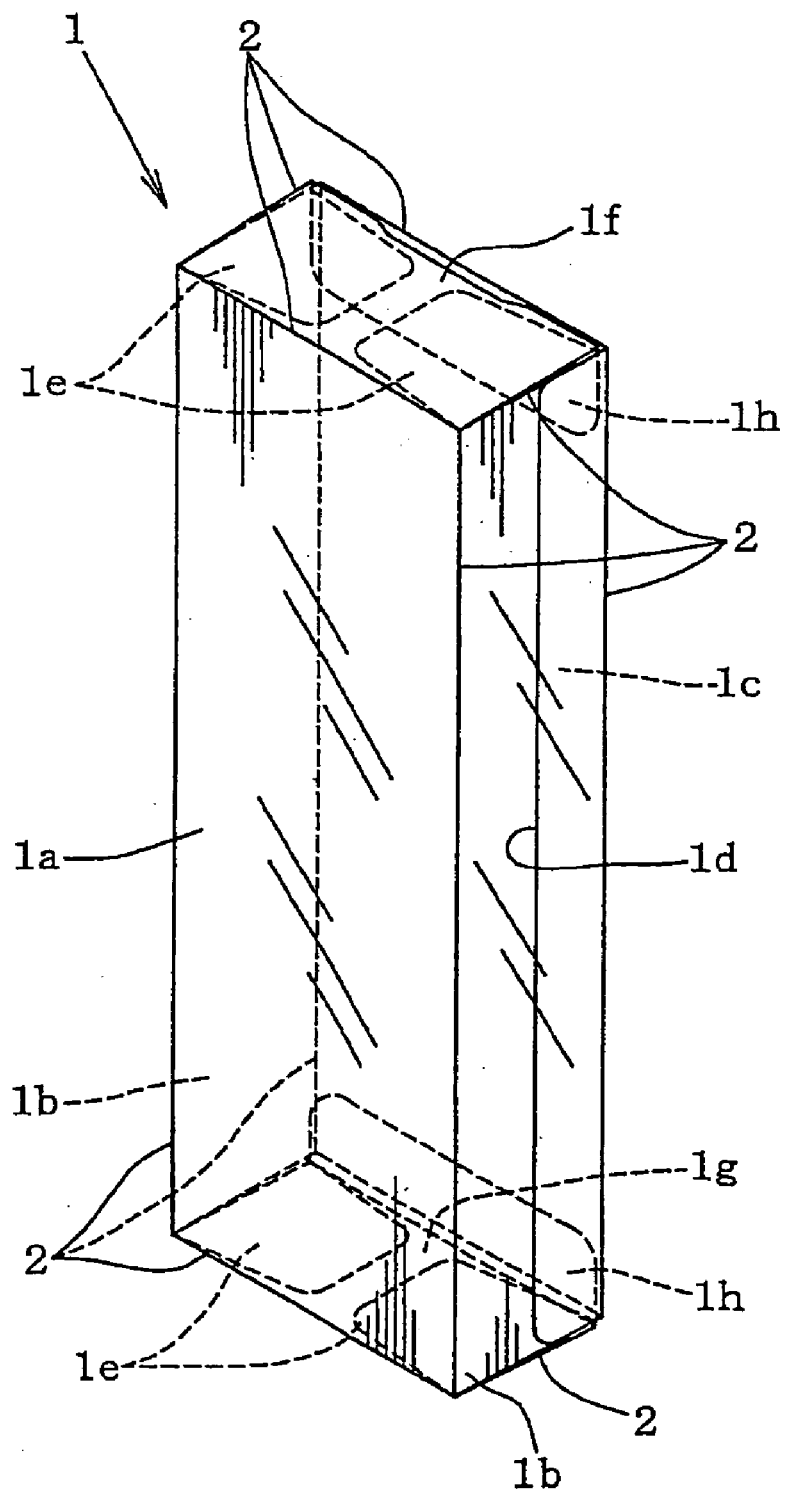
FIG. 2 is a perspective view of plastic sheet assembled in a container form.

On the other hand, when assembling the plastic sheet 1 provided with folding rules 2 into a container form of square shape as seen from the side shown in FIG. 2, the front part 1a, side part 1b, rear part 1c, junction 1d, folding parts 1e . . . , upside 1f and downside 1g are folded in specified direction and angle along the folding rules 2, the junction 1d consecutive to one side part 1b and other side part 1b are adhered and fixed with an adhesive, and folding part 1e at the lower edge, upside 1f and downside 1g are folded inside and closed.

When putting in a content, the folding part 1e at upper edge, upside 1f and downside 1g are once folded outside to open, and closed after putting in the content, and therefore it can be assembled by an automatic box making machine (not shown) or the content can be easily put in by using an automatic packing machine (not shown). The junction 1d may be joined and fixed by fusion or high frequency fusion.

Thus, by using a specified number of rule cutters 6, folding rules 2 forming a plurality of deep grooves 4 between shallow grooves 3, 3 are formed in the folding portions of the plastic sheet 1, and as compared with continuous formation of thin portions, the stress in the surface direction applied to the plastic sheet 1 is smaller, and occurrence of warp or corrugation can be suppressed, and the folding process of plastic sheet 1 and assembling process of packaging container can be done mechanically, and the labor is saved and the efficiency is enhanced. Moreover, a smaller pressure is required when forming folding rules 2 in the plastic sheet 1, and the processability is enhanced.

Still more, since the thickness is great and shallow grooves 3 are formed at specified intervals, enough folding strength is maintained, and tearing of plastic sheet 1 along folding rules 2 can be prevented. Besides, deep grooves 4 of small thickness are formed in a plurality between shallow grooves 3, 3, portions of high molecular density are dispersed, and favorable folding property and flexibility are obtained, and if the plastic sheet 1 is folded at an acute angle, tear or pore is not formed, and if a pore is formed, since the diameter is small, foreign matter hardly invades, and loss of commercial value or sanitation can be prevented.

In addition, the shallow grooves 3 and deep grooves 4 are formed on a smooth curvature, hand touch is excellent, and cloth or skin will not be caught if contacting, and the appearance of folding portions is clear and less obvious, and it is excellent in design.

FIG. 14 to FIG. 27 relate to a second preferred embodiment of plastic sheet 1 with folding rules and rule cutter 6 for plastic sheet, in which folding rules 2 to be formed in folding portions of the plastic sheet 1 are formed in a V-shape as shown in FIG. 14 to FIG. 18, by a pair of side parts 2a inclined by a specified angle and opposite to each other, and bottom 2b consecutive to one end of side parts 2a, 2a, and grooves 3 shallower than the maximum depth of folding rules 2 by a specified rate are formed continuously in a plurality in the length direction along the bottom 2b of the folding rules 2, and are inclined by a specified angle (for example, about 30 degrees) in the same direction (different direction from folding direction) as the rule forming direction g of folding rules 2, so as to be arranged in a rope pattern as seen from the plane side. The thickness of the bottom 2b is in a range of about 0.08 mm to about 0.3 mm.

The grooves 3 are formed in a groove shape gradually becoming shallower from the middle to both ends in the inclining direction, in a semicircular shape having a smooth curvature as seen from the side, and depth a1 of grooves 3 is set at about 0.1 mm, depth b1 at about 0.01 mm, width c1 at about 0.5 mm, root pitch d1 at about 0.3 mm, angle e1 at about 75 degrees, and inclination angle f1 to rule forming direction g at about 30 degrees.

On the other hand, the rule cutter 6 for plastic sheet used when forming such folding rules 2 is formed in a V-shape as shown in FIG. 19 to FIG. 24, by a pair of side parts 6a inclined by a specified angle and opposite to each other, and narrow top 6b consecutive to one end of side parts 6a, 6a, and blades 7 of concave section as seen from the side are formed in a plurality in the length direction along the top 6b of the rule cutter 6, and are inclined by a specified angle (for example, about 30 degrees) in the same direction (different direction from folding direction) as the rule forming direction g of the rule cutter 6, so as to be arranged in a rope pattern as seen from the blade tip side.

The blades 7 are formed in a groove shape gradually becoming shallower from the middle to both ends in the inclining direction by cutting means such as columnar file or wire, in a semicircular shape having a smooth curvature as seen from the side, and height a2 of blades 7 is set at about 0.1 mm, height b2 at about 0.01 mm, width c2 at about 0.5 mm, blade tip pitch d2 at about 0.3 mm, biting angle e2 in a range of about −20 degrees to about 120 degrees (for example, about 75 degrees), angle f2 at inclination of about 30 degrees to rule forming direction g, and thickness h of rule cutter 6 in a range of about 0.5 mm to about 2.0 mm.

Depending on the material, thickness, strength and hardness of the plastic sheet 1, dimensions (depth, height, width, angle, etc.) of grooves 3 composing the folding rules 2 and blades 7 composing the rule cutter 6 may be varied.

When forming the folding rules 2 in the folding portions of the plastic sheet 1, same as in the first preferred embodiment, the folding rules 2 having shallow grooves 3 . . . arranged in a rope pattern are formed in the folding portions of the plastic sheet 1 by using the rule cutter 6, and same effects and actions as in the first preferred embodiment are obtained. Besides, the grooves 3 . . . are small in step difference and are inclined in the rule forming direction, and if the folding portions of the plastic sheet 1 are touched by hand, roughness is hardly felt, and the touch of the package container is smooth. A piece of clothes is not caught or torn, and folding rules 2 are not broken.

Since the forming portions of grooves 3 are expanded in an oblique direction, the molecular density is not raised in these portions, and if folding force is applied to thin portions (deep portions), they are hardly torn, even in the case of plastic sheet 1 of low elongation such as biodegradable plastics, the folding rules 2 can be processed simply and easily. If cracks or pores are formed, or if folding rules 2 are formed deep, the grooves 3 are deformed flatly to adhere when folding, and dust, moisture or foreign matter hardly invades, and sanitation and commercial value are not spoiled.

Further, the folding rules 2 are folded from two thin portions formed at both sides of the bottom 2b, and it is possible to fold smoothly, less likely to tear as compared with the prior art of folding at one central position in the bottom of folding rules. Still more, the volume, thickness and sectional area of the grooves 3 more than twice as compared with the folding rules 2 formed in the conventional plastic sheet 1 (Japanese Laid-open Patent No. H10-193450), and the durability is improved, and it is possible to repeat assembling and developing as many times as desired.

Figure 25:
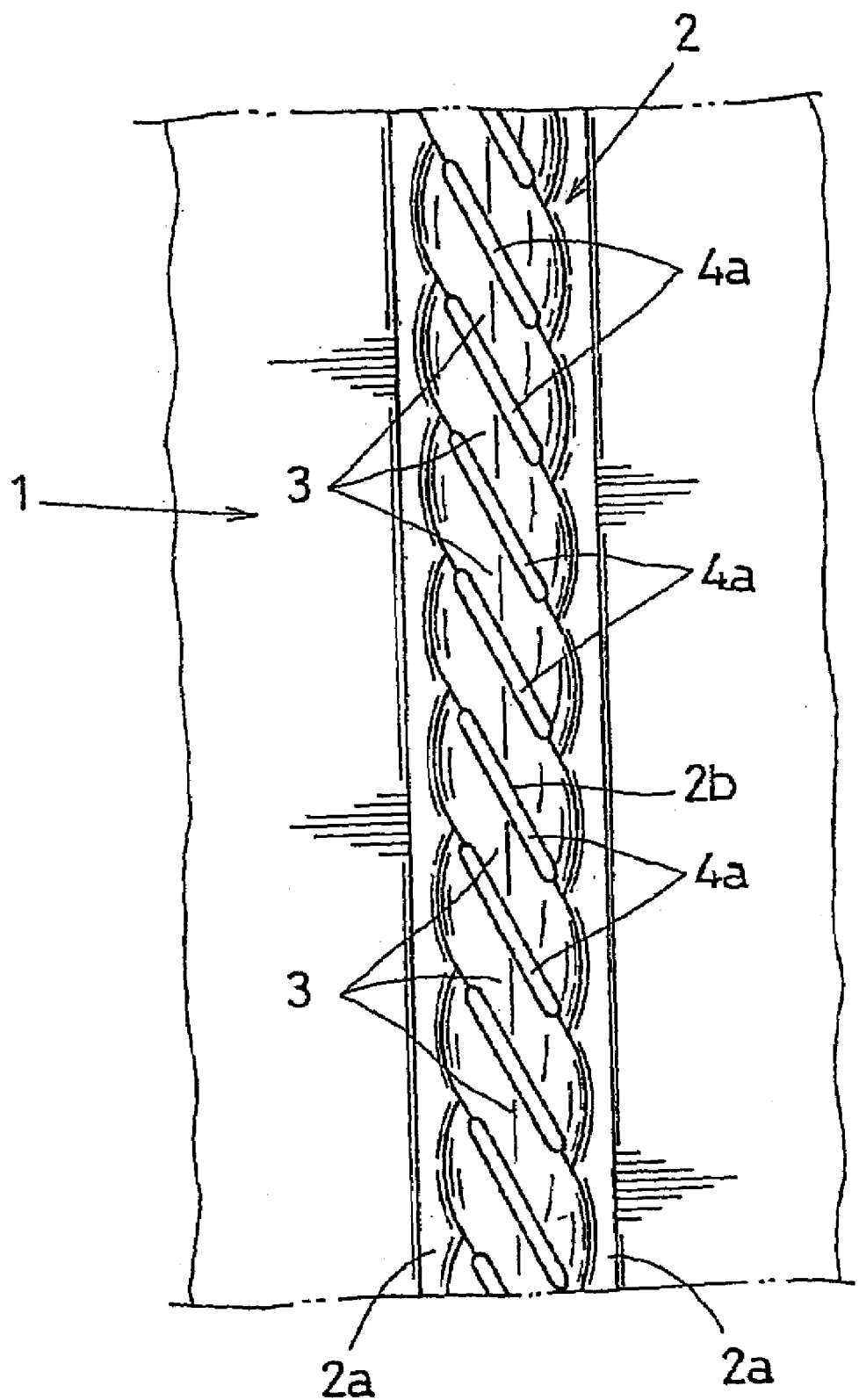
FIG. 25 is s plan view of other example of folding rules forming holes between grooves.
Figure 26:
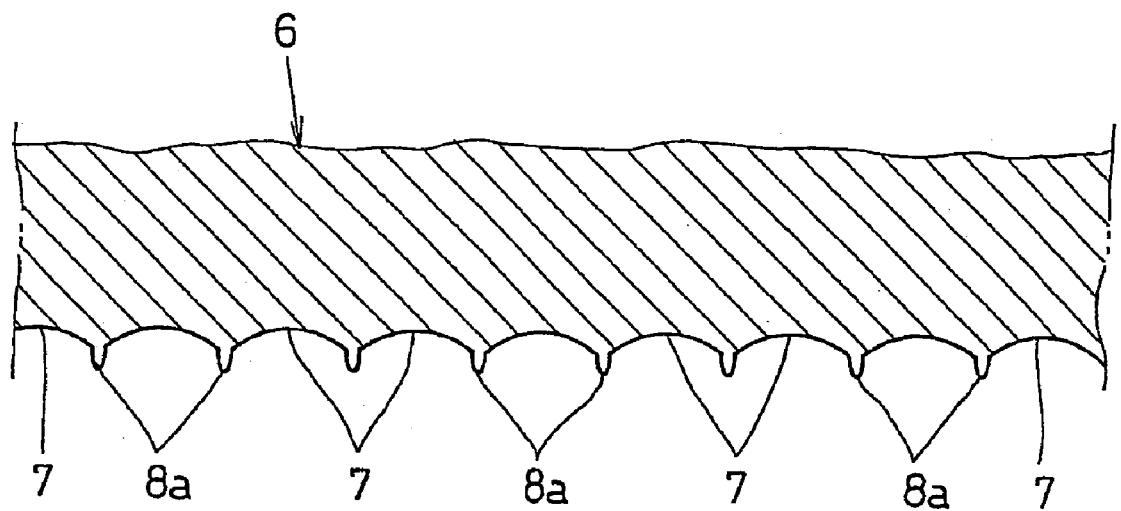
FIG. 26 is a plan view of other example of rule cutter forming protrusions between blades.

FIG. 25 shows other example of folding rules 2 forming elliptical holes 4a penetrating in the thickness direction in the bottom 2b between grooves 3 . . . at an inclination at a nearly same angle and parallel to the grooves 3, and by using the rule cutter 6 shown in FIG. 26 forming protrusions 8a corresponding to the holes 4a on the top 6b between blades 7 . . . , the folding rules 2 are formed in the folding portions of the plastic sheet 1, and hence same effects and actions as in the foregoing embodiment are obtained. When the plastic sheet 1 is folded, holes 4a . . . of the folding rules 2 are flatly deformed to adhere, and invasion of dust, moisture or foreign matter can be blocked. The holes 4a may be formed in desired shape such as round shape or square shape, and may be formed at intervals of every other one or every plurality.

Figure 27:
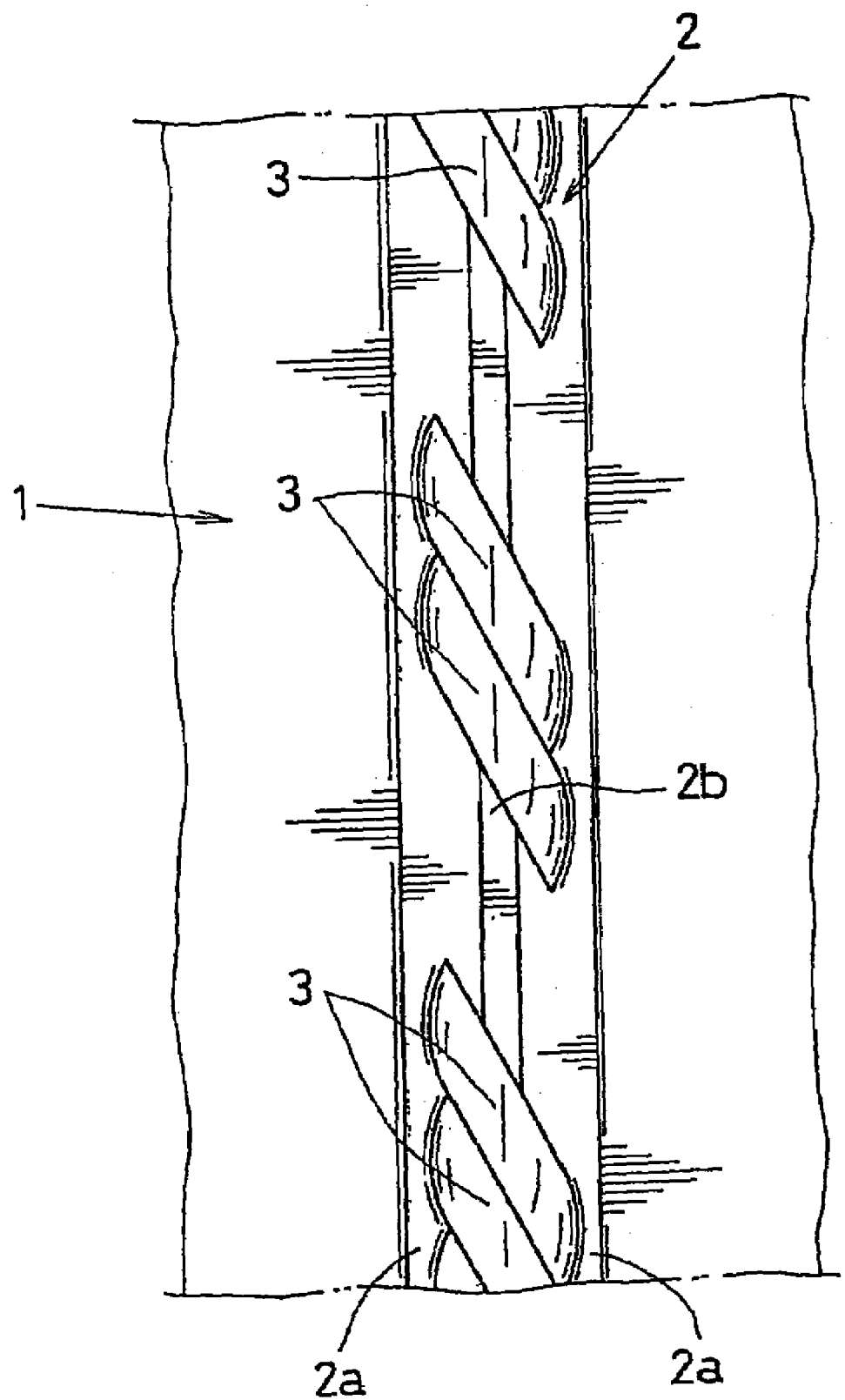
FIG. 27 is a plan view of other example of folding rules arranging plural sets of grooves.
Figure 28:
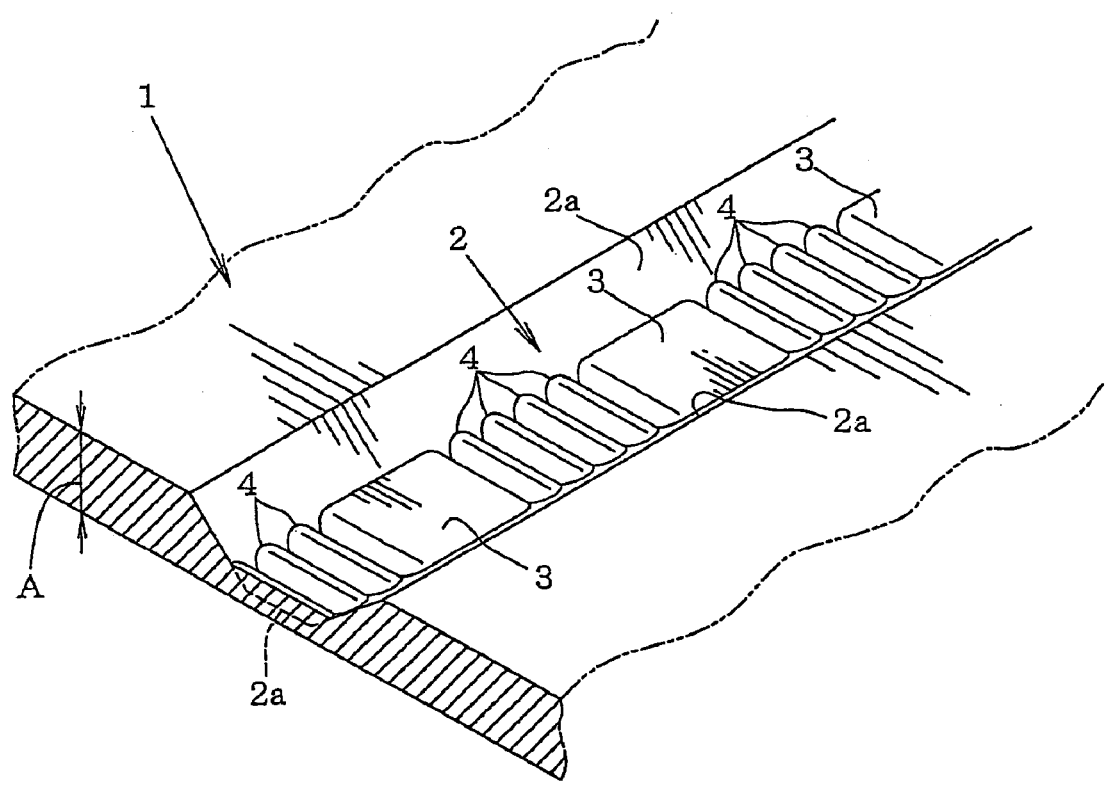
FIG. 28 is a perspective view of folding rules formed in plastic sheet.
Figure 29:
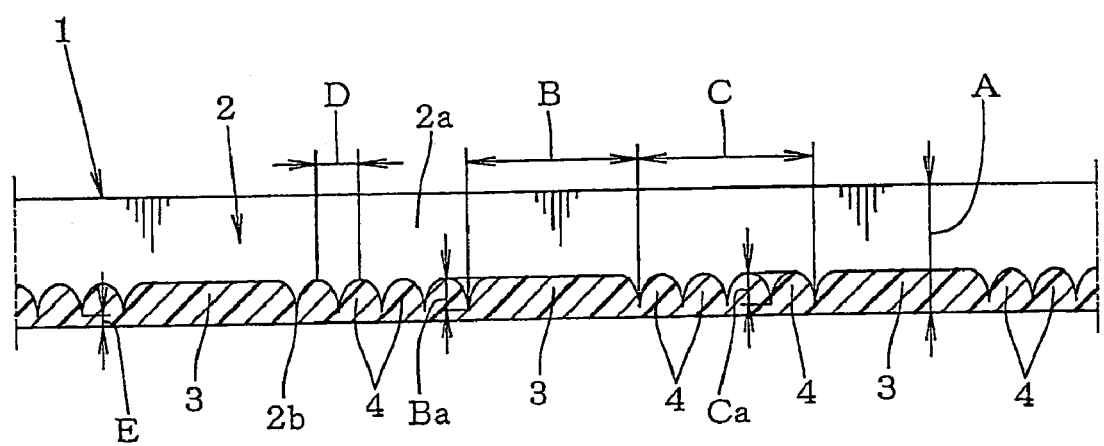
FIG. 29 is longitudinal side view of groove shape of folding rules.
Figure 30:
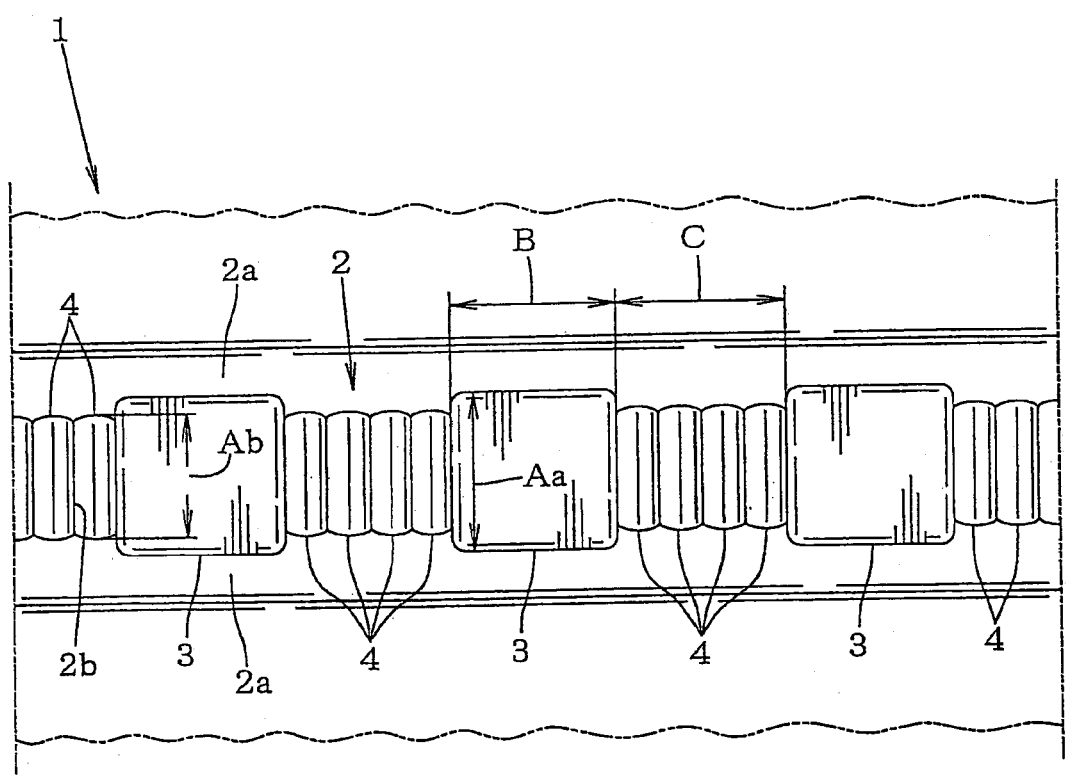
FIG. 30 is a plan view of groove shape of folding rules.
Figure 31:
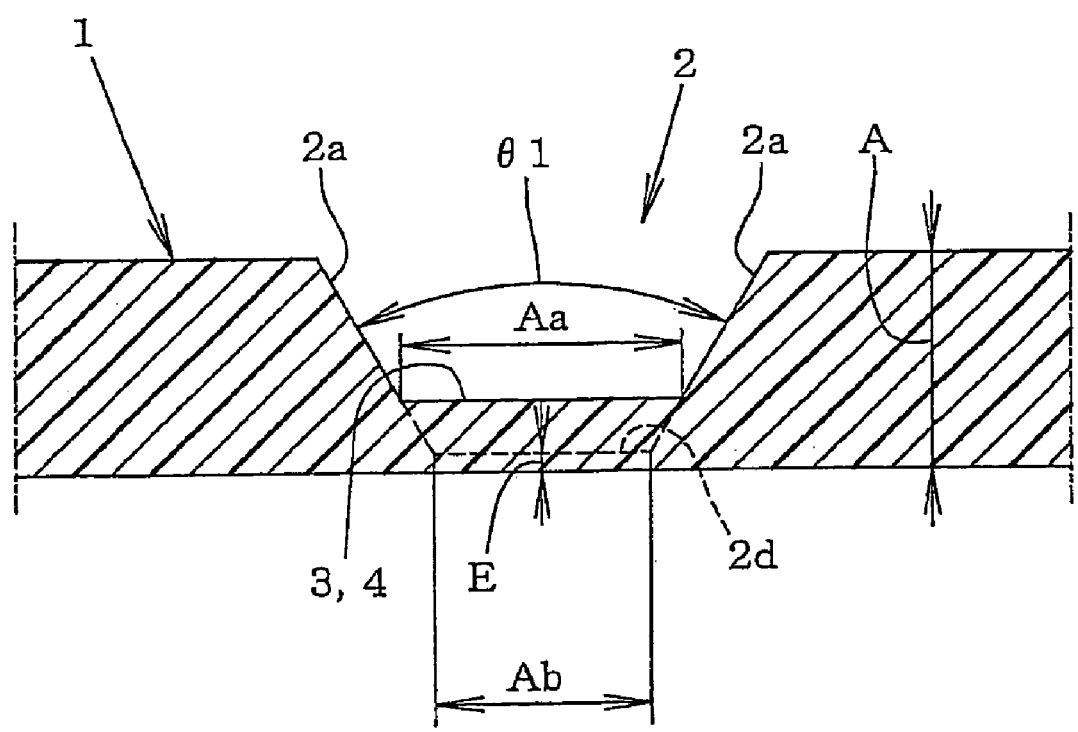
FIG. 31 is a longitudinal sectional view of groove shape of folding rules.
Figure 32:
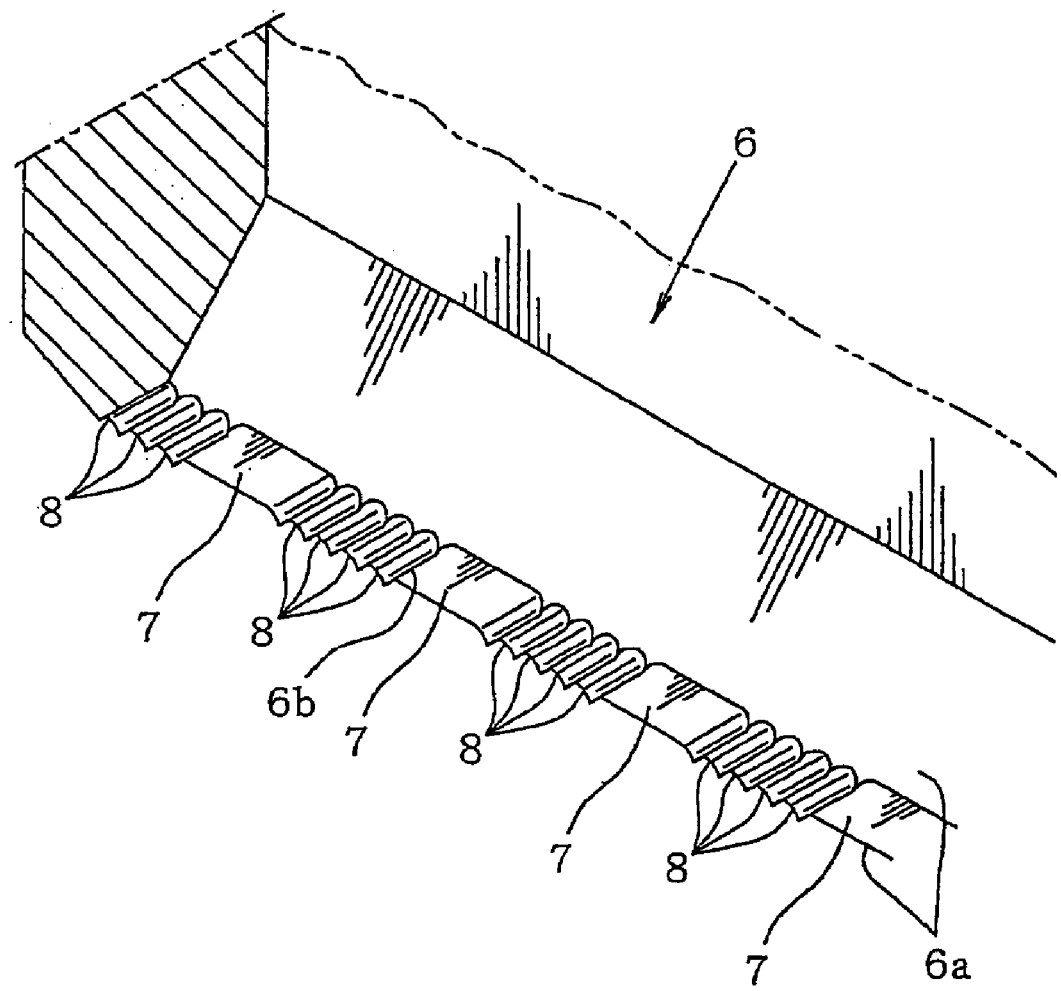
FIG. 32 is a perspective view of rule cutter for forming folding rules.
Figure 33:
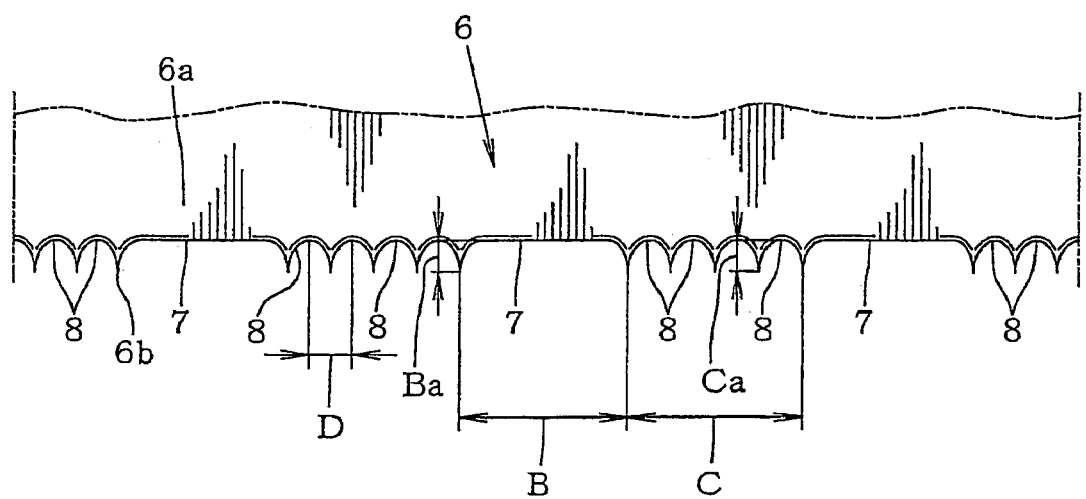
FIG. 33 is a side view of blade shape of rule cutter.
Figure 34:
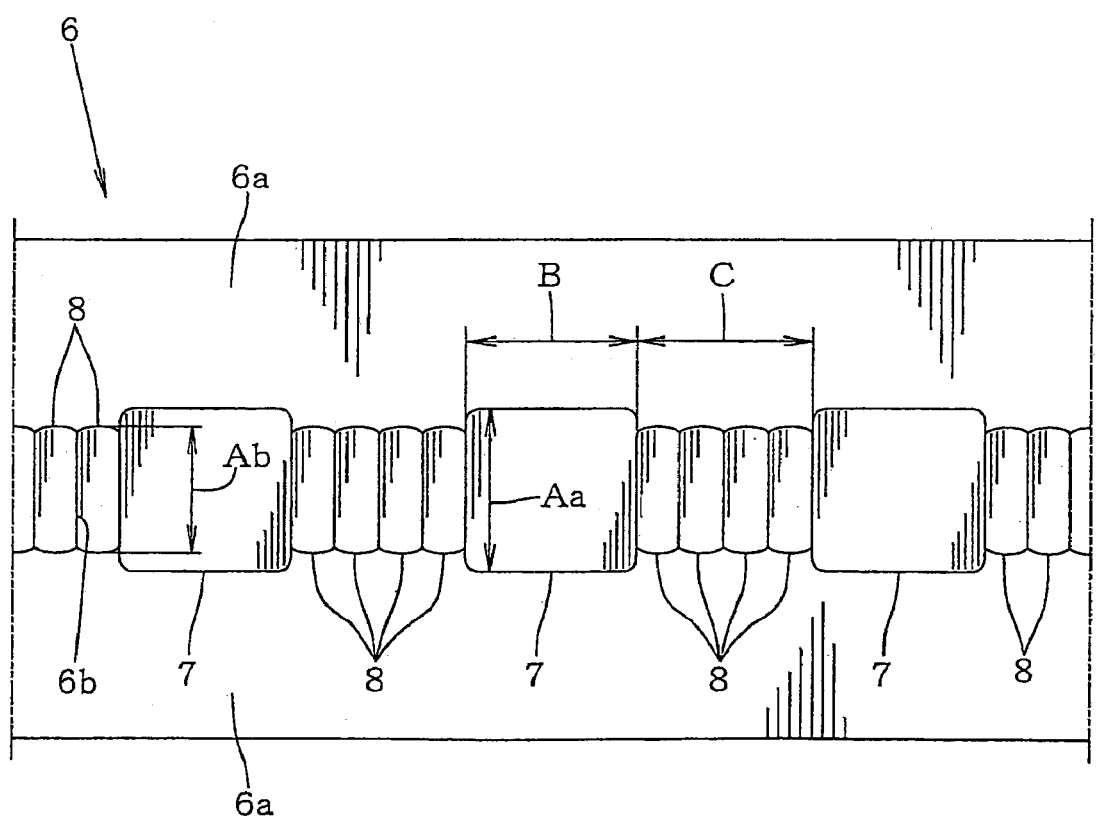
FIG. 34 is a bottom view of blade shape of rule cutter.
Figure 35:
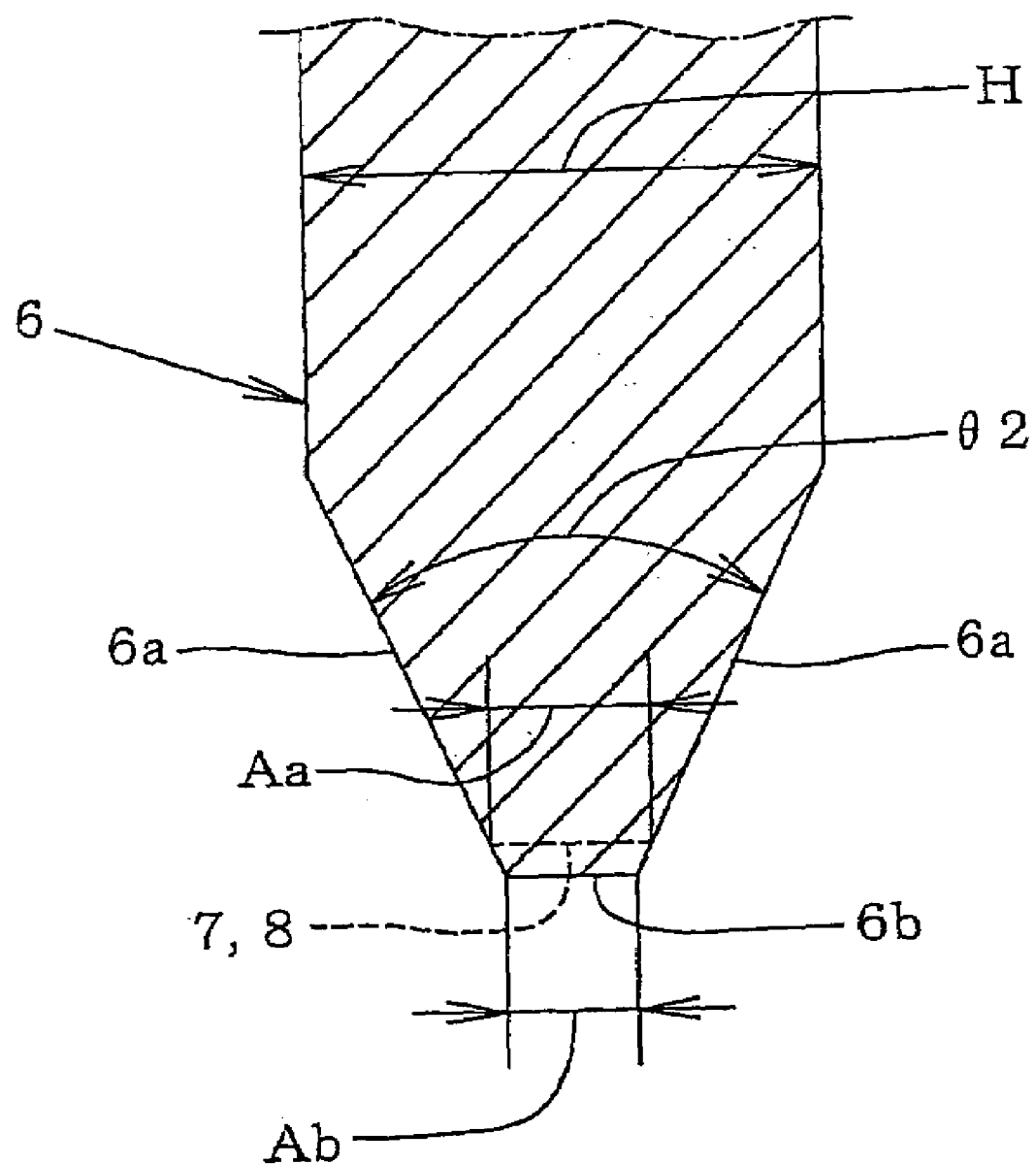
FIG. 35 is a longitudinal sectional view of blade shape of rule cutter.
Figure 36:
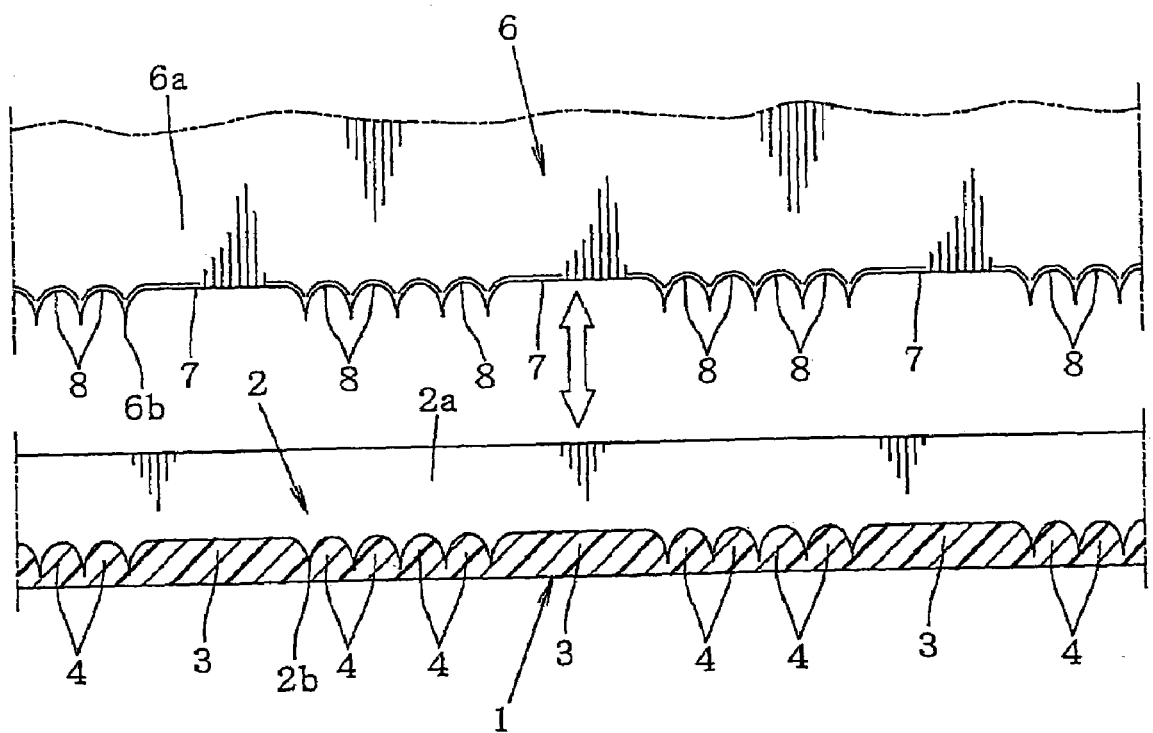
FIG. 36 is a side view of confronting state of folding rules and rule cutter.

FIG. 27 shows a different example of folding rules 2 having a set of a plurality of grooves 3 . . . arranged at specified intervals, in which folding rules 2 are formed in the folding portions of the plastic sheet 1 by using the rule cutter 6 (not shown) having a set of a plurality of blades 7 . . . arranged at specified intervals corresponding to the grooves 3, and hence same effects and actions as in the foregoing embodiment are obtained. Arrangement of grooves 3 and blades 7 is not limited to continuous arrangement as shown in the embodiment. Within the specified range of angles and dimensions, the depth, height, width, length and angle of the grooves 3 and blades 7 may be changed in every pitch.

FIG. 28 to FIG. 40 relate to a third preferred embodiment of plastic sheet 1 with folding rules and rule cutter 6 for plastic sheet, in which folding rules 2 to be formed in folding portions of the plastic sheet 1 are formed in a V-shape as shown in FIG. 28 to FIG. 31, by a pair of side parts 2a inclined by a specified angle and opposite to each other, and bottom 2b consecutive to one end of side parts 2a, 2a, and grooves 3 shallower than the bottom 2b of folding rules 2 and having a flat shape as seen from the side are formed at specified intervals in the longitudinal direction along the bottom 2b of the folding rules 2, and grooves 4 of a smooth curvature as seen from the side having nearly same depth as the grooves 3 are formed in a plurality (four in the embodiment) in the longitudinal direction along the bottom 2b between shallow grooves 3, 3.

Thickness E of the bottom 2b is set in a range of about 5 μm to about 10 μm. The number of grooves 4 may be changed to less than four or more than four. The folding rules 2 depending on thickness A, material, strength and hardness of the plastic sheet 1 are formed by using the rule cutter 6 described below, and the folding rules 2 can be changed by combination, depth, and number of blades of the blades 7, 8 of the rule cutter 6.

Further, width Ab of grooves 4 is set narrower than width Aa of grooves 3 or set at a newly equal width (about 0.15 mm) as shown in FIG. 39(a), length B of grooves 3 is set at about 0.5 mm, length C of grooves 4 at about 0.8 mm, pitch interval D of grooves 4 at about 0.2 mm, pitch interval of grooves 3 wider than pitch interval D of grooves 4, and depth Ba of grooves 3 and depth Ca of grooves 4 at about 0.08 mm.

The rule cutter 6 for plastic sheet used when forming these folding rules 2 is formed in a V-shape as shown in FIG. 32 to FIG. 35, by a pair of side parts 6a inclined by a specified angle and opposite to each other, and narrow top 6b consecutive to one end of side parts 6a, 6a, and blades 7 of flat shape as seen from the side of smaller infeed than the top 6b of the rule cutter 6 are formed at specified intervals in the longitudinal direction along the top 6b of the rule cutter 6, and blades 8 of a smooth curvature as seen from the side having a height nearly same as the blades 7 are formed in a plurality (four in the embodiment) in the longitudinal direction along the top 6b between the shallow blades 7, 7. The number of deep blades 8 may be changed to less than four or more than four.

That is, the blades 7, 8 are processed in a smooth curvature as seen from the side by cutting means such as columnar file or wire, and width Ab of blades 8 is set narrower than width Aa of blades 7 or at a width (about 0.15 mm) nearly same as shown in FIG. 39(a), length B of blades 7 is set at about 0.5 mm, length C of blades 8 at about 0.8 mm, pitch interval D of blades 8 at about 0.2 mm, pitch interval of blades 7 wider than pitch interval D of blades 8, and depth Ba of blades 7 and depth Ca of blades 8 at about 0.08 mm. At the same time, angle θ2 of rule cutter 6 for forming folding rules 2 in folding portions of front part 1a, side part 1b, rear part 1c and junction 1d of plastic sheet 1 is set at about 43 degrees, and angle θ2 of rule cutter 6 for forming folding rules 2 in folding portions of folding part 1e, upside 1f, and downside 1g is set at about 75 degrees. In this embodiment, thickness H of rule cutter 6 is set at, for example, about 0.7 mm, but not limited to this numerical value, thickness H may be changed to less than about 0.7 mm or more than about 0.7 mm.

When forming folding rules 2 in folding portions of plastic sheet 1, same as in the first preferred embodiment, since they are formed in the folding portions of the plastic sheet 1 by using the rule cutter 6, same effects and actions as in the first preferred embodiment are obtained. Besides, since the grooves 3, 4 of folding rules 2 formed in the plastic sheet 1 and the blades 7, 8 of the rule cutter 6 are designed at the depth and height of a rate depending on thickness A of plastic sheet 1, stress in the surface direction applied to the plastic sheet 1 is small, and occurrence of warp or corrugation in the folding portions, or peeling of coat film printed in the area can be prevented. Besides, the grooves 3, 4 are small in step difference and are smooth, and if the folding portions of the plastic sheet 1 are touched by hand, roughness is hardly felt, and the touch is smooth. A piece of clothes or skin is not caught, the appearance of folding portions is neat and clean, and it is excellent in design.

Since the folding rules 2 are folded from both sides of the bottom 2b, it is less likely to be torn as compared with the prior art of folding from one position in the middle of the bottom of the folding rules, and the thickness of the long grooves 3 is greater than in the folding rules of the prior art, and enough strength is assured for folding, and it is possible to repeat assembling and expanding as many time as desired, and folding and assembling procedure of plastic sheet 1 can be done mechanically.

Moreover, since grooves 3, 4 of different lengths are combined in a plurality, portions of high molecular density are dispersed in plural positions, and folding rules 2 can be processed simply and easily even in a biodegradable plastic sheet of small elongation, and favorable folding characteristic and flexibility can be obtained depending on thickness A of plastic sheet 1. If the plastic sheet 1 is folded at an acute angle, it is not torn or cracked, and if holes are opened, the size is minimum, and foreign matter hardly invades, and commercial value and sanitation will not be spoiled.

When blanking the plastic sheet 1, since the top 6b of the rule cutter 6 is pressed to the plastic sheet 1 by surface contraposition, the pressing position is hardly dislocated, and folding rules 2 can be marked accurately and securely. If a specific rule cutter 6 is pressed first, the rule cutter 6 is pushed back by the repulsive force occurring in this portion, and all rule cutters 6 . . . are pressed uniformly, and pressing position and pressing balance are corrected, so that the folding rules 2 can be formed uniformly in the entire plastic sheet 1.

Figure 37:
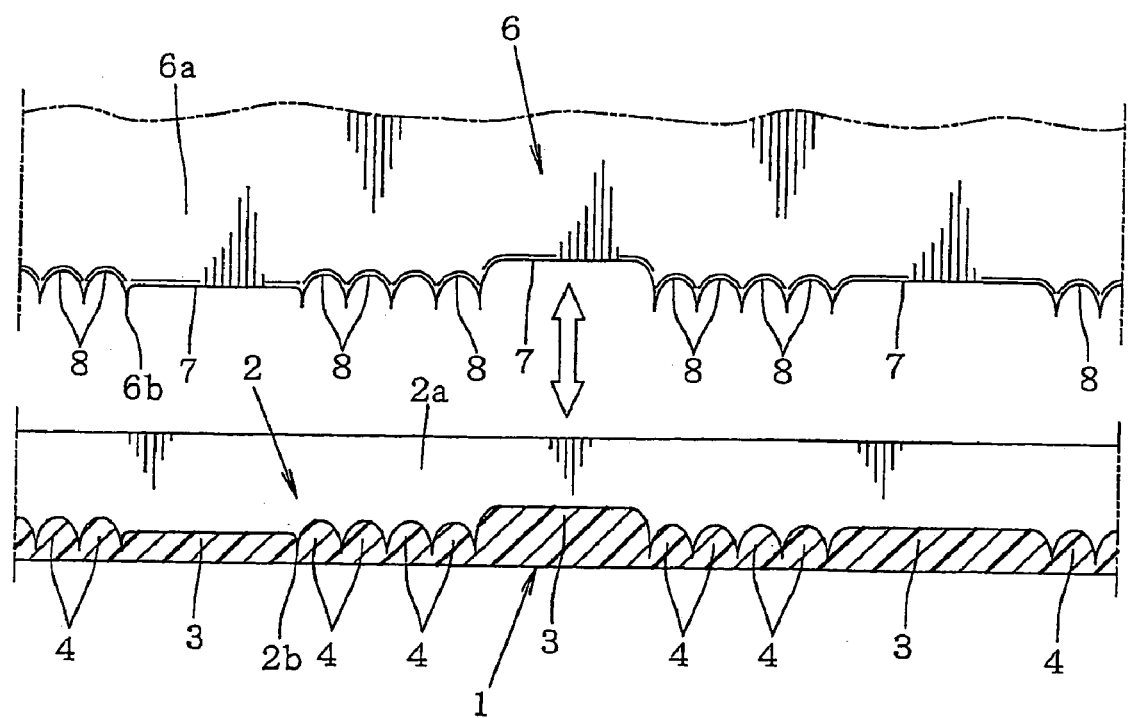
FIG. 37 is a side view of other example of folding rules and rule cutter.
Figure 38:
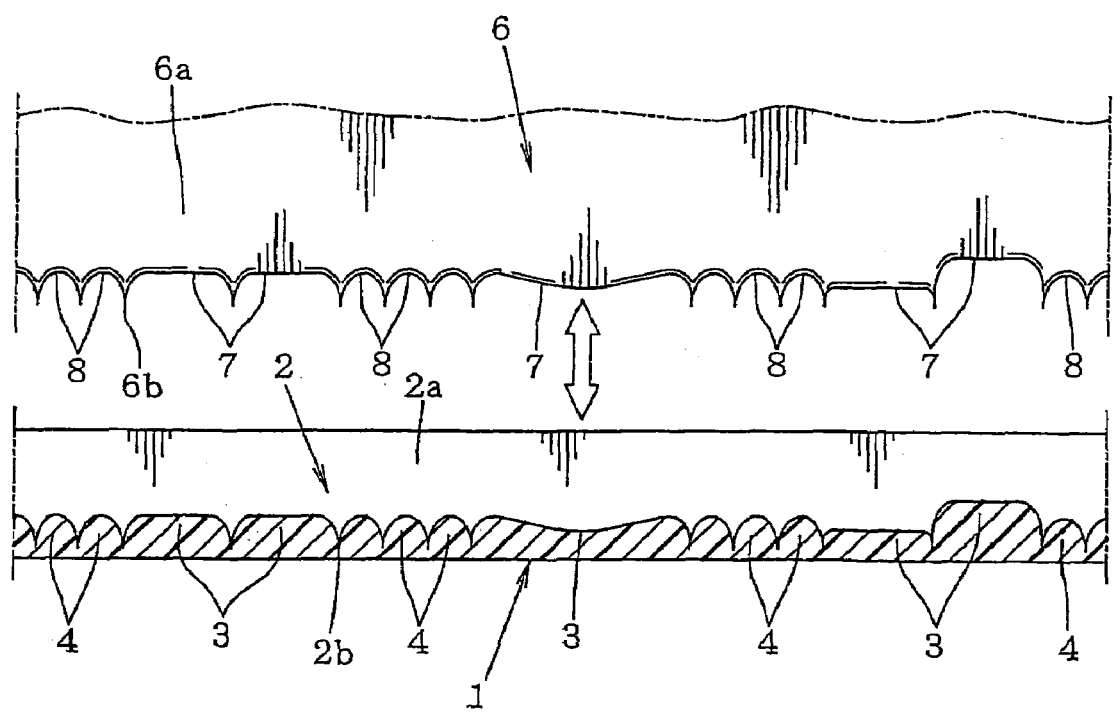
FIG. 38 is a side view of different example of folding rules and rule cutter.

FIG. 37 shows other example of folding rules 2 and rule cutter 6, in which the groove 3 at the left end of the drawing is deeper than the groove 4, and the blade 7 corresponding to the groove 3 is deeper than the blade 8. The middle groove 3 is deeper than the groove 4, and the blade 7 corresponding to this groove 3 is deeper than the blade 8. The groove 3 at the right end is longer than the arranged length of grooves 4 . . . , and the blade 7 corresponding to this groove 3 is longer then the arranged length of blades 8 . . . By using this rule cutter 6, folding rules 2 are formed in the plastic sheet 1, and same effects and actions as in the above preferred embodiment are obtained. Length B of grooves 3 and blades 7 may be set longer than length C of grooves 4 . . . and blades 8 . . . Folding rules 2 may be also formed by using the rule cutter 6 having specific blades 7, 8:

FIG. 38 shows a different example of folding rules 2 and rule cutter 6, in which the groove 3 and blade 7 at the left end of the drawing are arranged closely in a plurality or divided in a plurality by cutting line or groove, the middle groove 3 and blade 7 are formed in a smooth curvature, and the groove 3 and blade 7 at the right end are formed at different steps in the longitudinal direction, and by this rule cutter 6, folding rules 2 are formed in the plastic sheet 1, and same effects and actions as in the above preferred embodiment are obtained. Besides, any specific groove 3 or blade 7 may be formed.

Figure 39:
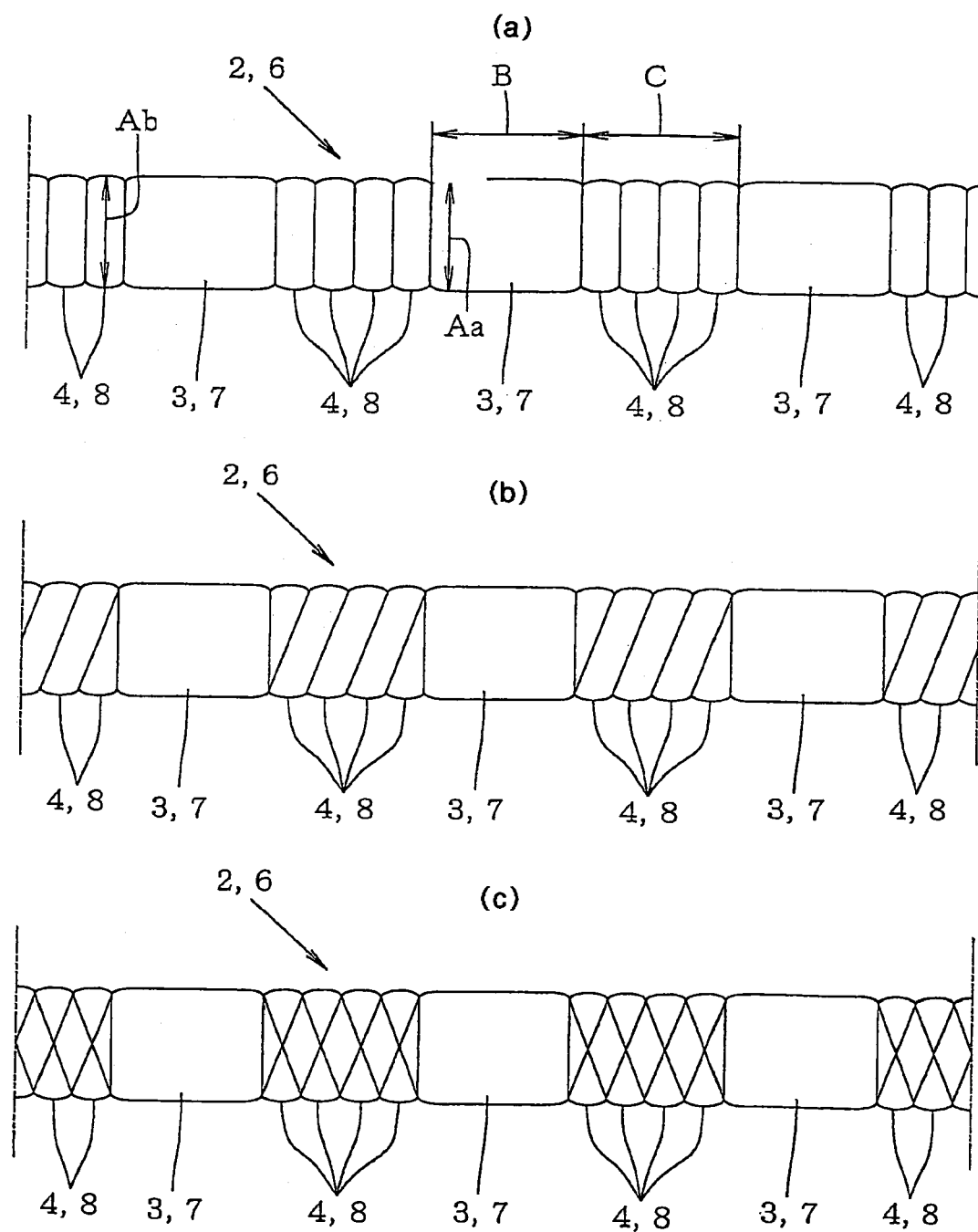
FIG. 39 is a schematic plan view of different example of folding rules and rule cutter.

FIG. 39 shows a different example of folding rules 2 and rule cutter 6, in which (a) shows widths Aa, Ab of grooves 3, 4 and blades 7, 8 formed at nearly same width. In (b), grooves 4 and blades 8 are crossed at a specified angle to the rule forming direction. In (c), grooves 4 and blades 8 are crossed at a specified angle like a diamond shape. By using the rule cutters 6 shown in (a), (b), and (c), folding rules 2 are formed in the plastic sheet 1, and same effects and actions as in the above preferred embodiment are obtained.

Figure 40:
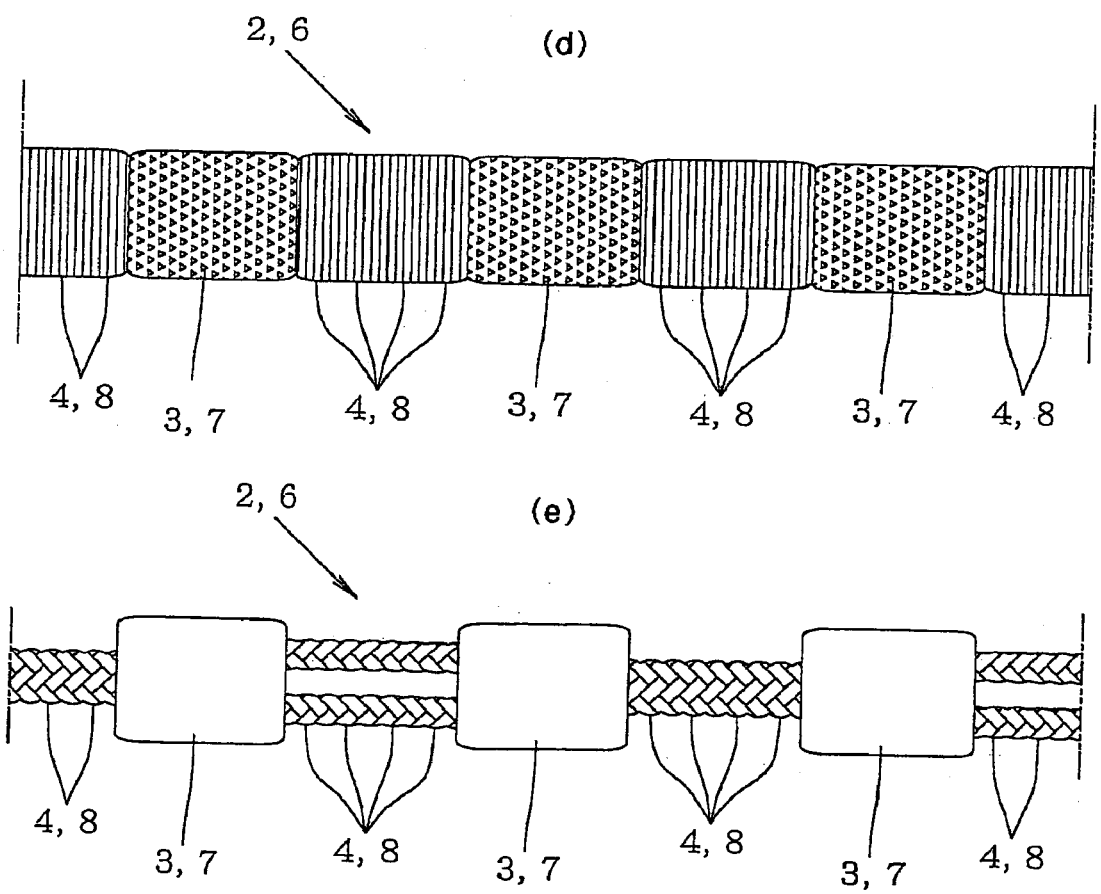
FIG. 40 is a schematic plan view of different example of folding rules and rule cutter.
Figure 41:
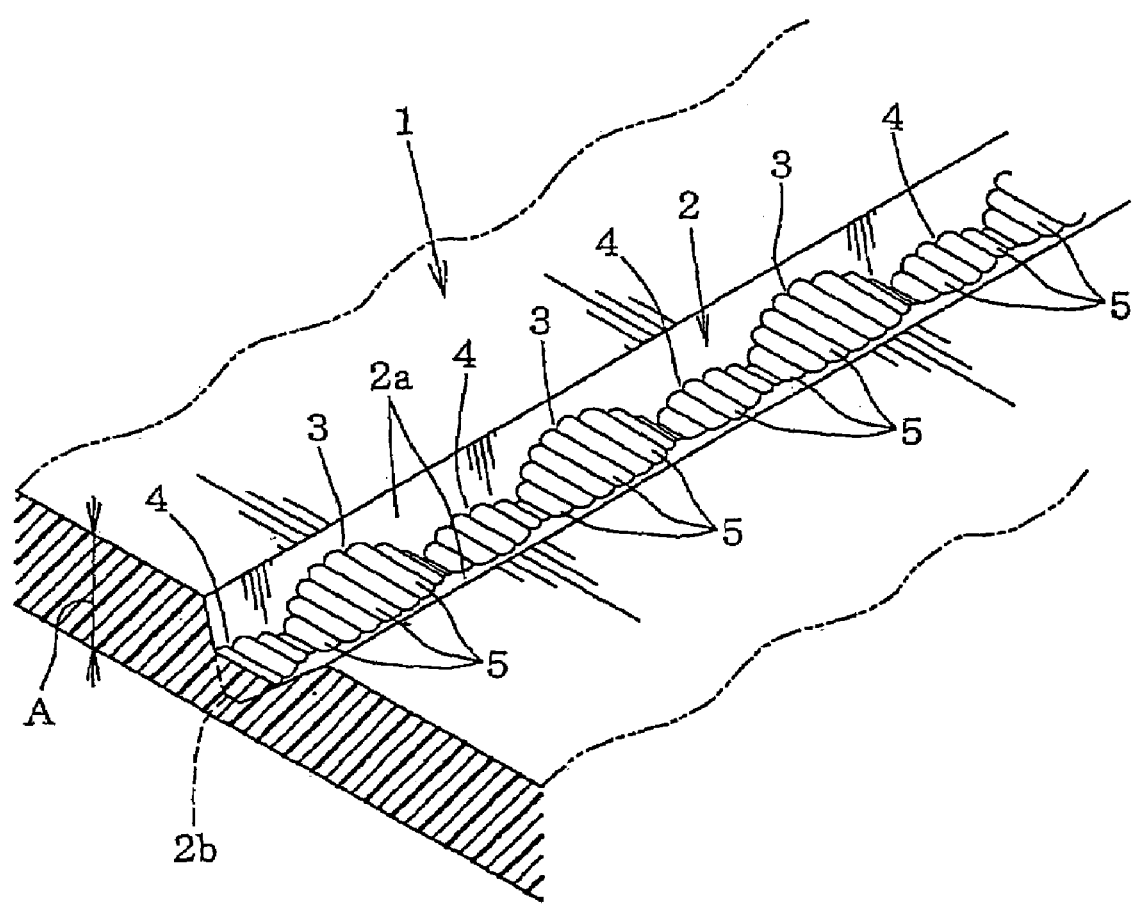
FIG. 41 is a perspective view of folding rules formed in plastic sheet.

FIG. 40 shows a different example of folding rules 2 and rule cutter 6, in which (d) shows grooves 3, 4 and blades 7, 8 formed in specific shape, such as satin pattern or small undulations. That is, depth Ca of grooves 4 and height Cb of blades 8, and pitch interval D of grooves 4 and blades 8 are set at numerical values included in the specified range. The satin pattern or small undulations are also formed in the grooves 3 and blades 7.

In (e), grooves 4 and blades 8 having specific shape such rope pattern or chain pattern are formed in one row or plural rows in the longitudinal direction. By using the folding rules 2 shown in (d) and (e), folding rules 2 are formed in the plastic sheet 1, and same effects and actions as in the above preferred embodiment are obtained.

FIG. 41 to FIG. 56 relate to a fourth preferred embodiment of plastic sheet 1 with folding rules and rule cutter 6 for plastic sheet, in which folding rules 2 to be formed in folding portions of the plastic sheet 1 are formed as shown in FIG. 41 to FIG. 44, that is, grooves 3 of arc shape or semicircular shape as seen from the side shallower than the bottom 2b of the folding rules 2 are formed in a plurality at specified intervals in the longitudinal direction along the bottom 2b of the folding rules 2 and grooves 4 of arc shape or semicircular shape as seen from the side deeper than the grooves 3 formed in one piece or in a plurality in the longitudinal direction along the bottom 2b between the shallow grooves 3, 3.

Further, convex grooves 5 of linear shape as seen from the longitudinal direction (front side) and smooth curvature as seen from the side (for example, arc shape or semicircular shape), smaller and shallower than grooves 3, 4 are formed continuously or at specified intervals in the longitudinal direction along the top of grooves 3, 4 and formed sidelong orthogonally to the longitudinal direction, and grooves 5 . . . arranged from the grooves 3 to grooves 4 are arranged in a sequence to be smaller and narrower gradually in the longitudinal direction (or front-rear direction).

Thickness X of bottom 2b is set in a specified range of about 0 μm to about 10 μm. The number of grooves 3, 4 may be changed to two, or three or more. Folding rules 2 depending on thickness A, material, strength and hardness of plastic sheet 1 are formed by the rule cutter 6 described below, and the folding rules 2 may be varied by the combination, depth or number of blades 7, 8, 9 of the rule cutter 6.

Lengths B, C of grooves 3, 4 are set at about 0.8 mm, depth D of grooves 4 at about 0.15 mm, pitch interval E of grooves 5 at about 0.2 mm, depth F of grooves 5 at about 0.08 mm, width G of grooves 4 at about 0.1 mm, and width H of grooves 3 at about 0.15 mm.

When assembling the plastic sheet 1 mechanically, angle θ1 of folding rules 2 formed in the folding portions of the front part 1a, side part 1b, rear part 1c, and junction 1d is set at an angle allowed to fold in specified direction depending on thickness A of plastic sheet 1 (for example, about 43 degrees), and angle θ1 of folding rules 2 formed in folding portions of folding part 1e, upside 1f, and downside 1g is set at an angle allowed to fold inside and outside (for example, about 75 degrees).

Figure 42:
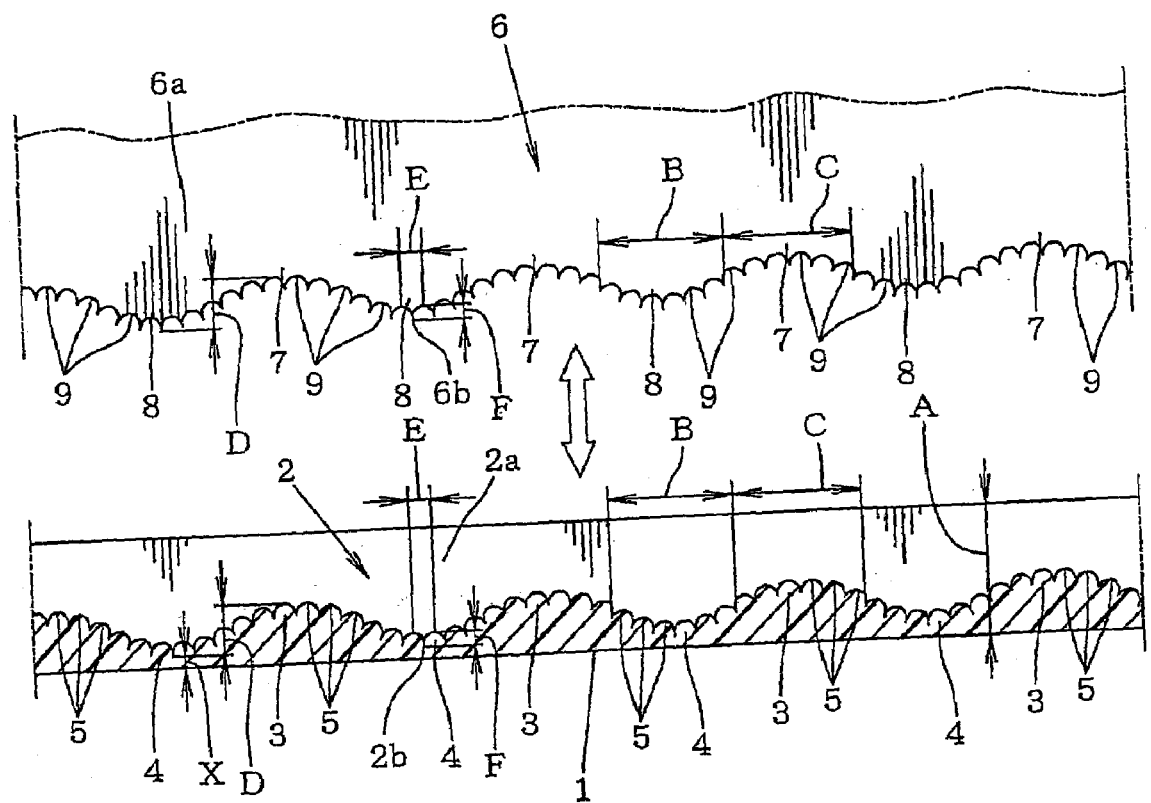
FIG. 42 is a side view of groove shape of folding rules and blade shape of rule cutter.
Figure 43:
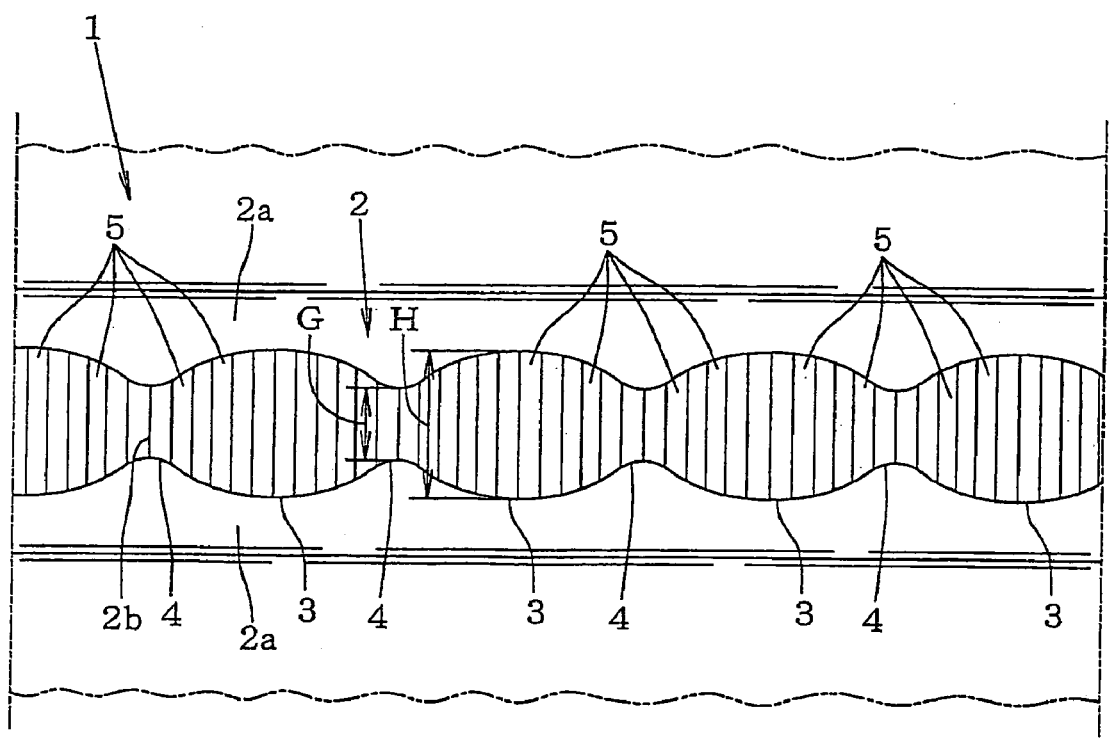
FIG. 43 is a plan view of arrangement state of grooves formed in plastic sheet.
Figure 44:
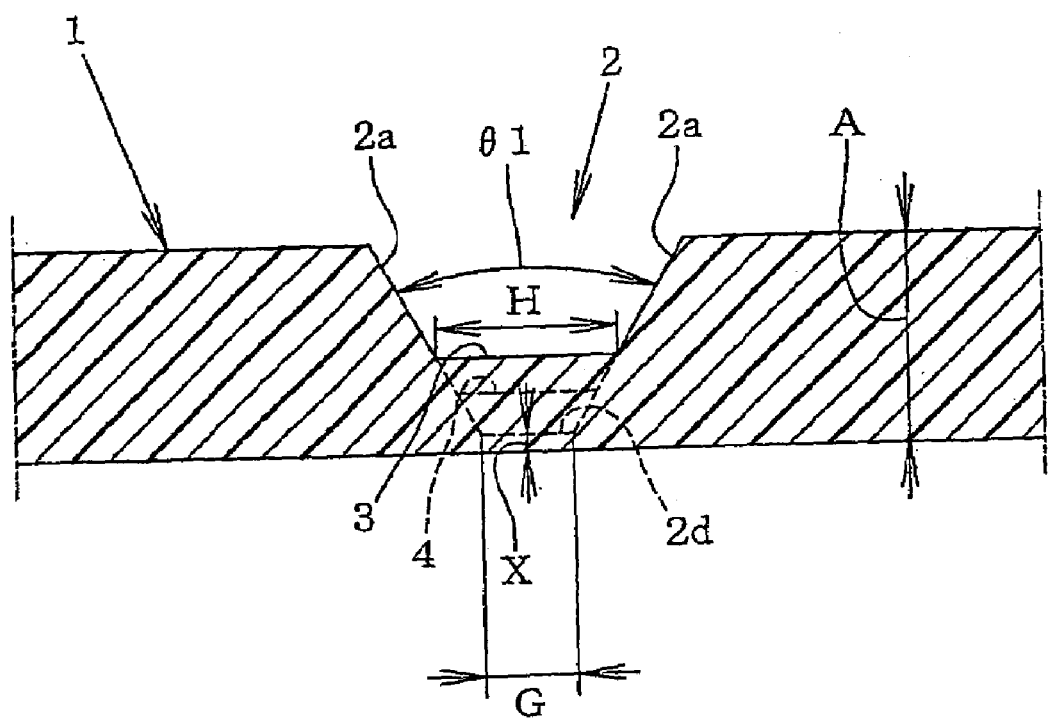
FIG. 44 is a longitudinal sectional view of groove shape of folding rules.
Figure 45:
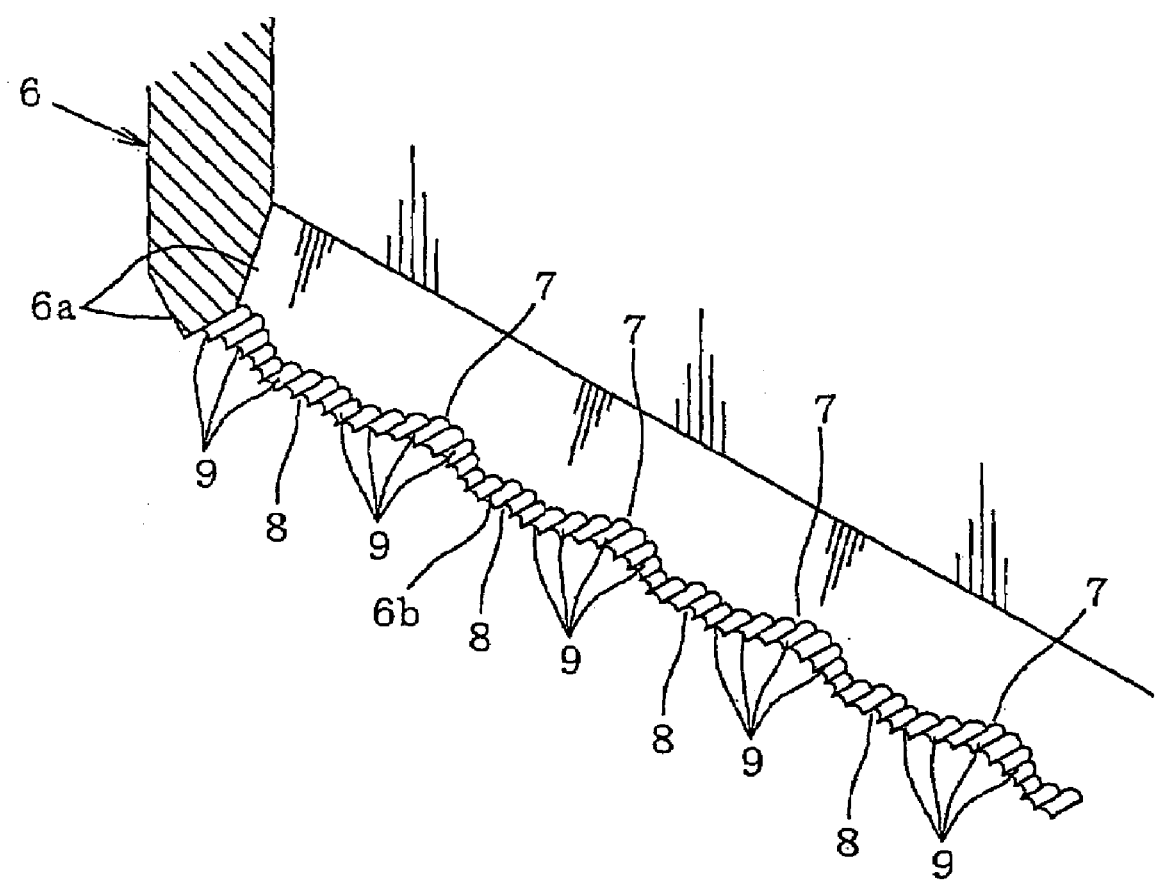
FIG. 45 is a perspective view of rule cutter for forming folding rules.
Figure 46:
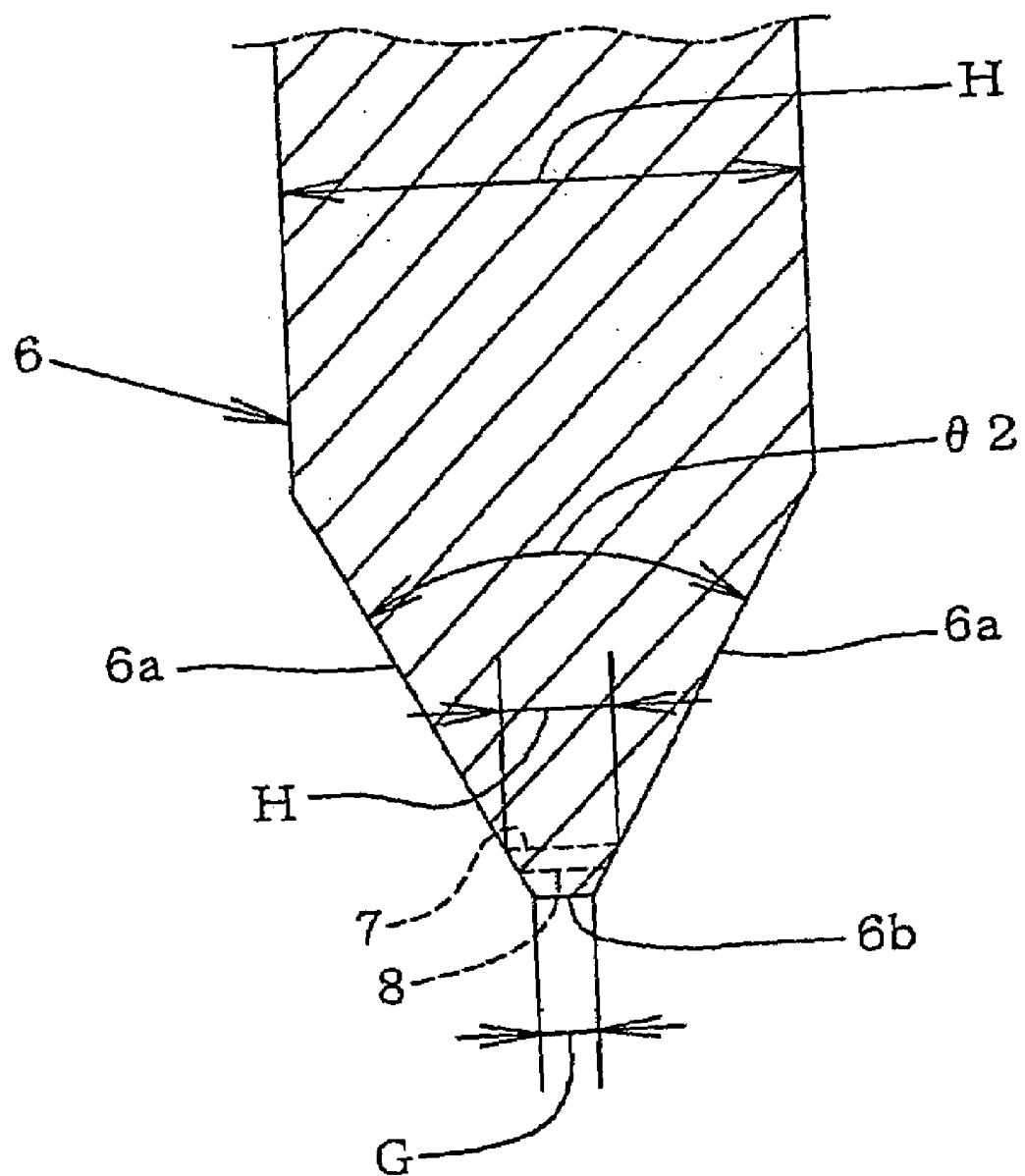
FIG. 46 is a longitudinal sectional view of blade tip shape of rule cutter.

The rule cutter 6 for plastic sheet used when forming these folding rules 2 is formed in a V-shape as seen from the longitudinal side as shown in FIG. 42, FIG. 45, and FIG. 46, by a pair of side parts 6a inclined by a specified angle and opposite to each other, and narrow top 6b consecutive to one end of side parts 6a, 6a, and blades 7 of arc shape or semicircular shape as seen from the side of smaller infeed than the top 6b of the rule cutter 6 are formed in a plurality at specified intervals in the longitudinal direction along the top 6b of the rule cutter 6, and blades 8 of arc shape or semicircular shape as seen from the side of greater infeed than the blades 7 are formed in a plurality in the longitudinal direction along the top 6b between the shallow blades 7, 7. The number of deep blades 8 may be changed to less than four or more than four.

Further, concave blades 9 shallower than blades 7, 8, in linear shape as seen from the longitudinal direction (front side), and having a smooth curvature as seen from the side (for example, arc shape or semicircular shape) are formed continuously or at specified intervals in the longitudinal direction along the downside of blades 7, 8 and formed sidelong orthogonally to the longitudinal direction, and blades 9 . . . arranged from the blades 7 to blades 8 are arranged in a sequence to be smaller and narrower gradually in the longitudinal direction (or front-rear direction). The blades 7, 8 are cut and processed in a specified shape by cutting means such as columnar file or wire. That is, lengths B, C of blades 7, 8 are set at about 0.8 mm, height D of blades 7 at about 0.15 mm, pitch interval E of blades 9 at about 0.2 mm, height F of blades 9 at about 0.08 mm, width G of blades 8 at about 0.1 mm, and width H of blades 7 at about 0.15 mm. The bottom view of the blade tip of the rule cutter 6 is same as that of the folding rule 2 in FIG. 5, and its illustration is omitted.

The blade tip angle θ2 of the rule cutter 6 when forming folding rules 2 in the folding portions of the front part 1a, side part 1b, rear part 1c, and junction 1d of plastic sheet 1 is set at an angle allowed to fold the parts 1a, 1b, 1c in specified direction (for example, about 43 degrees), and angle θ2 of the rule cutter 6 when forming folding rules 2 in folding portions of folding part 1e, upside 1f, and downside 1g is set at an angle allowed to fold the parts 1e, 1f, 1g inside and outside (for example, about 75 degrees). In this embodiment, thickness H of the rule cutter 6 is set at about 0.7 mm, but not limited to this numerical value, thickness H may be changed to less than about 0.7 mm or more than about 0.7 mm. When forming folding rules 2 in folding portions of plastic sheet 1, same as in the first preferred embodiment, since they are formed in the folding portions of the plastic sheet 1 by using the rule cutter 6, same effects and actions as in the first preferred embodiment are obtained. Besides, since the grooves 5 . . . smaller and shallower than the grooves 3, 4 of folding rules 2 formed in the plastic sheet 1 are formed in a plurality in the longitudinal direction along the upside of the grooves 3, 4, stress in the surface direction applied to the plastic sheet 1 is small, and occurrence of warp or corrugation in the folding portions, or peeling of coat film printed in the area can be prevented. Besides, since the grooves 5 are smaller than the grooves 3, 4, if the folding portions of the plastic sheet 1 are touched by hand, roughness is hardly felt, and the touch is smooth. A piece of clothes or skin is not caught, the appearance of folding portions is neat and clean, and it is excellent in design.

By pressing blades 9 . . . smaller than the blades 7, 8 of the rule cutter 6, portions of high molecular density of the plastic sheet 1 are dispersed, and the pressing force and contact resistance of the rule cutter 6 required when forming folding rules 2 can be sufficiently alleviated, and folding rules 2 can be processed simply and easily even in a biodegradable plastic sheet of small elongation, and favorable folding characteristic and flexibility can be obtained depending on thickness A of plastic sheet 1. If the plastic sheet 1 is folded at an acute angle, it is not torn or cracked, and if holes are opened, the size is minimum, and foreign matter hardly invades, and commercial value and sanitation will not be spoiled.

Since the folding rules 2 are folded from both sides of the bottom 2b, it is less likely to be torn as compared with the prior art of folding from one position in the middle of the bottom of the folding rules, and the thickness of the long grooves 3 is greater than in the folding rules of the prior art, and enough strength is assured for folding, and it is possible to repeat assembling and expanding as many time as desired, and folding and assembling procedure of plastic sheet 1 can be done mechanically.

Figure 47:
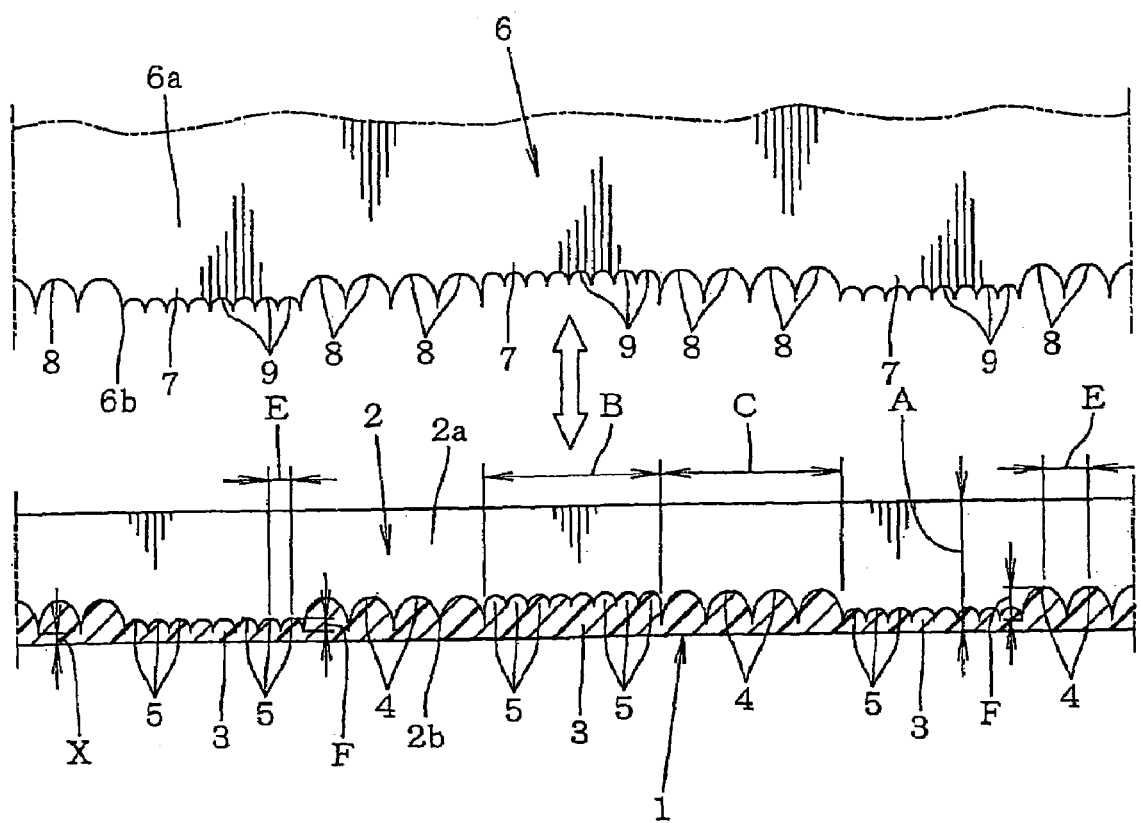
FIG. 47 is a side view of other example of folding rules and rule cutter.

FIG. 47 shows other example of folding rules 2 and rule cutter 6, in which the grooves 5 and blades 9 are formed as grooves 3 and blades 7 in the depth same as or deeper than the grooves 4 and blades 8. By using the rule cutter 6 having the corresponding groove shape, folding rules 2 are formed in the plastic sheet 1, and same effects and actions as in the above preferred embodiment are obtained. Grooves 3 and blades 7 may be formed as grooves 3 and blades 7 shallower than the grooves 4 and blades 8.

Figure 48:
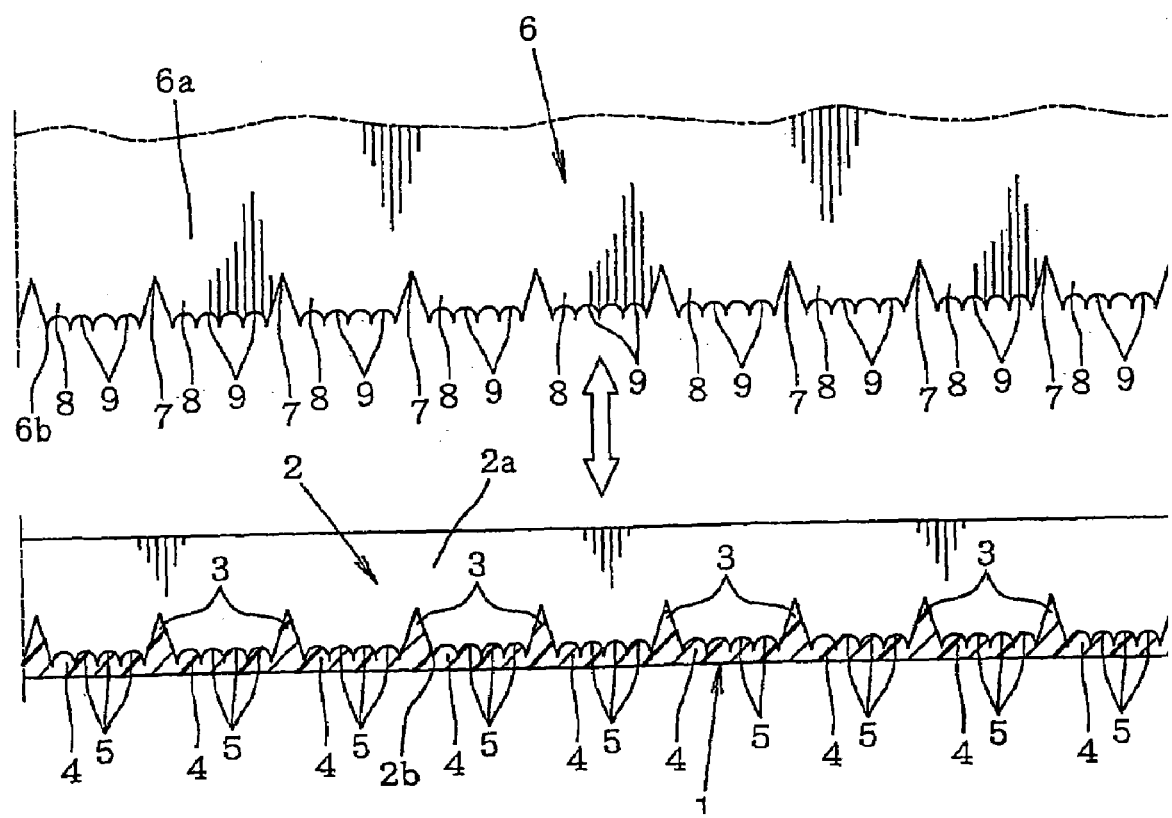
FIG. 48 is a side view of different example of folding rules and rule cutter.

FIG. 48 shows a different example of folding rules 2 and rule cutter 6, in which the grooves 3 and blades 7 are formed in triangular shape as seen from the side, and the grooves 5 and blades 9 are formed in the groove 4 between the grooves 3 . . . and the blade 8 between the blades 7 . . . By using the rule cutter 6 having the corresponding groove shape, folding rules 2 are formed in the plastic sheet 1, and same effects and actions as in the above preferred embodiment are obtained.

Figure 49:
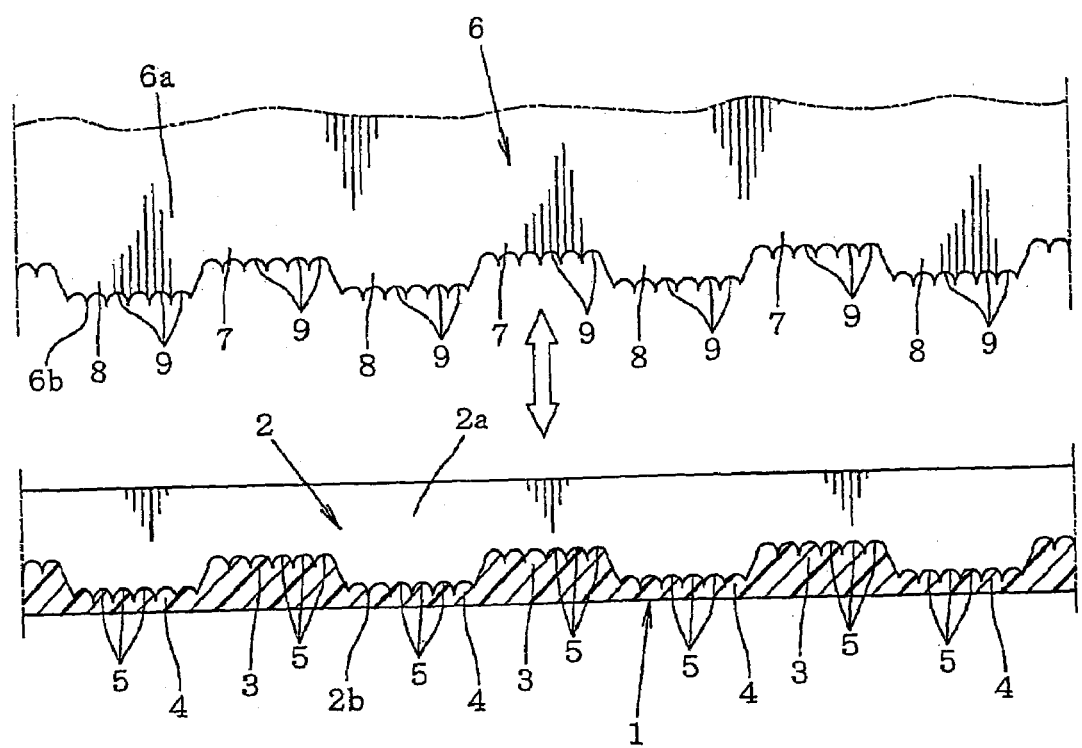
FIG. 49 is a side view of different example of folding rules and rule cutter.

FIG. 49 shows a different example of folding rules 2 and rule cutter 6, in which the grooves 5 and blades 9 are formed in both grooves 3, 4 and blades 7, 8 having trapezoidal shape as seen from the side. By using the rule cutter 6 having the corresponding groove shape, folding rules 2 are formed in the plastic sheet 1, and same effects and actions as in the above preferred embodiment are obtained. Grooves 5 may be formed in either grooves 3 or 4, and blades 9 may be formed in either blades 7 or 8.

Figure 50:
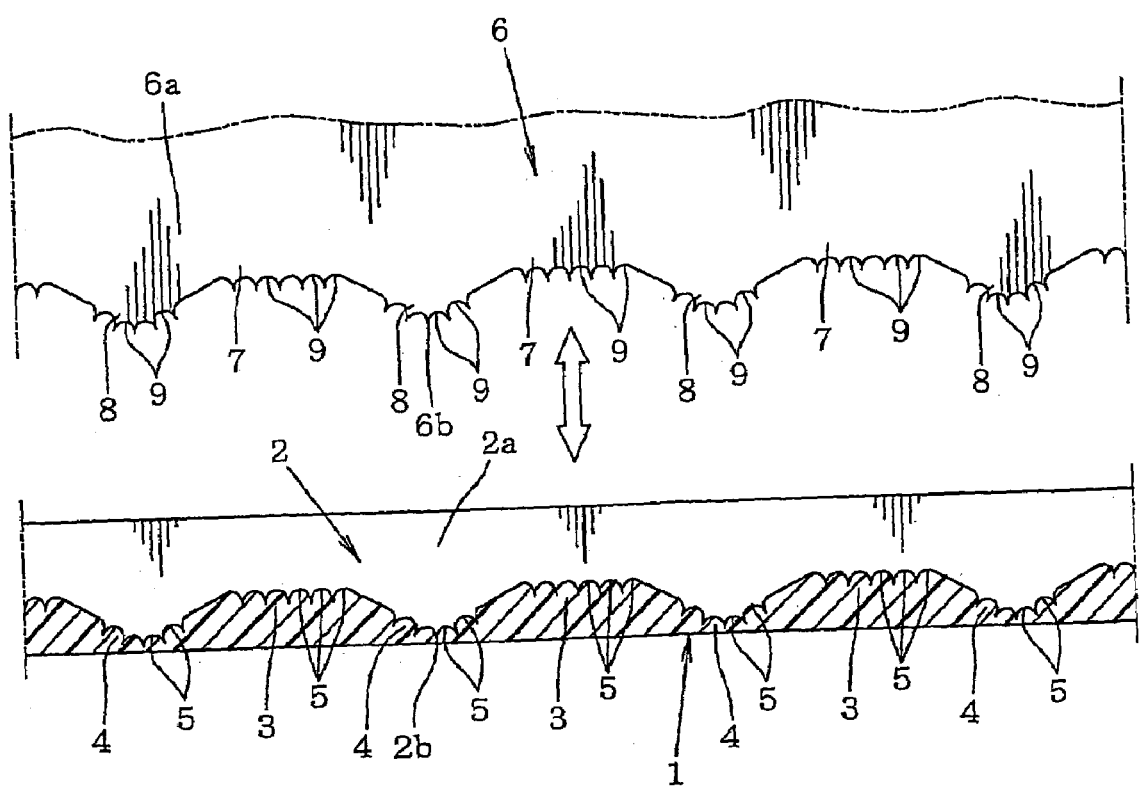
FIG. 50 is a side view of different example of folding rules and rule cutter.
Figure 52:
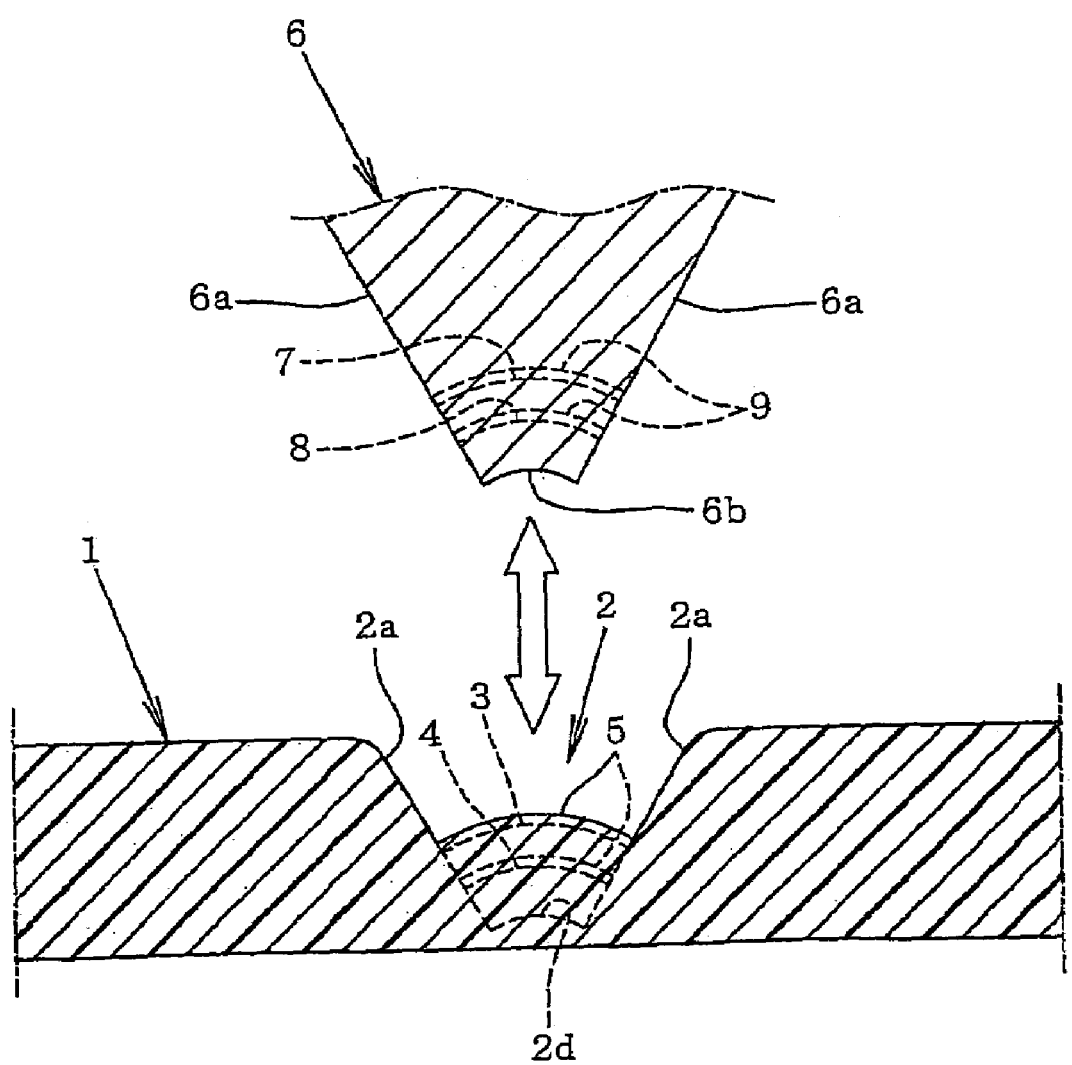
FIG. 52 is a side view of different example of folding rules and rule cutter.
Figure 53:
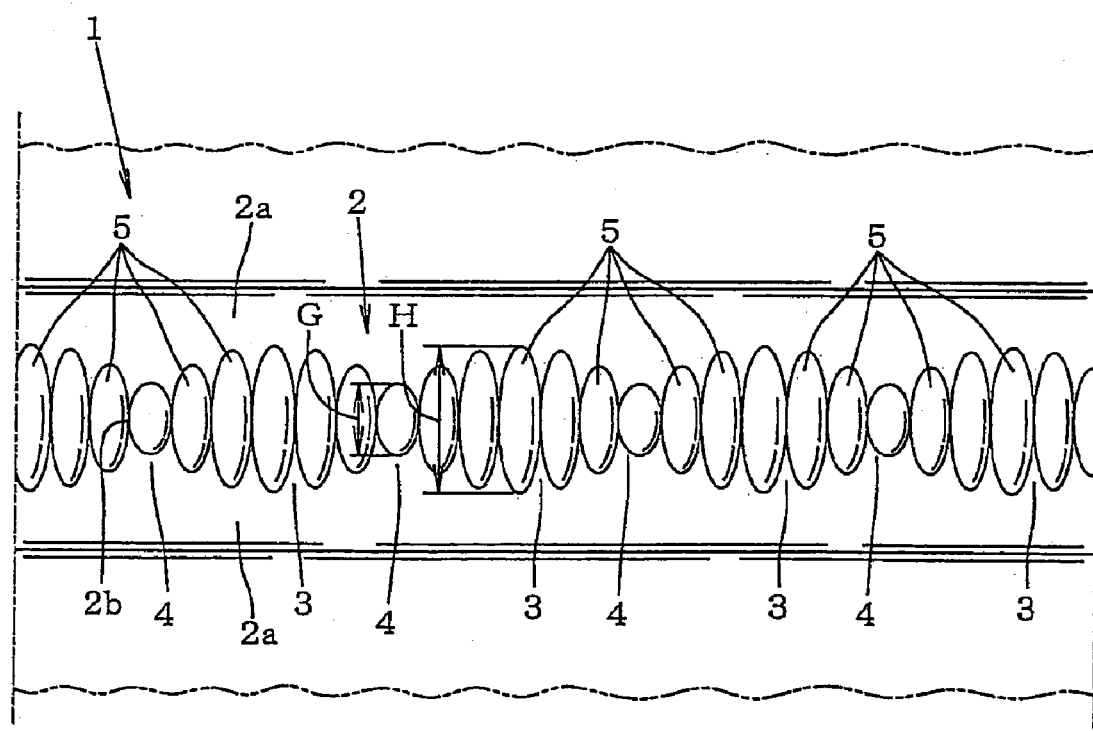
FIG. 53 is a plan view of elliptical grooves formed in plastic sheet.
Figure 54:
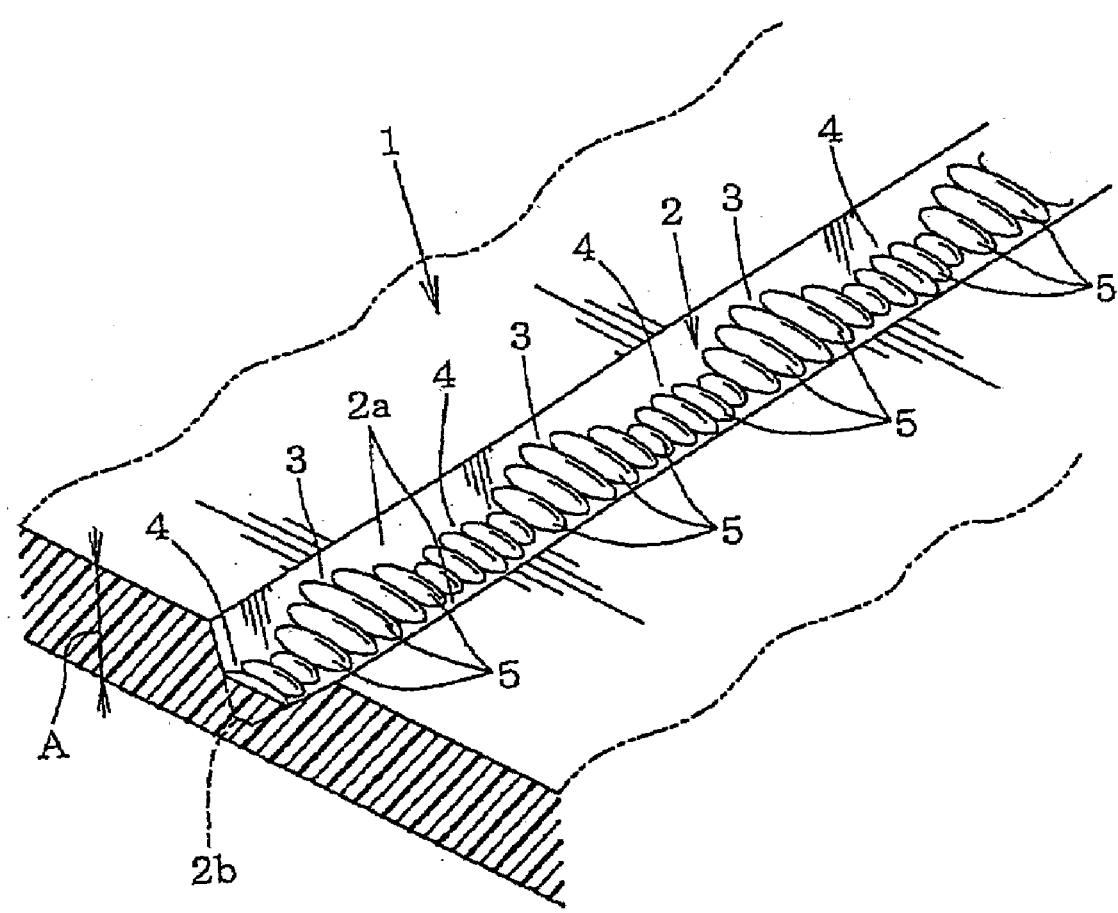
FIG. 54 is a perspective view of arrangement state of elliptical grooves.
Figure 55:
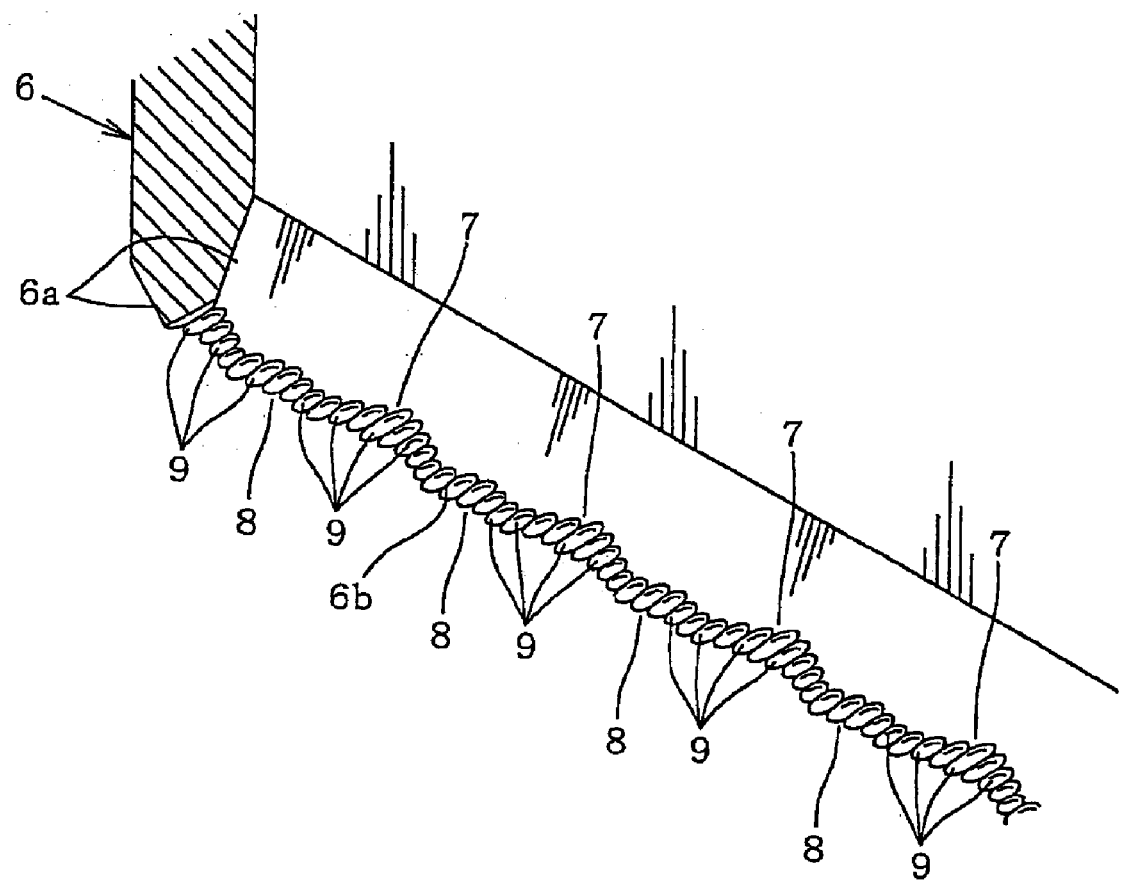
FIG. 55 is a perspective view of arrangement state of elliptical blades.

FIG. 50 shows a different example of folding rules 2 and rule cutter 6, in which grooves 5 are formed in the top of grooves 3 and in the root of grooves 4, and blades 9 are formed in the upper end middle of blades 7 and in the lower end middle of blades 8. By using the rule cutter 6 having the corresponding groove shape, folding rules 2 are formed in the plastic sheet 1, and same effects and actions as in the above preferred embodiment are obtained.

FIG. 51 shows a different example of folding rules 2 and rule cutter 6, in which (f) shows grooves 5 and blades 9 crossed and formed at a specified angle to the rule forming direction (or longitudinal direction). In (g), grooves 5 and blades 9 are crossed and formed at a specified angle in diamond shape or parallelogram. In (h), convex grooves 5 and concave blades 9 formed in specific shape, such as satin pattern or small undulations are formed in a multiplicity in the rule forming direction (or longitudinal direction). By using the rule cutters 6 having the corresponding groove shape shown in (f), (g), and (h), folding rules 2 are formed in the plastic sheet 1, and same effects and actions as in the above preferred embodiment are obtained. Grooves 5 and blades 9 may be formed in specific shape, such as rope pattern or chain pattern.

FIG. 52 to FIG. 55 show different examples of folding rules 2 and rule cutter 6, in which grooves 3, 4, 5 and blades 7, 8, 9 are formed in a smooth curvature (for example, arc shape or semicircular shape) as seen from the longitudinal direction (front side) and width direction (lateral side), and at a specified radius of curvature. Further, the grooves 3, 4, 5 of folding rules 2 as seen from the plane and the blades 7, 8, 9 of rule cutter 6 as seen from the bottom are formed in a smooth curvature (for example, elliptical shape or streamline shape). By using the rule cutter 6 having the corresponding groove shape, folding rules 2 are formed in the plastic sheet 1, and same effects and actions as in the above preferred embodiment are obtained. Grooves 5 and blades 9 may be formed in a smooth curvature at both ends.

Figure 56:
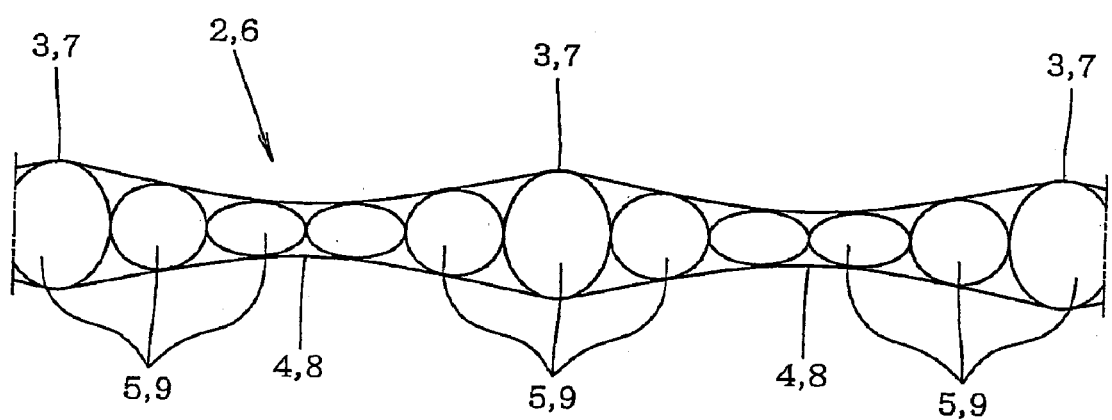
FIG. 56 is an explanatory diagram of other arrangement state of grooves and blades.

FIG. 56 shows a different example of folding rules 2 and rule cutter 6, in which grooves 5 . . . formed between grooves 3, 4 of folding rules 2 and blades 9 . . . formed between blades 7, 8 of rule cutter 6 are formed in a smooth curvature (for example, elliptical shape or streamline shape), and the grooves 5 . . . arranged from grooves 3 to groove 4 and blades 9 . . . arranged from blades 7 to blades 8 are formed in a sequence (for example, elliptical shape or streamline shape) gradually becoming smaller and narrower in the longitudinal direction (or front-rear direction). By using the rule cutter 6 having the corresponding groove shape, folding rules 2 are formed in the plastic sheet 1, and same effects and actions as in the above preferred embodiment are obtained.

In other method of processing folding rules 2, for example, the rule cutter 6 heated to a specified temperature may be pressed to the folding portions of the plastic sheet 1, or rotary rule cutter (not shown) of disk or loop shape may be pressed and rolled on the plastic sheet 1.

Further, folding rules 2 may be formed in the plastic sheet 1 composing various containers, such as pillow shaped packaging container, triangular or elliptical containers and others, and plural rules may be formed in the folding portions of the plastic sheet 1, and applications are not limited to the plastic sheet 1 assembled in the package forms of the embodiments alone.

Advantage of the Invention

According to the invention, since folding rules forming a plurality of deep grooves between shallow grooves are formed in the plastic sheet, the stress in the surface direction applied to the plastic sheet is smaller as compared with the method of forming thin portions continuously, and occurrence of warp or corrugation can be suppressed, and the folding procedure of plastic sheet and assembling procedure of package container can be done mechanically. Still more, a small pressure is enough when forming folding rules in the plastic sheet, and the processability is enhanced.

A plurality of thin parts and deep grooves are formed between shallow grooves, portions of high molecular density are dispersed, and favorable folding property and flexibility are obtained, and if the plastic sheet is folded at an acute angle, it is not torn or cracked, and if holes are opened, the size is minimum, and foreign matter hardly invades, and commercial value and sanitation will not be spoiled.

Further, according to the invention, since folding rules arranging a plurality of shallow grooves in a rope pattern are formed in the plastic sheet, grooves are small in step difference and are inclined in the rule forming directions, and if the folding portions of the plastic sheet are felt by hand, roughness is hardly felt, and the touch is smooth. If a piece of clothes makes contact, it is not caught or torn, and folding rules are not damaged.

Since the groove forming portions are pressed and expanded obliquely, the molecular density is not heightened in these portions, and it is not torn if a folding pressure is applied to thin portions (deep portions), and folding rules can be processed simply and easily even in a plastic sheet of small elongation. If cracks or pores are formed, or if grooves are formed too deep, since the grooves are deformed flatly and adhered when folding, invasion of dust, moisture or foreign matter is avoided, and sanitation and commercial value may be maintained.

Besides, according to the invention, since the grooves of folding rules and the blades of the rule cutter for forming the folding rules are designed at the depth and height of a rate depending on thickness of plastic sheet, or a plurality of smaller protrusions than the grooves are formed in the longitudinal direction on the top of the grooves of the folding rules, stress in the surface direction applied to the plastic sheet is small, and occurrence of warp or corrugation or peeling of coat film printed in the area can be prevented. Besides, the grooves are small in step difference and are smooth, and if the folding portions of the plastic sheet are touched by hand, roughness is hardly felt, and the touch is smooth. A piece of clothes or skin is not caught, the appearance of folding portions is neat and clean, and it is excellent in design.

Since the folding rules are folded from two thin portions formed at both sides of the bottom, it is less likely to be torn as compared with the prior art of folding from one position in the middle of the bottom of the folding rules, and the thickness of the long grooves is greater than in the folding rules of the prior art, and enough strength is assured for folding, and it is possible to repeat assembling and expanding as many time as desired, and folding and assembling procedure can be done mechanically.

Moreover, in the invention, since grooves of different lengths are combined in a plurality, or a plurality of smaller recesses than the blades of rule cutter are pressed, portions of high molecular density of plastic sheet are dispersed, the pressing force and contact resistance of rule cutter required when forming folding rules can be substantially alleviated, and folding rules can be processed simply and easily even in a biodegradable plastic sheet of small elongation, and favorable folding characteristic and flexibility can be obtained depending on thickness of plastic sheet. If the plastic sheet is folded at an acute angle, it is not torn or cracked, and if holes are opened, the size is minimum, and foreign matter hardly invades, and commercial value and sanitation will not be spoiled.

The invention claimed is:

1. A plastic sheet comprising:
   concave folding rules including a pair of side faces inclined at a specified angle and mutually facing oppositely, and a narrow bottom face contiguous with an end of the pair of side faces,
   wherein shallow grooves are formed at specified intervals in the longitudinal direction along the bottom face of the folding rules;
   a plurality of deeper grooves, which are deeper than the shallow grooves, and are formed in the longitudinal direction along the bottom face between the shallow grooves; and
   grooves of medium depth, which are deeper than the shallow grooves and shallower than the deep grooves, formed in the bottom of the folding rules between the shallow grooves.

2. The plastic sheet with the folding rules of claim 1, wherein the deep grooves are formed at different depths.

3. The plastic sheet with the folding rules of claim 1, wherein the deep grooves are formed by deep blades and are set at dimensions deeper by a specified rate from the shallow grooves formed by shallow blades.

4. The plastic sheet according to claim 1, wherein pitch intervals of the shallow grooves are approximately 1.1 mm and pitch intervals of the deep grooves are approximately 0.2 mm.

5. A rule cutter for a plastic sheet used in forming folding rules in folding portions of the plastic sheet, said rule cutter comprising a pair of side faces inclined at a specified angle and mutually facing oppositely, and a narrow top face contiguous with an end of the pair of side faces,
   wherein blades of shallow infeed are formed at specified intervals in the longitudinal direction along the top face of the rule cutter;
   a plurality of blades of deeper infeed than the shallow blades are formed in the longitudinal direction along the top face between the shallow; and
   blades of medium infeed, which are deeper than the infeed of the shallow blades and shallower than the infeed of the deep blades, are formed between adjacent shallow blades.

6. The rule cutter of claim 5, wherein the shallow blades are set at different depths of infeed.

7. The rule cutter of claim 5, wherein the deep grooves and deep blades are set at dimensions deeper by a specified rate from the shallow grooves and shallow blades.

8. The rule cutter according to claim 5, wherein pitch intervals of the shallow blades are approximately 1.1 mm and pitch intervals of the deep blades are approximately 0.2 mm.

9. A plastic sheet provided with concave folding rules, said folding rules comprising;
   a pair of side faces inclined at a specified angle and mutually facing oppositely, and a narrow bottom face contiguous with an end of the pair of side faces, wherein:
   a plurality of grooves is formed shallower than the folding rules in the overall length of bottom of folding rules, and
   the grooves are inclined at a specified angle to the rule forming direction of the folding rules to arrange the grooves in a rope pattern,
   wherein inclined side surfaces of adjacent grooves contact each other.

10. The plastic sheet with the folding rules of claim 9, wherein holes are provided in the bottom of the folding rules and are formed between adjacent grooves.

11. The plastic sheet with the folding rules of claim 9, wherein the dimensions of parts of grooves are set in dimensions included in a specified range suited to folding suitable to fold the plastic sheet.

12. A rule cutter for a plastic sheet used in forming folding rules in folding portions of the plastic sheet, said rule cutter comprising a pair of side faces inclined at specified angle and mutually facing oppositely, and a narrow top face contiguous with an end of the pair of side faces, wherein:
   a plurality of concave blades is formed in the overall length of top of rule cutter, and
   the blades are inclined at a specified angle to the rule forming direction of folding rules to arrange in a rope pattern,
   wherein inclined side surfaces of adjacent blades contact each other.

13. The rule cutter of claim 12, wherein holes are provided in the bottom of the folding rules and are formed between adjacent grooves.

14. The rule cutter of claim 12, wherein the dimensions of parts of grooves are set in dimensions included in a specified range suited to forming of folding rules in the plastic sheet.

15. A plastic sheet with concave folding rules, said concave folding rules comprising a pair of side faces inclined at a specified angle and mutually facing oppositely, and a narrow bottom face contiguous with an end of the pair of side faces, wherein:
   a plurality of grooves is formed at depths depending on the thickness of the plastic sheet at specified intervals in the longitudinal direction along the bottom of folding rules;
   shallow grooves, which are shorter in depth than the plurality of grooves formed in the longitudinal direction along the bottom of the folding rules, are formed at depths depending on the thickness of the plastic sheet in the longitudinal direction along the bottom of the folding rules between the grooves
   a plurality of deeper grooves, which are deeper than the shallow grooves, and are formed in the longitudinal direction along the bottom face between the shallow grooves; and grooves of medium depth, which are deeper than the shallow grooves and shallower than the deep grooves, are formed along the bottom of the folding rules between adjacent shallow grooves.

16. The plastic sheet with the folding rules of claim 15, wherein the grooves are formed at nearly same or different depths.

17. The plastic sheet with the folding rules of claim 15, wherein the grooves are formed in a smooth curvature.

18. The plastic sheet with the folding rules of claim 15, wherein parts of the grooves are set at dimensions included in a specified rate suited to folding depending on the thickness of the plastic sheet.

19. A rule cutter for a plastic sheet used in forming folding rules in folding portions of the plastic sheet, said rule cutter comprising a pair of side faces inclined at a specified angle and mutually facing oppositely, and a narrow top face contiguous with an end of side faces, wherein:
 a plurality of deep blades is formed at heights depending on the thickness of the plastic sheet at specified intervals in the longitudinal direction along the top of the rule cutter;
 shallow blades are formed at heights, which are shorter than the plurality of deep blades formed in the longitudinal direction along the top of the rule cutter, depending on the thickness of the plastic sheet in the longitudinal direction along the top of the rule cutter; and
 blades of medium height, which are taller than the height of the shallow blades and shorter than the height of the deep grooves, are formed between adjacent shallow blades.

20. The rule cutter of claim 19, wherein the blades are formed at nearly same or different heights.

21. The rule cutter of claim 19, wherein the blades are formed in a smooth curvature.

22. The rule cutter of claim 19, wherein parts of the blades are set at dimensions included in a specified rate suited to forming of folding rules depending on the thickness of the plastic sheet.

23. A plastic sheet with concave folding rules, said concave folding rules comprising a pair of side faces inclined at a specified angle and mutually facing oppositely, and a narrow bottom face contiguous with an end of side faces, wherein:
 a plurality of shallow grooves that are shallower than the folding rules and deep grooves that are deeper than the shallow grooves, are formed in the longitudinal direction along the bottom of the folding rules, and
 a plurality of protrusions that are smaller than the shallow and deep grooves are formed in the longitudinal direction along the top of the shallow and deep grooves.

24. The plastic sheet with the folding rules of claim 23, wherein the small protrusions are formed in the shallow grooves and deep grooves.

25. The plastic sheet with the folding rules of claim 23, wherein the shallow grooves and deep grooves are formed at different depths or same depth.

26. The plastic sheet with the folding rules of claim 23, wherein the grooves and protrusions are formed in a specified size depending on the thickness of the plastic sheet.

27. The plastic sheet with the folding rules of claim 23, wherein the grooves and protrusions are formed in a smooth curvature as seen from the longitudinal direction of the folding rules.

28. A rule cutter for a plastic sheet used in forming folding rules in folding portions of the plastic sheet, said rule cutter comprising a pair of side faces inclined at specified angle and mutually facing oppositely, and a narrow top face contiguous with an end of side faces, wherein:
 a plurality of shallow blades that are shallower than the folding rules and deep blades that are deeper than the shallow blades, are formed in the longitudinal direction along the top of the rule cutter, and
 a plurality of recesses smaller than the shallow and deep blades are formed in the longitudinal direction along the bottom of the shallow and deep blades.

29. The rule cutter of claim 28, wherein the small recesses are formed in the shallow blades and deep blades.

30. The rule cutter of claim 28, wherein the shallow blades and deep blades are formed at different depth or same depth.

31. The rule cutter of claim 28, wherein the blades and recesses are formed in a specified dimension depending on the thickness of the plastic sheet.

32. The rule cutter of claim 28, wherein the blades and recesses are formed in a smooth curvature as seen from the longitudinal direction of the rule cutter.

* * * * *

UNITED STATES PATENT AND TRADEMARK OFFICE
CERTIFICATE OF CORRECTION

PATENT NO. : 7,160,237 B2 Page 1 of 1
APPLICATION NO. : 10/506681
DATED : January 9, 2007
INVENTOR(S) : Hashimoto et al.

It is certified that error appears in the above-identified patent and that said Letters Patent is hereby corrected as shown below:

At column 21, line 61 (claim 5, line 11) of the printed patent, insert --blades-- after "shallow".

At column 22, lines 28-29 (claim 11, lines 3-4) of the printed patent, delete "suited to folding" after "range".

Signed and Sealed this

Tenth Day of June, 2008

JON W. DUDAS
*Director of the United States Patent and Trademark Office*